United States Patent
Jakobsson et al.

(10) Patent No.: US 11,102,244 B1
(45) Date of Patent: Aug. 24, 2021

(54) AUTOMATED INTELLIGENCE GATHERING

(71) Applicant: Agari Data, Inc., San Mateo, CA (US)

(72) Inventors: Bjorn Markus Jakobsson, Portola Valley, CA (US); John M. Wilson, III, Mountain View, CA (US); Patrick Richard Peterson, San Francisco, CA (US); SeyedHossein Siadati, New York, NY (US)

(73) Assignee: Agari Data, Inc., San Mateo, CA (US)

( * ) Notice: Subject to any disclaimer, the term of this patent is extended or adjusted under 35 U.S.C. 154(b) by 366 days.

(21) Appl. No.: 15/992,752

(22) Filed: May 30, 2018

Related U.S. Application Data

(60) Provisional application No. 62/516,535, filed on Jun. 7, 2017, provisional application No. 62/543,801, filed on Aug. 10, 2017.

(51) Int. Cl.
*H04L 29/06* (2006.01)
*H04L 12/58* (2006.01)

(52) U.S. Cl.
CPC .......... *H04L 63/1491* (2013.01); *H04L 51/02* (2013.01); *H04L 51/22* (2013.01); *H04L 63/0807* (2013.01); *H04L 63/123* (2013.01)

(58) Field of Classification Search
CPC ....... H04L 51/02; H04L 51/22; H04L 63/123; H04L 63/0807; H04L 63/1491
See application file for complete search history.

(56) References Cited

U.S. PATENT DOCUMENTS 6,073,142 A 6/2000 Geiger
6,161,130 A 12/2000 Horvitz
(Continued)

FOREIGN PATENT DOCUMENTS

JP 2011100489 5/2011
WO 2018213457 11/2018

OTHER PUBLICATIONS

Search Query Report from IP.com (performed Jul. 31, 2020) (Year: 2020).*

(Continued)

*Primary Examiner* — Sharon S Lynch
(74) *Attorney, Agent, or Firm* — Fredrikson & Byron, P.A.

(57) ABSTRACT

In one example, intelligence is gathered about an attacker that is attempting an attack via a malicious exploit message by exploiting the attacker's belief that the attack is succeeding. A received message (e.g., malicious message) sent from a first message account (e.g., attacker) to a second message account (e.g., intended victim) is received. A security risk associated with the received message is determined. It is determined that the security risk associated with the received message meets one or more criteria. Based on the determination that the security risk associated with the received message meets the one or more criteria, a responsive message is sent in response to the received message from a third message account (e.g., security service) to the first message account. The responsive message includes a content reference identified as referring to a content for a user of the first message account. In response to receiving a request made by the user of the first message account using the content reference, access to a message repository associated with the first message account is requested. Once access is granted, the message repository can be analyzed and intelligence about the first message account can be gathered and reported.

20 Claims, 25 Drawing Sheets

(56) References Cited

U.S. PATENT DOCUMENTS

| | | | |
|---|---|---|---|
| 6,574,658 B1 | 6/2003 | Gabber | |
| 6,721,784 B1 | 4/2004 | Leonard | |
| 7,194,618 B1 | 3/2007 | Suominen | |
| 7,293,063 B1 | 11/2007 | Sobel | |
| 7,299,261 B1 | 11/2007 | Oliver | |
| 7,464,408 B1 * | 12/2008 | Shah | G06F 21/52 |
| | | | 726/22 |
| 7,631,193 B1 | 12/2009 | Hoffman | |
| 7,644,274 B1 | 1/2010 | Jakobsson | |
| 7,668,951 B2 | 2/2010 | Lund | |
| 7,748,038 B2 * | 6/2010 | Olivier | G06F 21/56 |
| | | | 726/24 |
| 7,797,752 B1 | 9/2010 | Vaidya | |
| 7,809,795 B1 | 10/2010 | Cooley | |
| 7,809,796 B1 | 10/2010 | Bloch | |
| 7,814,545 B2 | 10/2010 | Oliver | |
| 7,831,522 B1 | 11/2010 | Satish | |
| 7,854,007 B2 * | 12/2010 | Sprosts | H04L 63/145 |
| | | | 726/24 |
| 7,890,358 B2 * | 2/2011 | Dutta | G06Q 40/02 |
| | | | 705/4 |
| 7,899,213 B2 | 3/2011 | Otsuka | |
| 7,899,866 B1 | 3/2011 | Buckingham | |
| 7,917,655 B1 | 3/2011 | Coomer | |
| 7,941,842 B2 | 5/2011 | Prince | |
| 8,010,614 B1 | 8/2011 | Musat | |
| 8,131,655 B1 | 3/2012 | Cosoi | |
| 8,214,490 B1 * | 7/2012 | Vos | H04L 63/0227 |
| | | | 709/224 |
| 8,230,505 B1 * | 7/2012 | Ahrens | G06Q 10/02 |
| | | | 726/23 |
| 8,255,572 B1 | 8/2012 | Coomer | |
| 8,365,258 B2 | 1/2013 | Dispensa | |
| 8,489,689 B1 | 7/2013 | Sharma | |
| 8,560,962 B2 | 10/2013 | Wang | |
| 8,566,938 B1 | 10/2013 | Prakash | |
| 8,572,184 B1 | 10/2013 | Cosoi | |
| 8,583,915 B1 | 11/2013 | Huang | |
| 8,667,069 B1 | 3/2014 | Connelly | |
| 8,667,074 B1 | 3/2014 | Farkas | |
| 8,667,581 B2 * | 3/2014 | Steeves | G06F 21/56 |
| | | | 726/22 |
| 8,676,155 B2 | 3/2014 | Fan | |
| 8,719,940 B1 | 5/2014 | Higbee | |
| 8,752,172 B1 | 6/2014 | Dotan | |
| 8,769,684 B2 * | 7/2014 | Stolfo | H04L 63/1491 |
| | | | 726/23 |
| 8,813,228 B2 * | 8/2014 | Magee | H04L 63/20 |
| | | | 726/24 |
| 8,832,202 B2 | 9/2014 | Yoshioka | |
| 8,880,604 B2 | 11/2014 | Chen | |
| 8,904,524 B1 * | 12/2014 | Hodgman | G06F 21/56 |
| | | | 726/22 |
| 8,931,041 B1 * | 1/2015 | Banerjee | G06F 21/6245 |
| | | | 726/1 |
| 8,949,353 B1 | 2/2015 | Beguin | |
| 8,959,163 B1 | 2/2015 | Ledet | |
| 8,984,640 B1 | 3/2015 | Emigh | |
| 8,996,042 B1 | 3/2015 | Hannigan | |
| 9,009,829 B2 | 4/2015 | Stolfo | |
| 9,027,134 B2 | 5/2015 | Foster | |
| 9,060,057 B1 | 6/2015 | Danis | |
| 9,118,653 B2 * | 8/2015 | Nimashakavi | H04L 63/10 |
| 9,154,514 B1 | 10/2015 | Prakash | |
| 9,203,791 B1 | 12/2015 | Olomskiy | |
| 9,245,115 B1 | 1/2016 | Jakobsson | |
| 9,258,314 B1 | 2/2016 | Xiao | |
| 9,277,049 B1 | 3/2016 | Danis | |
| 9,332,022 B1 | 5/2016 | Ashley | |
| 9,338,026 B2 * | 5/2016 | Bandini | H04L 51/12 |
| 9,338,287 B1 | 5/2016 | Russo | |
| 9,471,714 B2 | 10/2016 | Iwasaki | |
| 9,473,437 B1 | 10/2016 | Jakobsson | |
| 9,491,155 B1 * | 11/2016 | Johansson | G06F 21/604 |
| 9,501,639 B2 * | 11/2016 | Stolfo | G06F 21/552 |
| 9,560,506 B2 | 1/2017 | Gudlavenkatasiva | |
| 9,602,508 B1 * | 3/2017 | Mahaffey | H04W 12/0804 |
| 9,613,341 B2 | 4/2017 | Shivakumar | |
| 9,654,492 B2 | 5/2017 | Maylor | |
| 9,747,455 B1 * | 8/2017 | McClintock | G06F 21/6227 |
| 9,781,149 B1 | 10/2017 | Himler | |
| 9,800,589 B1 | 10/2017 | Asveren | |
| 9,847,973 B1 | 12/2017 | Jakobsson | |
| 9,906,554 B2 | 2/2018 | Higbee | |
| 9,910,984 B2 * | 3/2018 | Valencia | G06N 20/00 |
| 9,940,482 B1 | 4/2018 | Nichols | |
| 10,122,715 B2 | 11/2018 | Dispensa | |
| 10,277,628 B1 | 4/2019 | Jakobsson | |
| 2002/0138271 A1 | 9/2002 | Shaw | |
| 2002/0184315 A1 | 12/2002 | Earnest | |
| 2003/0009694 A1 | 1/2003 | Wenocur | |
| 2003/0023736 A1 | 1/2003 | Abkemeier | |
| 2003/0200108 A1 | 10/2003 | Malnoe | |
| 2003/0225850 A1 | 12/2003 | Teague | |
| 2003/0229672 A1 | 12/2003 | Kohn | |
| 2003/0236845 A1 | 12/2003 | Pitsos | |
| 2004/0073617 A1 * | 4/2004 | Milliken | G06F 21/562 |
| | | | 709/206 |
| 2004/0148358 A1 | 7/2004 | Singh | |
| 2004/0176072 A1 | 9/2004 | Gellens | |
| 2004/0177120 A1 | 9/2004 | Kirsch | |
| 2004/0203589 A1 | 10/2004 | Wang | |
| 2004/0215977 A1 * | 10/2004 | Goodman | H04L 51/12 |
| | | | 726/22 |
| 2005/0021649 A1 * | 1/2005 | Goodman | H04L 51/12 |
| | | | 709/207 |
| 2005/0033810 A1 | 2/2005 | Malcolm | |
| 2005/0060643 A1 | 3/2005 | Glass | |
| 2005/0076084 A1 | 4/2005 | Loughmiller | |
| 2005/0076240 A1 | 4/2005 | Appleman | |
| 2005/0080857 A1 | 4/2005 | Kirsch | |
| 2005/0091320 A1 * | 4/2005 | Kirsch | H04L 51/12 |
| | | | 709/206 |
| 2005/0097320 A1 | 5/2005 | Golan | |
| 2005/0182735 A1 | 8/2005 | Zager | |
| 2005/0188023 A1 | 8/2005 | Doan | |
| 2005/0188045 A1 | 8/2005 | Katsikas | |
| 2005/0198173 A1 | 9/2005 | Evans | |
| 2005/0216587 A1 | 9/2005 | John | |
| 2005/0223076 A1 | 10/2005 | Barrus | |
| 2005/0235065 A1 | 10/2005 | Le | |
| 2005/0257261 A1 | 11/2005 | Shraim | |
| 2005/0283837 A1 * | 12/2005 | Olivier | G06F 21/56 |
| | | | 726/24 |
| 2006/0004772 A1 | 1/2006 | Hagan | |
| 2006/0015563 A1 | 1/2006 | Judge | |
| 2006/0018466 A1 * | 1/2006 | Adelstein | H04L 63/1491 |
| | | | 380/46 |
| 2006/0026242 A1 | 2/2006 | Kuhlmann | |
| 2006/0031306 A1 | 2/2006 | Haverkos | |
| 2006/0037075 A1 * | 2/2006 | Frattura | H04L 43/00 |
| | | | 726/22 |
| 2006/0053279 A1 | 3/2006 | Coueignoux | |
| 2006/0053490 A1 | 3/2006 | Herz | |
| 2006/0085505 A1 | 4/2006 | Gillum | |
| 2006/0101334 A1 | 5/2006 | Liao | |
| 2006/0107323 A1 | 5/2006 | McLean | |
| 2006/0149821 A1 | 7/2006 | Rajan | |
| 2006/0153380 A1 | 7/2006 | Gertner | |
| 2006/0161989 A1 * | 7/2006 | Reshef | H04L 63/1441 |
| | | | 726/26 |
| 2006/0168024 A1 | 7/2006 | Mehr | |
| 2006/0168329 A1 | 7/2006 | Tan | |
| 2006/0195542 A1 | 8/2006 | Nandhra | |
| 2006/0206713 A1 | 9/2006 | Hickman | |
| 2006/0224677 A1 | 10/2006 | Ishikawa | |
| 2006/0230461 A1 | 10/2006 | Hauser | |
| 2006/0253597 A1 | 11/2006 | Mujica | |
| 2006/0259558 A1 | 11/2006 | Yen | |
| 2006/0265498 A1 | 11/2006 | Turgeman | |
| 2006/0277259 A1 * | 12/2006 | Murphy | H04L 51/12 |
| | | | 709/206 |

(56) References Cited

U.S. PATENT DOCUMENTS

| | | | |
|---|---|---|---|
| 2006/0282660 A1* | 12/2006 | Varghese | G07F 7/1041 713/155 |
| 2007/0019235 A1 | 1/2007 | Lee | |
| 2007/0027992 A1 | 2/2007 | Judge | |
| 2007/0035390 A1 | 2/2007 | Thomas | |
| 2007/0038718 A1 | 2/2007 | Khoo | |
| 2007/0067465 A1 | 3/2007 | Blinn | |
| 2007/0078936 A1 | 4/2007 | Quinlan | |
| 2007/0079379 A1* | 4/2007 | Sprosts | G06Q 10/107 726/24 |
| 2007/0086592 A1 | 4/2007 | Ellison | |
| 2007/0100944 A1 | 5/2007 | Ford | |
| 2007/0101423 A1 | 5/2007 | Oliver | |
| 2007/0107053 A1 | 5/2007 | Shraim | |
| 2007/0130618 A1 | 6/2007 | Chen | |
| 2007/0136573 A1 | 6/2007 | Steinberg | |
| 2007/0136806 A1 | 6/2007 | Berman | |
| 2007/0143407 A1 | 6/2007 | Avritch | |
| 2007/0143432 A1 | 6/2007 | Klos | |
| 2007/0162742 A1 | 7/2007 | Song | |
| 2007/0192169 A1 | 8/2007 | Herbrich | |
| 2007/0198642 A1 | 8/2007 | Malik | |
| 2007/0208850 A1 | 9/2007 | Lin | |
| 2007/0214495 A1 | 9/2007 | Royer | |
| 2007/0239639 A1 | 10/2007 | Loughmiller | |
| 2007/0271343 A1 | 11/2007 | George | |
| 2007/0276907 A1 | 11/2007 | Maes | |
| 2007/0289018 A1* | 12/2007 | Steeves | H04L 63/1441 726/24 |
| 2007/0299916 A1 | 12/2007 | Bates | |
| 2008/0004049 A1 | 1/2008 | Yigang | |
| 2008/0022013 A1 | 1/2008 | Adelman | |
| 2008/0022107 A1 | 1/2008 | Pickles | |
| 2008/0046970 A1 | 2/2008 | Oliver | |
| 2008/0050014 A1 | 2/2008 | Bradski | |
| 2008/0098237 A1 | 4/2008 | Dung | |
| 2008/0104180 A1 | 5/2008 | Gabe | |
| 2008/0104235 A1 | 5/2008 | Oliver | |
| 2008/0141374 A1 | 6/2008 | Sidiroglou | |
| 2008/0175266 A1 | 7/2008 | Alperovitch | |
| 2008/0178288 A1 | 7/2008 | Alperovitch | |
| 2008/0235794 A1 | 9/2008 | Bogner | |
| 2008/0276315 A1 | 11/2008 | Shuster | |
| 2008/0290154 A1 | 11/2008 | Barnhardt | |
| 2009/0037350 A1 | 2/2009 | Rudat | |
| 2009/0064330 A1 | 3/2009 | Shraim | |
| 2009/0089859 A1 | 4/2009 | Cook | |
| 2009/0157708 A1* | 6/2009 | Bandini | H04L 51/12 |
| 2009/0210708 A1 | 8/2009 | Chou | |
| 2009/0228583 A1 | 9/2009 | Pocklington | |
| 2009/0252159 A1 | 10/2009 | Lawson | |
| 2009/0260064 A1 | 10/2009 | McDowell | |
| 2009/0292781 A1 | 11/2009 | Teng | |
| 2009/0319629 A1 | 12/2009 | De Guerre | |
| 2010/0005191 A1 | 1/2010 | Drako | |
| 2010/0030798 A1 | 2/2010 | Kumar | |
| 2010/0043071 A1 | 2/2010 | Wang | |
| 2010/0054443 A1 | 3/2010 | Bhattiprolu | |
| 2010/0070761 A1 | 3/2010 | Gustave | |
| 2010/0077483 A1* | 3/2010 | Stolfo | H04L 63/1466 726/24 |
| 2010/0082758 A1 | 4/2010 | Golan | |
| 2010/0094887 A1 | 4/2010 | Ye | |
| 2010/0095374 A1 | 4/2010 | Gillum | |
| 2010/0115040 A1 | 5/2010 | Sargent | |
| 2010/0145900 A1 | 6/2010 | Zheng | |
| 2010/0198928 A1 | 8/2010 | Almeida | |
| 2010/0235636 A1 | 9/2010 | Cohen | |
| 2010/0257222 A1 | 10/2010 | Hamilton, II | |
| 2010/0287246 A1 | 11/2010 | Klos | |
| 2010/0293382 A1 | 11/2010 | Hammad | |
| 2010/0299399 A1 | 11/2010 | Wanser | |
| 2010/0313253 A1 | 12/2010 | Reiss | |
| 2011/0061089 A1 | 3/2011 | O'Sullivan et al. | |
| 2011/0066687 A1 | 3/2011 | Chen | |
| 2011/0087485 A1 | 4/2011 | Maude | |
| 2011/0145152 A1 | 6/2011 | McCown | |
| 2011/0191688 A1 | 8/2011 | Hasegawa | |
| 2011/0191847 A1 | 8/2011 | Davis | |
| 2011/0214187 A1* | 9/2011 | Wittenstein | H04L 61/301 726/25 |
| 2011/0271349 A1 | 11/2011 | Kaplan | |
| 2011/0294478 A1 | 12/2011 | Trivi | |
| 2012/0030293 A1 | 2/2012 | Bobotek | |
| 2012/0084866 A1* | 4/2012 | Stolfo | H04L 63/1416 726/25 |
| 2012/0102566 A1* | 4/2012 | Vrancken | H04L 63/0807 726/20 |
| 2012/0136780 A1 | 5/2012 | El-Awady | |
| 2012/0167233 A1 | 6/2012 | Gillum | |
| 2012/0191615 A1 | 7/2012 | Schibuk | |
| 2012/0192258 A1 | 7/2012 | Spencer | |
| 2012/0204032 A1 | 8/2012 | Wilkins | |
| 2012/0204221 A1* | 8/2012 | Monjas Llorente | H04L 63/102 726/1 |
| 2012/0227104 A1 | 9/2012 | Sinha | |
| 2012/0242488 A1 | 9/2012 | Wilson | |
| 2012/0246725 A1 | 9/2012 | Osipkov | |
| 2012/0253810 A1 | 10/2012 | Sutton | |
| 2012/0278694 A1 | 11/2012 | Washio | |
| 2012/0311703 A1 | 12/2012 | Yanovsky | |
| 2013/0036455 A1* | 2/2013 | Bodi | H04L 63/0807 726/4 |
| 2013/0060905 A1 | 3/2013 | Mickens | |
| 2013/0067012 A1 | 3/2013 | Matzkel | |
| 2013/0081142 A1 | 3/2013 | McDougal | |
| 2013/0083129 A1 | 4/2013 | Thompson | |
| 2013/0086645 A1* | 4/2013 | Srinivasan | H04L 63/0815 726/4 |
| 2013/0104198 A1 | 4/2013 | Grim | |
| 2013/0128883 A1 | 5/2013 | Lawson | |
| 2013/0173712 A1* | 7/2013 | Monjas Llorente | G06Q 10/00 709/204 |
| 2013/0185775 A1 | 7/2013 | Dispensa | |
| 2013/0263226 A1* | 10/2013 | Sudia | G06F 21/60 726/4 |
| 2013/0305318 A1 | 11/2013 | Deluca | |
| 2013/0318580 A1 | 11/2013 | Gudlavenkatasiva | |
| 2013/0340079 A1 | 12/2013 | Gottlieb | |
| 2013/0346528 A1 | 12/2013 | Shinde | |
| 2014/0007238 A1* | 1/2014 | Magee | H04L 63/1408 726/24 |
| 2014/0082726 A1 | 3/2014 | Dreller | |
| 2014/0187203 A1 | 7/2014 | Bombacino | |
| 2014/0189808 A1* | 7/2014 | Mahaffey | H04L 63/0853 726/4 |
| 2014/0214895 A1 | 7/2014 | Higgins | |
| 2014/0230061 A1 | 8/2014 | Higbee | |
| 2014/0245396 A1 | 8/2014 | Oberheide | |
| 2014/0250506 A1 | 9/2014 | Hallam-Baker | |
| 2014/0258420 A1 | 9/2014 | Dent | |
| 2014/0259158 A1 | 9/2014 | Brown | |
| 2014/0317697 A1* | 10/2014 | Nimashakavi | H04L 63/10 726/4 |
| 2014/0340822 A1 | 11/2014 | Lal | |
| 2014/0366144 A1 | 12/2014 | Alperovitch | |
| 2015/0030156 A1 | 1/2015 | Perez | |
| 2015/0033343 A1 | 1/2015 | Jiang | |
| 2015/0067833 A1 | 3/2015 | Verma | |
| 2015/0081722 A1 | 3/2015 | Terada | |
| 2015/0100896 A1 | 4/2015 | Shmarovoz | |
| 2015/0113627 A1 | 4/2015 | Curtis | |
| 2015/0148006 A1 | 5/2015 | Skudlark | |
| 2015/0156154 A1 | 6/2015 | Russell | |
| 2015/0172233 A1 | 6/2015 | She | |
| 2015/0216413 A1 | 8/2015 | Soyao | |
| 2015/0236990 A1 | 8/2015 | Shan | |
| 2015/0288714 A1 | 10/2015 | Emigh | |
| 2015/0326510 A1 | 11/2015 | Tomlinson | |
| 2015/0334065 A1 | 11/2015 | Yan | |
| 2015/0363839 A1 | 12/2015 | Zolty | |
| 2015/0371212 A1 | 12/2015 | Giordano | |
| 2015/0381653 A1 | 12/2015 | Starink | |

(56) References Cited

U.S. PATENT DOCUMENTS

| | | | |
|---|---|---|---|
| 2016/0012222 A1* | 1/2016 | Stolfo | G06F 21/554 726/23 |
| 2016/0014151 A1 | 1/2016 | Prakash | |
| 2016/0037270 A1 | 2/2016 | Polinske | |
| 2016/0087925 A1 | 3/2016 | Kalavagattu | |
| 2016/0094566 A1 | 3/2016 | Parekh | |
| 2016/0104132 A1 | 4/2016 | Abbatiello | |
| 2016/0210662 A1 | 7/2016 | Duggal | |
| 2016/0225897 A1 | 8/2016 | Sridhar | |
| 2016/0269437 A1* | 9/2016 | McDougal | H04L 51/08 |
| 2016/0277485 A1 | 9/2016 | Abrams | |
| 2016/0352840 A1 | 12/2016 | Negron | |
| 2016/0359790 A1 | 12/2016 | Zhang | |
| 2017/0005961 A1 | 1/2017 | Liebmann | |
| 2017/0078321 A1 | 3/2017 | Maylor | |
| 2017/0085584 A1 | 3/2017 | Goutal | |
| 2017/0091274 A1 | 3/2017 | Guo | |
| 2017/0126661 A1* | 5/2017 | Brannon | H04L 63/0823 |
| 2017/0134423 A1* | 5/2017 | Sysman | G06F 21/554 |
| 2017/0195310 A1 | 7/2017 | Tyler | |
| 2017/0206545 A1 | 7/2017 | Gupta | |
| 2017/0223034 A1* | 8/2017 | Singh | H04L 63/1491 |
| 2017/0230323 A1 | 8/2017 | Jakobsson | |
| 2017/0251006 A1 | 8/2017 | Larosa | |
| 2017/0324767 A1 | 11/2017 | Srivastava | |
| 2017/0331816 A1 | 11/2017 | Votaw | |
| 2017/0331824 A1 | 11/2017 | Pender | |
| 2018/0041491 A1* | 2/2018 | Gupta | H04L 63/10 |
| 2018/0041515 A1* | 2/2018 | Gupta | G06F 21/53 |
| 2018/0091453 A1* | 3/2018 | Jakobsson | H04L 51/12 |
| 2018/0097841 A1 | 4/2018 | Stolarz | |
| 2018/0131686 A1* | 5/2018 | Brannon | H04L 63/12 |
| 2018/0160387 A1 | 6/2018 | Chastain | |
| 2018/0184289 A1 | 6/2018 | Dudley | |
| 2018/0343246 A1* | 11/2018 | Benayed | G06F 21/62 |
| 2019/0012478 A1* | 1/2019 | Narayanaswamy | H04L 63/0281 |
| 2019/0095498 A1* | 3/2019 | Srinivasan | G06F 16/2457 |
| 2019/0095516 A1* | 3/2019 | Srinivasan | G06F 16/288 |
| 2019/0306237 A1* | 10/2019 | Srinivasan | G06F 16/27 |
| 2020/0067861 A1* | 2/2020 | Leddy | G06F 21/6245 |
| 2020/0076817 A1* | 3/2020 | Gupta | G06F 21/41 |
| 2020/0244638 A1* | 7/2020 | Gupta | G06F 9/50 |
| 2020/0264860 A1* | 8/2020 | Srinivasan | G06F 16/27 |
| 2020/0265062 A1* | 8/2020 | Srinivasan | H04L 67/1095 |

OTHER PUBLICATIONS

Search Query Report from IP.com (performed Jan. 6, 2020) (Year: 2020).*
Search Query Report from IP.com (performed Apr. 8, 2021) (Year: 2021).*
Entrust: "Strong Multifactor Authentication Methods from Entrust IdentityGuard," https://web.archive.org/web/20110825101942/http://www.entrust.com/strong-authentication/authenticators.htm. Aug. 25, 2011.
Entrust: Mobile Authentication and Transaction Verification1,2,3, https://web.archive.org/web/20110814071521/http://www.entrust.com/mobile-security. Aug. 14, 2011.
Entrust: Proven Transaction Verification on Smartphones & Mobile Devices—Entrust,https://web.archive.org/web/20110918231205/http://www.entrust.com/transaction-verification/index.htm. Sep. 18, 2011.
Entrust: WP_Securing_Whats_At_Risk_Jul. 8, https://web.archive.org/web/20110809104408/http://download.entrust.com/resources/download.cfm/22313/. Aug. 9, 2011.
ESphinx: ("Cyota launches new authentication platform for online banking," https://web.archive.org/web/20050508152420/http://www.cyota.com/news.asp?id=173. May 8, 2005.
ESphinx: "Cyota and Quova Reducing Online Fraud with Cyota's eVision Technology," https://web.archive.org/web/20060307092523/http://www.cyota.com/press-releases.asp?id=81. Mar. 7, 2006.
ESphinx: "Cyota eSphinx," https://web.archive.org/web/20051214102438/http://www.cyota.com/product_7.asp. Dec. 14, 2020.
ESphinx: Cyota releases eSphinx online authentication package, https://web.archive.org/web/20050508152435/http://www.cyota.com/news.asp?id=170. May 8, 2005.
ESphinx: "How Does it Work?"; https://web.archive.org/web/20051210112946/http://www.cyota.com/product_7_19.asp. Dec. 10, 2005.
ESphinx: "Key Features," https://web.archive.org/web/20051210114904/http://www.cyota.com/product_7_18.asp. Dec. 10, 2005.
Green Armor: Dec. 8, 2005 Press Release: "Green Armor Solutions™ Introduces Identity Cues Two Factor™"; http://www.greenarmor.com/Green_Armor Solutions_News-2005-12-07.shtml.
Green Armor: Green Armor Solutions "Identity Cues Products"; https://web.archive.org/web/20060110032814/http:/www.greenarmor.com/products.shtml. Jan. 10, 2006.
Green Armor: Green Armor Solutions "Identity Cues Two Factor™ & Two Way Authentication"; https://web.archive.org/web/20060209211113/http:/www.greenarmor.com/DataSheets/Identity%20Cues%20Two%20Factor%20Data%20Sheet.pdf. Feb. 9, 2006.
Kim et al., Context Information-based application access central model, IMCOM '16: Proceedings of the 10th International Conference on Ubiquitous Information Management and Communication. Jan. 2016, Article No. 75, PP1-5 (Year: 2016).
Robinson et al., Caching Context Information in Persvasive System, MDS '06: Proceedings of the 3rd International Middleware doctoral Symposium. Nov. 2006, pp. 1 (Year 2006).
RSA 7035_CONPRO_SB_0711: "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.
RSA 9697_AATF_SB_0808: "RSA Adaptive Authentication overview solution brief"; https://web.archive.org/web/20101225124323/http://www.rsa.com/products/consumer/sb/9697_AATF_SB_0808.pdf. Dec. 25, 2010.
RSA AAAM_SB_0208: "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.
Toopher: https://web.archive.org/web/20120430105502/http://toopher.com/. Apr. 30, 2012.
Toopher: Toopher Developer Documentation; https://web.archive.org/web/20120523192419/https://www.toopher.com/developers.html. May 23, 2012.
U.S. Appl. No. 61/551,370, filed Oct. 25, 2011.
A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.
Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.
Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.
Author Unknown, "BABASTIK: AntiSpam Personal", downloaded from "https://web.archive.org/web/20101031061734/babastik.com/AntiSpam-Personal/", Oct. 31, 2010.
Author Unknown, "bluebottle—trusted delivery", downloaded from "https://web.archive.org/web/20140715223712/https://bluebottle.com/trusted-delivery.php", Jul. 15, 2014.
Author Unknown, "Federal Court Denies Attempt by Mailblocks, Inc. To Shut Down Spamarrest LLC", downloaded from "http://www.spamarrest.com/pr/releases/20030611.jsp", Seattle, WA, Jun. 11, 2003.
Author Unknown, "First of all, Your Software Is Excellent", downloaded from "https://web.archive.org/web/20120182074130/http://www.spamresearchcenter.com/", Aug. 12, 2012.

(56) References Cited

OTHER PUBLICATIONS

Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http:/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034(https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software.html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, CAPTCHA: Telling Humans and Computers Apart Automatically, downloaded from "https://web.archive.org/web/20160124075223/http:/www.captcha.net/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.
Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.
Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/products/how-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.
Author Unknown, Kens Spam Filter 1.40, downloaded from "https://web.archive.org/web/200803171134558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/secure/", Nov. 9, 2013.
Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, PermitMail, Products: The most advanced email firewall available for your business, downloaded from "https://web.archive.org/web/20160219151855/http://ipermitmail.com/products/", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge and Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http:/smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.
Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, SPAM Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.

(56) References Cited

OTHER PUBLICATIONS

Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.
Author Unknown, SPAMjadoo: Ultimate Spam Protection, downloaded from "https://web.archive.org/web/20140512000636/http:/www.spamjadoo.com:80/esp-explained.htm" May 12, 2014.
Author Unknown, SpamKilling, "What is AntiSpam?", downloaded from "https://web.archive.org/web/20100411141933/http:/www.spamkilling.com:80/home_html.htm", Apr. 11, 2010.
Author Unknown, SpamRestraint.com: How does it work?, downloaded from "https://web.archive.org/web/20050206071926/http:/www.spamrestraint.com:80/moreinfo.html", Feb. 6, 2005.
Author Unknown, Tagged Message Delivery Agent (TMDA), downloaded from "http://web.archive.org/web/20160122072207/http:/www.tmda.net/", Jan. 22, 2016.
Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.
Author Unknown, V@nquishLabs, How it Works: Features, downloaded from "https://web.archive.org/web/20081015072416/http://vanquish.com/features/features_how_it_works.shtml", Oct. 15, 2008.
Author Unknown, What is Auto Spam Killer, downloaded from "https://web.archive.org./web/20090215025157/http://knockmail.com:80/support/descriptionask.html", Feb. 15, 2009.
Author Unknown, White List Email (WLE), downloaded from "https://web.archive.org/web/20150912154811/http:/www.rfc1149.net/devel/wle.html", Sep. 12, 2015.
Bjorn Markus Jakobsson, U.S. Appl. No. 14/487,989 entitled "Detecting Phishing Attempts" filed Sep. 16, 2014.
Bjorn Markus Jakobsson, U.S. Appl. No. 14/535,064 entitled "Validating Automatic Number Identification Data" filed Nov. 6, 2014.
Bjorn Markus Jakobsson, U.S. Appl. No. 15/235,058 entitled "Tertiary Classification of Communications", filed Aug. 11, 2016.
Bjorn Markus Jakobsson, U.S. Appl. No. 15/414,489, entitled "Detection of Business Email Compromise", filed Jan. 24, 2017.
Brad Templeton, "Proper principles for Challenge/Response anti-spam systems", downloaded from "http://web.archive.org/web/2015090608593/http://www.templetons.com/brad/spam/challengeresponse.html", Sep. 6, 2015.
Danny Sleator, "BLOWBACK: A Spam Blocking System", downlaoded from "https://web.archive.org/web/20150910031444/http://www.cs.cmu.edu/~sleator/blowback", Sep. 10, 2015.
David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.

Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.
Jakobsson et al., U.S. Appl. No. 15/453,737 entitled "Mitigating Communication Risk by Detecting Similarity to a Trusted Message Contact" filed Mar. 8, 2017.
Jakobsson et al., U.S. Appl. No. 15/453,741 entitled "Mitigating Communication Risk by Verifying a Sender of a Message" filed Mar. 8, 2017.
James Thornton, "Challenge/Response at the SMTP Level", downloaded from "https://web.archive.org/web/20140215111642/http://original.jamesthornton.com/writing/challenge-response-at-smtp-level.html", Feb. 15, 2014.
Karsten M. Self, "Challenge-Response Anti-Spam Systems Considered Harmful", downloaded from "ftp://linuxmafia.com/faq/Mail/challenge-response.html", last updated Dec. 29, 2003.
Leddy et al., U.S. Appl. No. 14/963,116 entitled "Scam Evaluation System" filed Dec. 8, 2015.
M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.
Marco Paganini, Active Spam Killer, "How It Works", downloaded from "https://web.archive.org/web/20150616133020/http:/a-s-k.sourceforge.net:80/howitworks.html", Jun. 16, 2015.
Park et al., "Scambaiter: Understanding Targeted Nigerian Scams on Craigslist", published in Network and Distributed System Security Symposium (NDSS), 2014.
Peter Simons, "mapSoN 3.x User's Manual", downloaded from "https://web.archive.org/web/20140626054320/http:/mapson.sourceforge.net/", Jun. 26, 2014.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
Ronald L. Rivest, "RSF Quickstart Guide", Sep. 1, 2004.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.
NIST. Usability of Security. http://csrc.nist.gov/security-usability/HTML/research.html. May 1, 2015.
Adrian E. McElligott, "A Security pass for messages: message keys", CEAS '11: Proceedings of the 8th Annual Collaboration, Electronic messaging, Anti-abuse and Spam Conference. pp. 184-192 (Year: 2011).
Akin et al., "Efficient hardware implementations of high throughput SHA-3 candidates keccak, luffa and blue midnight wish for single- and multi-message hashing", SIN '10: Proceedings of the 3rd international conference on security of information and network. pp. 168-177 (Year: 2010).
Binkley et al., "Improving identifier informativeness using part of speech information", MSR '11: Proceedings of the 8th Working Conference on Mining Software Repositories. May 2011, pp. 203-206. (Year: 2011).
Heinermann et al., "Recommending API methods based on identifier contexts", Suite '11: Proceedings of the 3rd Inernational Workshop on Search-Driven Development: Users, Infrastructure, Tools, and Evaluation. May 2011, pp. 1-4. (Year: 2011).
Laszka et al., "Integrity assurance in resource-bounded systems through stochastic message authentication", HotSoS '15: Proceedings of the 2015 Symposium and Bootcamp on the Science of security. Apr. 2015, Article No. 1, pp. 1-12. https://doi.org/ (Year: 2015).
Peterson et al. "Authenticated Identity Management in the Session Initiation Protocol (SIP)". Jul. 15, 2013. https://www.ietf.org/archive/id/draft-jennings-dispatch-rfc4474bis-01.txt.
Peterson et al. "Authenticated Identity Management in the Session Initiation Protocol (SIP)". May 29, 2013. https://datatracker.ietf.org/doc/draft-jennings-dispatch-rfc4474bis/00/.

(56) References Cited

OTHER PUBLICATIONS

Tyagi et al., "Traceback for End-to-End Encrypted Messaging" CCS '19: Proceeding of 2019 ACM SIGSAC Conference on Computer and Communications Security. pp. 4134-4430 (Year: 2019).

* cited by examiner

Markus Jakobsson <mjakobsson@agari.com>
To: ppeterson14014@yahoo.com
Reply-To: noreply@agari.com
Automated response - your message has been quarantined Today at 1:50 PM  (MJ)

Hi Patrick Peterson,

You recently sent a message to Markus Jakobsson <mjakobsson@agari.com>. The message has been placed in quarantine.

It is possible that you normally communicate with Markus Jakobsson <mjakobsson@agari.com> using another email address that is whitelisted by the security system.
If you think that is so, then here is what you must do to also whitelist your email address ppeterson14014@yahoo.com 1. Forward this message in its entirety to the email address you normally use to communicate with Markus Jakobsson <mjakobsson@agari.com>.
2. Log in to that email account, find your forwarded message, and forward it again to whitelist@agari.com from that account.
3. You will then receive a confirmation email, and your message will be removed from quarantine and delivered.
4. You will only have to do this once for this email account, and not for each email you send.

Thanks, and have a good day!
The Agari Team

Security code GF686L88.

> Carmen Glenn        August 7, 2017 at 7:42 AM (CG)
> Incident:3731275636211:398 Corkery, LLC
> To: gloria@europeantechniques.com,
> Reply-To: Carmen Glenn
>
> Dear Gloria Rodriguez.
> This email message has been automatically sent to you because we have got a complaint, claiming that your company Corkery, LLC is violating the The Safety and Health Act.
>
> You can download the document with the explanation of compliant by following the url: https://goo.gl/tnWyuv
>
> We also request that you give a answer within 48 hours to us. This response should contain info about what you plan to do with it.
>
> Important note:
> When replying to us, please keep the abuse ID "Incident:3731275636211:398" native in the subject.
>
> Better Business Bureau
> Compliance Department

FIG. 16

Received: from DM5PR08CA0048.namprd08.prod.outlook.com (10.164.143.37) by
 CY4PR08MB3591.namprd08.prod.outlook.com (10.171.254.30) with Microsoft SMTP
 Server (Version=TLS1_2, cipher=TLS_ECDHE_RSA_WITH_AES_256_CBC_SHA384_P256) id
 15.1.1320.16; Mon, 7 Aug 2017 14:42:11 +0000
Received: from NAM03-DM3-obe.outbound.protection.outlook.com ([104.47.41.206])
    by p3plibsmtp03-09.prod.phx3.secureserver.net with bizsmtp
    id uEiN1v0064SszL801EiNGE; Mon, 07 Aug 2017 07:42:23 -0700
Received: from BL2FF011FD029.protection.gbl (2a01:111:f400:7c09::108) by
 DM5PR08CA0048.outlook.office365.com (2603:10b6:4:60::37) with Microsoft SMTP
 Server (version=TLS1_2, cipher=TLS_ECDHE_RSA_WITH_AES_256_CBC_SHA384_P256) id
 15.1.1320.16 via Frontend Transport; Mon, 7 Aug 2017 14:42:11 +0000
Received: from PC (172.29.12.4) by VSEXCHHUB02.SENA.RED (172.29.13.169) with
 Microsoft SMTP Server (TLS) id 14.3.279.2; Mon, 7 Aug 2017 09:39:23 -0500
Received: from mail.sena.edu.co (181.49.188.164) by
 BL2FF011FD029.mail.protection.outlook.com (10.173.160.69) with Microsoft SMTP
 Server (version=TLS1_0, cipher=TLS_ECDHE_RSA_WITH_AES_256_CBC_SHA_P384) id
 15.1.1304.16 via Frontend Transport; Mon, 7 Aug 2017 14:42:10 +0000
Received: from unknown (HELO p3plibsmtp03-09.prod.phx3.secureserver.net) ([68.178.213.117])
        (envelope-sender <phoyos@sena.edu.co>)
        by p3plsmtp05-01-25.prod.phx3.secureserver.net (gmail-1.03) with SMTP
        for <gloria@europeantechniques.com>; 7 Aug 2017 14:42:43 -0000
Received: (gmail 7233 invoked by uid 30297); 7 Aug 2017 14:42:23 -0000
From: Carmen Glenn <phoyos@sena.edu.co>
To: "gloria@europeantechniques.com" <gloria@europeantechniques.com>
Subject: Incident:3731275636211:398 Corkery, LLC
Thread-Topic: Incident:3731275636211:398 Corkery, LLC
Thread-Index: AdMPi2E6YmoagsbTRju0o+sZ1ynjGw==
Date: Mon, 7 Aug 2017 14:39:31 +0000
Message-ID: <c11004a4-5e1a-4871-bcde-e9e7c555eb23@VSEXCHHUB02.SENA.RED>
Reply-To: Carmen Glenn <site@bbb.compliant.com>
X-MS-Has-Attach:
X-MS-TNEF-Correlator:
X-MS-Exchange-Organization-RecordReviewCfmType: 0
x-mailer: Kmail 1
Content-Type: text/plain; charset="utf-8"
Content-ID: <B228AB80B813C9439EB5A7964387221E@namprd12.prod.outlook.com>
Content-Transfer-Encoding: base64
MIME-Version: 1.0

FIG. 17

RGVhciBHbG9yaWEgUm9kcmlndWV6Lg0KVGhpcyBlbWFpbCBtZXNzYWdlIGhhcyBiZWVuIGF1dG9t
YXRpY2FsbHkgc2VudCB0byB5b3UgYmVjYXVzZSB3ZSBoYXZlIGdvdCBhIGNvbXBsYWludCwgY2xh
aW1pbmcgdGhhdCB5b3VyIGNvbXBhbnkgQ29ya2VyeSwgTExDIGlzIHZpb2xhdGluZyB0aGUgVGhl
IFNhZmV0eSBhbmQgSGVhbHRoIEFjdC4NCg0KWW91IGNhbiBkb3dubG9hZCB0aGUgZG9jdW1lbnQg
d2l0aCB0aGUgZXhwbGFuYXRpb24gb2YgY29tcGxpYW50IGJ5IGZvbGxvd2luZyB0aGUgdXJs01Ag
aHR0cHM6Ly9nb28uZ2wvdG5yXV2DQoNCldlIGFsc28gcmVxdWVzdCB0aGF0IHlvdSBnaXZlIGEg
YW5zd2VyIHdpdGhpbiA0OCBob3VycyB0byB1cy4gVGhpcyByZXNwb25zZSBzaG91bGQgY29udGFp
biBpbmZvIGFib3V0IHdoYXQgew91IHBsYW4gdG8gZG8gd2l0aCBpdC4NCg0KSW1wb3J0YW50IG5v
dGU6DQpYaGVuIHJlcGx5aW5nIHRvIHVzLCBwbGVhc2Uga2VlcCB0aGUgYWJ1c2UgSUQgIkluY2lk
ZW50OjM3MzEyNzU2MzYyMTE6Mzk4IibuYXRpdmUgaW4gdGhlIHN1YmplY3QgLg0KDQpCZXR0ZXIg
QnVzaW5lc3MgQnVyZWF1DQpDb21wbGhbm5IIERlcGFydG1lbnQNCg==

FIG. 17 Cont.

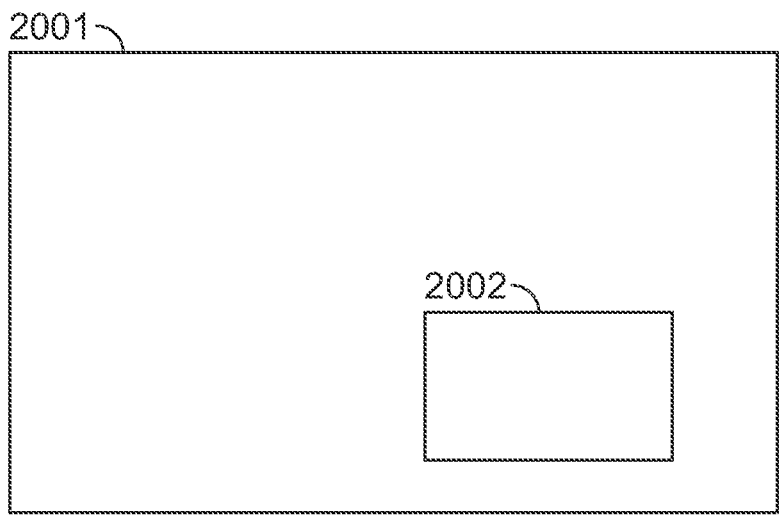
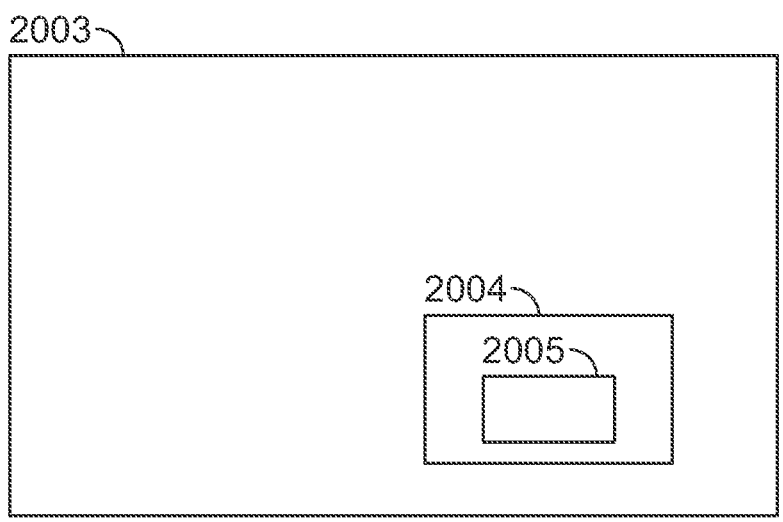
FIG. 20

AUTOMATED INTELLIGENCE GATHERING

CROSS REFERENCE TO OTHER APPLICATIONS

This application claims priority to U.S. Provisional Patent Application No. 62/516,535 entitled AUTOMATED INTELLIGENCE GATHERING filed Jun. 7, 2017 which is incorporated herein by reference for all purposes.

This application claims priority to U.S. Provisional Patent Application No. 62/543,801 entitled GENERATION OF FLASH SIGNATURES FOR DEFENSE AGAINST TARGETED ATTACKS filed Aug. 10, 2017 which is incorporated herein by reference for all purposes.

BACKGROUND OF THE INVENTION

There are many ways in which computer hackers and scammers deceive potential victims via email. Many of these ways involve assuming an identity of a party the potential victim trusts. This may be an individual, such as a friend or a colleague, or it may be a brand, whether one that the potential victim has a relationship with or simply knows of as trustworthy. Many organizations defend themselves by identifying risky emails and blocking them. However, that only temporarily deflects the problem, and does not always protect their users or organizations in the long run. This is because the cost for attackers to try again is so low, and a persistent attacker is likely to succeed in getting at least one email delivered by trying many different techniques if at least one of the countermeasures is heuristic or has a known or unknown blind spot. It is beneficial to identify, block, and quarantine dangerous messages. It is even more beneficial, however, to also deter attacks before they occur.

BRIEF DESCRIPTION OF THE DRAWINGS

Various embodiments of the invention are disclosed in the following detailed description and the accompanying drawings.

FIG. 14B shows an example of an automatic reply message requesting verification of an identity of the sender of the message.

FIG. 16 shows an example malicious email.

FIG. 17 shows example headers of the example malicious email.

FIG. 20 is a block diagram illustrating an example of a message that includes a potentially executable or otherwise risky attachment.

DETAILED DESCRIPTION

Figure 1:
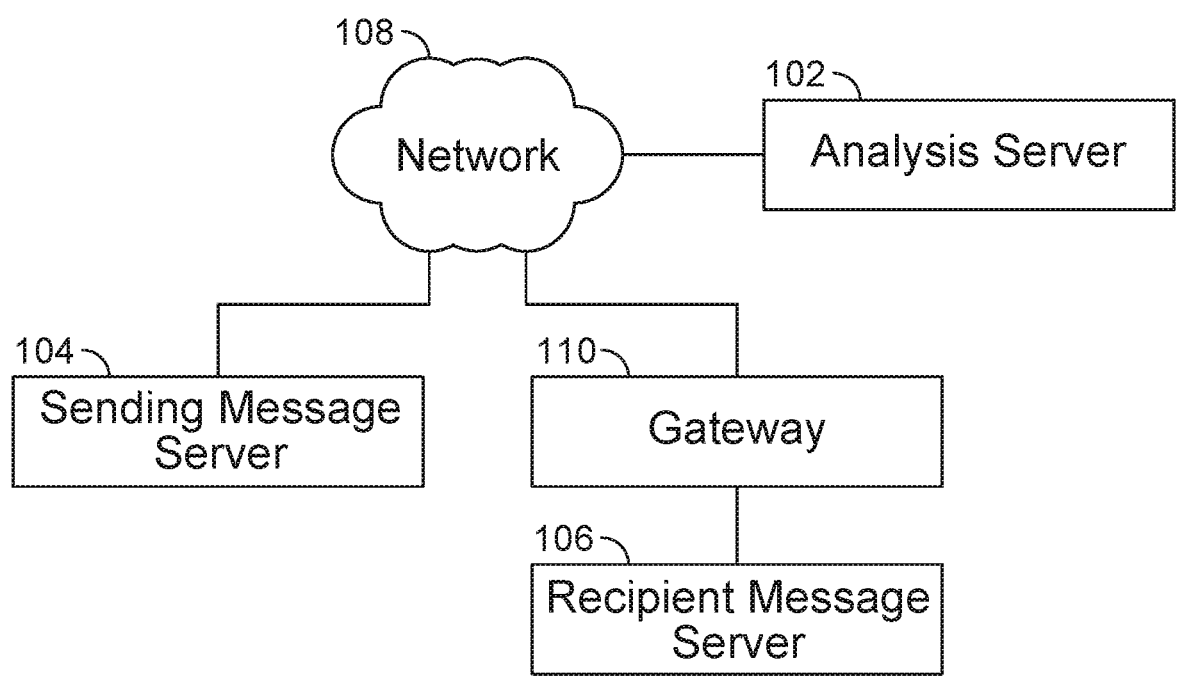
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An email honeypot is a construction that collects unwanted and malicious emails. Traditional honeypots are passive constructions that do not interact with attackers. In some embodiments, vital account information is collected from attackers and used for purposes of takedown. In some embodiments, attackers and potential attackers are notified that a potential target is protected by a system that will attempt to collect vital account information from attackers and used for purposes of takedown. Such notifications are useful to dissuade would-be attackers from launching attacks.

A desirable way to defend an organization and their users is to (1) cause a notable cost to the attacker and (2) notify the attacker of the cost to the attacker, to make sure that the attacker understands the connection between attacking the organization and suffering from the consequences. By penalizing attackers and making the link between attack and penalty clear, a security system improves the security provided beyond just filtering dangerous messages.

In some embodiments, access to a message account of an attacker is achieved by taking advantage of the initial attack attempt of the attacker. When a message sent from an attacker to a recipient is received, a security risk associated with the message is determined. If there is sufficient risk detected to determine that the message is likely a malicious message, access to the message account of the attacker is attempted to be gained. A responsive message is sent in response to the message from the attacker. For example, the responsive message includes a reference (e.g., URL) to a content likely desired to be accessed by the attacker to entice the attacker to open the message and access the content via the reference. When the attacker requests the content of the reference, access to a message repository of the attacker is requested as a condition of obtaining the content of the reference. Because the attacker is likely eager to obtain the content of the reference, the attacker likely will allow access to the message repository of the attacker. Then, with access to the attacker's message repository, information about the attacker can be investigated and gathered. Using this information, the attacker can be penalized (e.g., reported to law enforcement authorities).

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is the last server that handled a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and filters it for potentially harmful or undesired messages. For example, incoming messages are filtered and analyzed for spam, viruses, spoofing, impersonation, ATOed sender, and any other harmful or undesired content to detect, prevent, or minimize such messages from reaching a message recipient served by the recipient message server. In some embodiments, analysis server 102 determines and/or maintains a list of trusted contacts for one or more users (e.g., user accounts) of recipient message server 106. For example, by obtaining an address book from a user and/or observing message traffic to and from server 106 of the user, server 102 determines and/or maintains a list for each user.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message in the event a potential threat is detected. In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

In some embodiments, recipient message server 106 performs a risk analysis for an incoming message at least in part by performing an authenticity and/or reputation analysis to determine an overall measure of risk (e.g., risk score). Performing authenticity analysis may include determining a measure of confidence that a sender identified in the message (e.g., domain of sender) is the actual sender of the message. Performing reputation analysis may include determining a measure that an identified sender of the email (e.g., domain of sender) is likely to send a message that is of value to a recipient (e.g., likelihood of sending message that a recipient would want/desire to receive).

In some embodiments, a risk analysis performed by recipient message server 106 results in a risk value of a message. The risk value may be utilized at least in part to flag/label the message, modify the message (e.g., add warning), and/or to determine whether to allow the message to be delivered to an intended recipient of the message.

In some embodiments, based on a risk analysis performed by analysis server 102, gateway 110, message server 106, and/or any other server (not shown in FIG. 1) connected to network 108 for a received message, it is determined whether to attempt to gain access to a message repository of the sender of the message. For example, if it is determined with sufficient certainty that a received message to be delivered to an intended recipient is a malicious message that meets one or more criteria (e.g., the message is identified with sufficient certainty to be a phishing attempt, a known scam, etc.), access to a message account of the sender/attacker is achieved by taking advantage of the initial attack attempt message of the sender. A responsive message is sent in response to the message from the attacker. The message may be at least in part automatically generated and sent by analysis server 102, gateway 110, message server 106, and/or any other security server. The generated message includes a reference (e.g., URL) to a content likely desired to be accessed by the attacker, enticing the attacker to open the message and access the content via the reference. For example, a link identified as leading to monetary transfer confirmation, payment redemption instruction, password information, etc. is included in the message. The reference may actually lead to a web content (e.g., webpage made to appear as a landing page that will eventually provide access to desired content) provided by analysis server 102, gateway 110, recipient message server 106, and/or any other server or security service. When the attacker requests the content of the reference, access to a message repository of the attacker is requested as a condition of obtaining the content of the reference. For example, an OAuth request to access a message repository of the attacker is presented to the attacker. Because the attacker is likely eager to obtain the content of the reference, the attacker likely will allow access to the message repository of the attacker. Then, with access to the attacker's message repository, information about the attacker can be investigated and gathered. Using this information, the attacker can be penalized (e.g., report generated and provided to law enforcement authorities).

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2A:
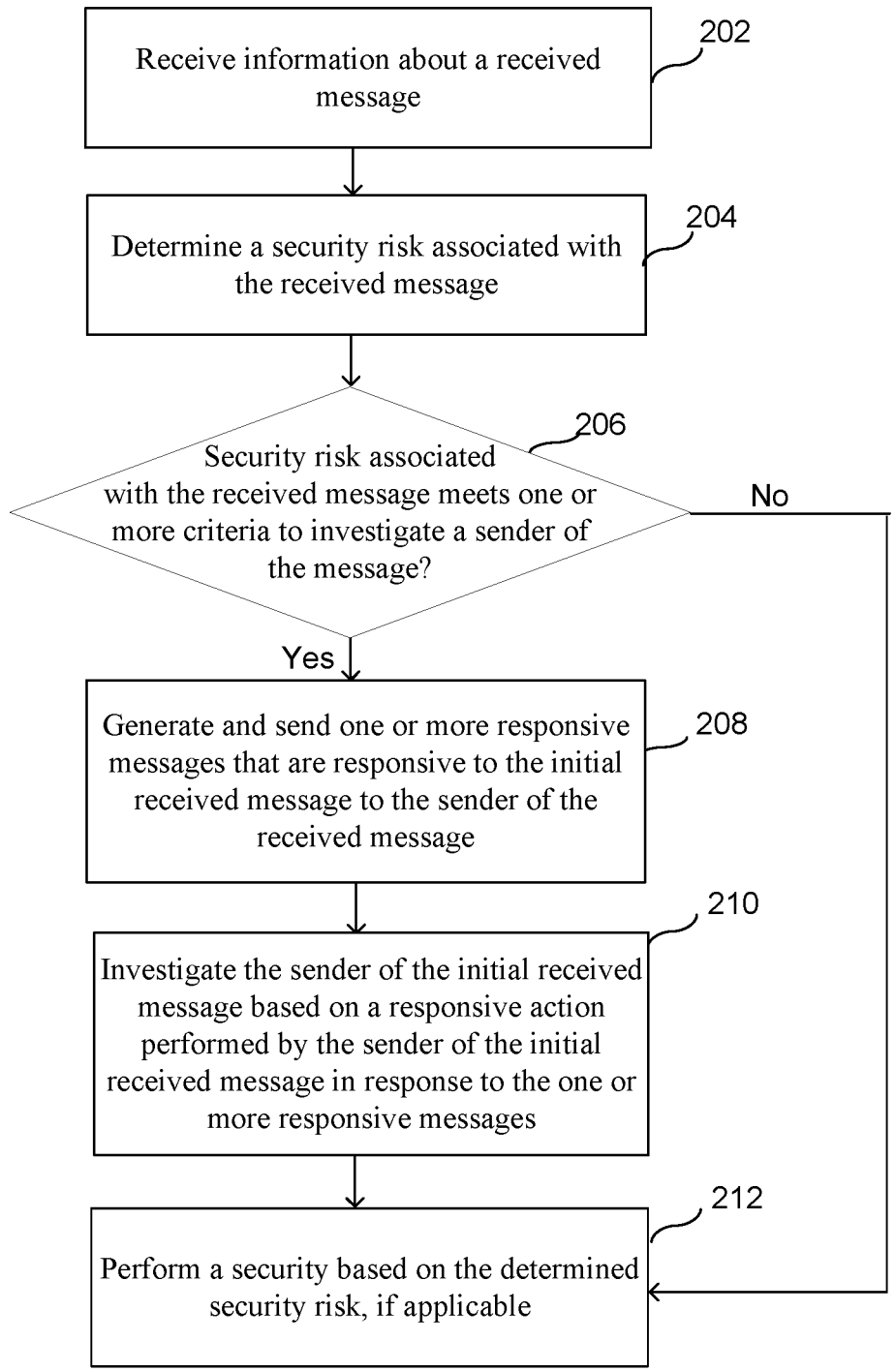
FIG. 2A is a flowchart illustrating an embodiment of a process for determining whether to investigate a sender of a message.

FIG. 2A is a flowchart illustrating an embodiment of a process for determining whether to investigate a sender of a message. At least a portion of the process of FIG. 2A may be at least in part implemented on analysis server 102 of FIG. 1, gateway 110 of FIG. 1, message server 106 of FIG. 1, and/or any other server.

At 202, information about a received message (e.g., message to be delivered to an intended recipient) is received. In some embodiments, the information is received at analysis server 102 of FIG. 1. The information may include information included in or related to the message. For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 204, a security risk associated with the received message is determined. For example, using the received message information, one or more security risk scores are calculated and/or one or more security risk rules/criteria are evaluated. Each different component of security risk may be associated with a determined score or a range of scores, and a combination score be computed from one or more risk scores.

In some embodiments, determining the security risk includes determining whether the received message is a deceptive message, where a message is considered potentially deceptive if it comes from a party that is not trusted by the system, but which uses a display name or other identifying information that matches the identifying information of a party that is trusted by the system. Trust may be established in an automated manner by processing historical message traffic to and from the organization to be protected, historical documents processed by the organization to be protected, organizational charts for the organization to be protected, and contact lists of users in the organization to be protected. However, an alternative is for an administrator or external entity to provide a whitelist containing identifying information of entities to be trusted. Such identifying information may comprise display names, email addresses, and known aliases, where an alias is another display name or email address associated with or used by the entity. Security risk may also be identified by detecting attempts to spoof a user or organization. For example, this can be determined using Domain-based Message Authentication, Reporting and Conformance (DMARC), Sender Policy Framework (SPF), or DomainKeys Identified Mail (DKIM) or by methods that log historical server and IP information associated with a user or organization, and that detect discrepancies.

In some embodiments, determining the security risk includes automatically analyzing domain names to detect likely look-alike domains. This may involve computing the edit distance between a suspect domain and a target domain, identifying whether the suspect domain is recently registered, associated with an unknown entity, or associated with a registrar other than what the target domain would have used. That, in combination with display name information, as described, can be used to establish a higher than normal risk. Additionally, automated scrutiny of message contents can be used to establish risk. For example, if an email contains terms associated with risk, such as "W-2," "invoice," or "acquisition," this is an indicator of risk. In some embodiments, combinations of risk indicators may be used. For example, by identifying risky content coming from a newly registered domain with a high-risk display name, a very high certainty of risk can be established.

At 206, it is determined whether the determined security risk associated with the received message meets one or more criteria to investigate a sender of the message. In some embodiments, if a security risk score (e.g., total security risk score or a selected component score) exceeds a first threshold, then the received message is considered sufficiently risky to take a defensive action by investigating the sender of the message. In some embodiments, if the risk score exceeds a second threshold that is lower than the first threshold, then a defensive action may be taken conditional on some other verification of risk (e.g., a component score meeting a threshold, one or more other criteria met, etc.).

In some embodiments, it is determined that the determined security risk associated with the received message meets one or more criteria to investigate the sender of the message if one or more specified risks have been identified. For example, if it is determined that the received message is from a sender not trusted by the system and uses a display name or other identifying information that matches the identifying information of a party that is trusted by the system, it is determined to investigate the sender of the received message. In another example, if a domain of the sender is detected as a look-alike domain, it is determined to investigate the sender of the received message. In another example, if the message includes one or more identified malicious content, it is determined to investigate the sender of the received message. If none of the one or more criteria is met, it is determined to not investigate the sender of the message. Thus in various embodiments, the one or more criteria used to determine whether to investigate the sender of the message may be based on any of the security risk analysis and detection techniques described herein. For example, once the received message is identified with sufficient certainty as a malicious attack, it is determined to investigate the attacker (e.g., sender of the received message).

If at 206, it is determined that the determined security risk associated with the received message does not meet the one or more criteria to investigate the sender of the message, the process proceeds to 212.

If at 206, it is determined that the determined security risk associated with the received message does meet the one or more criteria to investigate the sender of the received message, at 208, one or more responsive messages that are responsive to the initial received message are generated and sent to the sender of the received message. For example, the responsive message has been at least in part automatically generated to include content responsive to content included in the initially received message from the sender and is automatically sent to the sender. The responsive message may include a content reference (e.g., URL) identified as referring to a content for the recipient of the responsive message. For example, the responsive message includes a content reference that is identified as referencing a content that is likely desired to be accessed by the attacker to entice the attacker to open the message and access the content via the reference. The content reference may be included in body with associated descriptive text identifying an apparent target content or included as an attachment that utilizes the content reference. In various embodiments, the content reference may be identified as referring to a content for the recipient of the responsive message via a descriptive text, an anchor text, message content text, and/or by a virtue of being included in the responsive message to the recipient.

When the attacker requests the content of the reference, access to a message repository of the attacker is requested as a condition of obtaining the identified content of the reference. Because the attacker is likely eager to obtain the content of the reference, the attacker likely will allow access to the message repository of the attacker. Then, with access to the attacker's message repository, information about the attacker can be investigated and gathered.

In some embodiments, access to the apparent target content of the content reference is allowed. For example, automatically generated dummy content that appears to be the final content desired to be accessed by an attacker via the content reference is provided. By providing the dummy content, the attacker is less likely to be suspicious of the content reference and continue to allow access to the message account/repository of the attacker while an investigation is performed. This also encouraged the attacker to interact with similar future content references. The dummy content may appear to be legitimate content (e.g., appears to be a real fund transfer receipt due to formatting and overall look matching a legitimate example) and be personalized/customized for the parties involved (e.g., includes personal information of the message parties) but in fact may include false information (e.g., false account number) to prevent harm as a result of the dummy message.

In some embodiments, the responsive message appears to be from the intended victim/recipient of the initial received message and/or another sender related to the intended victim. A message account/address from which to send the responsive message in response to the received message is selected. In some embodiments, the sender message account/address is the recipient of the initial received message. The responsive message can be sent in a manner that does not require the involvement of the user or recipient of the received message (e.g., the attacked account), and any email on the same message thread may be automatically responded to by the system, without involving the user of the attacked account. In one embodiment, the emails on this thread would not be visible to the user of the attacked account, but would either be placed in a quarantine, in a folder corresponding to automated traffic, or not stored at all in a manner that is accessible to a user. For example, the messages of the thread could be stored in a repository only accessible by the security system or an administrator (e.g., to avoid confusing the owner of the attacked account of the initial received message).

In some embodiments, the responsive message refers the sender of the initial received message (i.e., recipient of the responsive message) to a third party, who may be fictional but appears real to the sender of the initial received message, and where any messages sent to this third party would be associated with the attack, stored by the system, and automatically responded to by the system. The third party account may be a honeypot account that is attended by the system, and messages responded to automatically. Two different attackers can be referred to two different honeypot accounts to simplify tracking, or the system can determine what message belongs to what conversation based on at least one of the thread, a signature element or other conversation-specific content of the message, or by separating conversations based on the account identity of the attacker.

In another embodiment, a honeypot account is generated or configured based on the identity of the attacked party (e.g., recipient of initial received message), and a message is sent to the attacker (e.g., sender of the initial received message) from this honeypot account, potentially referring to the initial message sent by the attacker to the intended victim. For example, the initial message from the honeypot account could use the same thread as the initial message from the attacker to the intended victim, the same or similar subject line, or incorporate at least portions of the content on the message from the attacker to the intended victim. In the latter case, this incorporation may appear as a user response to an email, e.g., using indentation of the cited portions. Alternatively, the initial message from the honeypot account to the attacker could simply contain information that is likely to encourage the attacker to continue the conversation, such as a request for additional information or a request for clarification. The identity information of the honeypot account may be configured to match the identity information of the intended victim to some extent, e.g., by using the same or similar display names. The domain of the honeypot account may be a domain selected from a plurality of domains used specifically by the system for honeypot accounts, and may be similar to the domain of the attacked user. In one embodiment, the display name and the domain name of the honeypot account both match the display and domain name of the intended victim (e.g., recipient of the initial received message), but the user name of the account is different. Alternatively, the domain may be that of a web email service provider, such as Yahoo mail, Hotmail, or Gmail. The account may be one from a large collection of honeypot accounts used by the system, and may simply be configured by setting the display name to match the intended victim. Alternatively, it may be a different display name altogether, but the subject line or thread information is the same as that in the initial attack email (e.g., initial received message).

In some embodiments, once responsive message has been automatically generated and sent to the sender of the initial received message (e.g., the attacker), a response from the attacker is expected. Once a subsequent message (e.g., in response to the responsive message) or action is detected/received from the attacker, the action/message is analyzed to extract useful contextual information and used to select or generate further responses to the attacker. For example, a system would identify and extract vital account information sent by the attacker. The selection or generation of automated responses can be done using artificial intelligence (e.g., conversational AI agents). The responses may be stateful and take prior messages into consideration. In some embodiments, responses matching keywords in the messages sent by the attackers are generated/selected.

For example, if an attacker asks for help to complete a task, the response could be to ask for more information about what the attacker would like to achieve. If the attacker asks for W-2 information, the system would generate or select a file with correctly formatted data that would appear like credible W-2 data to an attacker. Such files could also contain tracking beacons. If the attacker asks for an invoice to be paid, but does not attach a document, an automated system could ask the attacker to send the invoice again. Multiple rounds of interaction can be performed. The system may continue to interact until the attacker stops responding, a counter-attack is performed, or sufficient data is extracted to perform a security action.

In some embodiments, each response generated by the system contains at least one tracking beacon, which could be a zero-sized pixel, a logo, or other image with a unique name, or attachments or URLs that permit tracking using macros, cookies, or other such technology. In some embodiments, mail user agent (i.e., MUA) information is recorded for each message received by attackers, and stores all the obtained tracking information in a profile associated with the attacker, and with the attack. Additional tracking information may comprise IP information, server name information, DKIM signature information, and other information associated with the sending devices used by the attacker. This allows a system to identify when two attacks are likely to correspond to the same attacker or not, and whether there is likely to be multiple users associated with one attacker account. This can be determined by identifying multiple MUAs of a similar type (e.g., all being phones) or multiple IP addresses or service providers/carriers used to transmit the messages from the attacker, or access web resources used for the tracking of the attacker.

The message interaction with the attacker can follow human-written scripts, where a system may scan for keywords in incoming messages from the attacker, evaluate these using a scoring algorithm that uses keyword matching, and automatically select the scripted response with the best fit with respect to the scores and keywords matched. This script-selection approach can be combined with techniques that modify the script by substituting words with synonyms, perform minor modifications of grammar or style to these, or otherwise add signatures or attachments that are generated by an algorithm that uses randomization to generate new elements, such as addresses, phone numbers, names, social security numbers, and similar. In various embodiments, techniques utilized to engage in communications with attackers may vary depending on detected type of security risk/attack. For example, in the case of BEC vs. romance scam, the response to attackers may vary. By dynamically adjusting responses based on a detected type of risk/attack, engagement with the attackers is tailored to better adapt to different scenarios.

In some embodiments, in order to reduce the risk of the attacker identifying that he or she is interacting with an automated system, the responsive message is generated and/or sent in a manner that introduces a variable factor. In some embodiments, different delays are utilized between receipt of an email by the system and the automated response by the system. The responses may take place during regular office hours only, with a random distribution resembling regular responses by users. For example, the system may generate a response within approximately five minutes of receipt with a 10% probability, within an hour with a 50% probability, and within a day with a 90% probability. Thus, the response time can be selected according to a time distribution, according to the regular hours of the business under attack. Furthermore, the probability of detection by the attacker is reduced by making sure that the automated responses do not always look the same, or even look the same given the same or similar input from the attacker, but that the responses would depend on a random component. For example, words in the response can be replaced by synonym words according to a probability distribution matching the use of these words in English language, where this probability distribution can be obtained from an N-gram database or inferred from tabulating a large number of email messages processed by the system. Similarly, as will be understood by a person skilled in the art, multiple response formats can be used, wherein the format used is selected based on a random input. Moreover, the responses can be generated in multiple different ways. In one embodiment, the response to the attacker is one of a spoofed email, a message sent from a personal webmail account with a display name set to match the attacked person's account name, and from the attacked person's actual email account—although submitted by the automated conversation engine of the disclosed security system. A system may vary the manner of response in response to different attacks, but may maintain the same response manner for a multiplicity of responses, in response to one attack. However, as described, it may be desirable to convey to an attacker that he has attacked a defended entity by notifying the attacker of this. This notification may be performed after vital account information has been collected by the system and a take-down process initiated. In some cases, this notification is not instantaneous. For example, after the system has received one bank account identifier from an attacker, it may generate a response to the effect that this bank account has a problem, requesting an alternative bank account from the attacker. This can be done at the same time as a take-down effort is initiated. If the attacker responds with a second bank account, the same thing may be done again, and the cycle repeated until the attacker does not respond, after which a notification is generated to the attacker, clarifying that he has attacked a protected entity.

At 210, the sender of the initial received message is investigated based on a responsive action performed by the sender of the initial received message in response to the one or more responsive messages.

In some embodiments, the one or more responsive messages are an attempt to gain access to a message account of the attacker (e.g., sender of initial received message). This can be done in a variety of ways. One way is to send from the honeypot account to the attacker account an email that contains a URL that leads to a page that requests the attacker to grant OAuth access to his or her email account, or other messaging account. If the attacker grants access to the webpage controlled by the security system, then the system is able to read all incoming and outgoing emails from and to the attacker's messaging account. The security system then identifies peers of the attacker with whom the attacker interacts.

The security system may further attempt to coerce the peer account holder to give the system OAuth access to his or her account, after which the security system scrutinizes the contents of that email account and identifies peers of that account. These can then be automatically interacted with. The security system can also scan the email messages sent to or from the account of the attacker, looking for apparent passwords, and automatically verifying whether these are valid. The security system can further use methods relating to phishing to gain credentials from the attackers and his or her peers. Once access to the message account of the recipient of the responsive message is obtained, vital account information can be obtained. Take-down requests then can be automatically generated for one or more of these vital accounts.

The security system can further scan the messages sent to and from accounts of criminals that have allowed the security system access to his or her messages, identifying messages with malware attachments. Such malware instances can be replaced with flawed versions, with versions with backdoors, with versions that call home to the security system, and with versions that corrupt stolen information, in a way that may be not immediately detectable to the attacker. This way, the security system can reduce the yield of the attacker, track his or her illegitimate activities, protect end users, introduce tracking information, and more.

At 212, a security is performed based on the determined security risk, if applicable. In some embodiments, in 204, one or more security risk scores are determined and based on these score(s), a security action is selected among different security action options. The selected security action is performed. For example, a security risk score may indicate that the message is of very low risk (e.g., risk score is below a first threshold) and the message is fully allowed to be accessed by the intended recipient (e.g., allow the message to a message inbox of the intended recipient). If not, the security risk score may indicate that the message is of medium risk (e.g., risk score is above the first threshold but below a second threshold) and the message is modified to include a warning prior to being allowed to be accessed by the intended recipient (e.g., allow the modified message to a message inbox of the intended recipient). Otherwise, the security risk score may indicate that the message is of high risk (e.g., risk score is above the second threshold) and the message not allowed to be accessed by the intended recipient (e.g., send the message to an administrator for further analysis). If there exists a different security risk score for different types of security risks, each different type of score may be analyzed separately and/or analyzed in combination to determine which level, if any, of security action is to be performed.

Examples of the security action (e.g., selected from the list based on a risk score and/or specific type of threat or information detected in the message) include the following: sending a message to the sender to determine whether it automatically forwards responses; generating a security challenge sent to the sender (e.g., if this is not responded to, it is indicative of higher risk and if it is responded to in an anomalous manner, that is also indicative of higher risk); generating a challenge sent to an alternative account of the sender (e.g., another email address associated with the sender); sending an SMS message to a phone number associated with the sender; placing an automated call to a phone number associated with the sender (e.g., requesting a confirmation or a response from the user associated with the account the security challenge is sent to); performing additional automated scrutiny of the message (e.g., including its content portion); performing additional manual scrutiny of the message (e.g., including its content portion); quarantining the message; blocking the message; delivering the message; augmenting the message to reduce the risk associated with it (e.g., modifying its attachments); analyzing attachments of the message by attempting to execute them in a sandbox or virtual machine; adding a warning to the message prior to allowing the message to be accessed by the intended recipient; and moving the message to a special folder identifying its higher risk.

In some embodiments, a software component is introduced at a protected sender side, the software component encoding information in a header element for recipients to observe. By letting the information be a function of a key that is shared between the sender side and the observer side, a message authentication code can be implemented. Alternatively, asymmetric cryptography such as digital signatures can be used for the authentication, as can streamed authentication methods such as TESLA or other hash chain constructions. The authenticated data may be an empty field, a portion of the message, a counter, data relating to the transmission time, and information about the context of the message creations, such as the IP address from which the message was submitted. It is desirable that the data is encrypted or that obfuscation methods are used; alternatively, proprietary formats can be used to complicate decoding by an unauthorized observer.

Attackers gaining access to email accounts typically perform searches to identify high-value contacts, e.g., by searching the mailbox for keywords indicating financial services, high-profile connections, and more. If a company wishing to limit the damage associated with the corruption of the accounts and machines of external associates were able to send messages that "self destruct," the damages associated with the corruption may be mitigated. One example of achieving self-destructing emails includes replacing message content with a hyperlink. The outgoing mail server can automatically identify high-risk emails (based on content, recipient, and internal policies) and rewrite the content with a hyperlink that, when clicked, would give the recipient access to the content. This access can be controlled; it can be limited in terms of time after receipt (e.g., 3 days), it can require a password or other authenticating action, it can be conditional on an action not yet having been observed (e.g., no response has been received to this email yet), etc.

Another example of achieving self-destructing emails includes placing an email representing one or more archived messages in a special folder. If the associated account is controlled by the security service provider, received emails can be archived in a password-only storage after some time. This can be implemented by placing an email representing one or more archived messages in a special folder, the email having a hyperlink leading to a password-protected server giving full access to all archived emails. (The password protected server can limit access based on volume, IP address, etc.) There can be a policy determining what messages get auto-archived, based on sender, content, and other indicators. The auto-archiving feature can depend on having observed a high-risk action, e.g., a user opening a risky email, following a link, and entering a text (which may be a password), or accessing the mailbox from an unknown computer.

In some embodiments, each identified security risk and/or attack instance is classified according to an attack classification describing the nature of the attack according to a threat taxonomy. In addition, tracking of the attack may be performed to identify the location and computer technology of the attacker for each attack, and uses cookies, cache cookies, user agent, flash cookies, and other identifiers to determine what attacks are performed by what attackers. Likely influences between groups can be identified based on proximity of location, similarity of techniques, and similar trends in behavior. This helps determine what groups or subgroups are influencers, which helps prioritize countermeasures against these groups. The threat can be classified in terms of the attack techniques, for example, by determining whether the attacker uses spoofing, as indicated by discrepancies in the SPF records, IP addresses, or server names; whether the attacker uses display name deception; whether the attacker uses look-alike attacks; and to whom the domain used was registered to, whether it was done using a stolen credit card, etc. The threat is further classified in terms of whether it contains a URL, and if so, what kind (phishing, malware, advertisement, etc.); what the domain is; whether the domain is an impersonating domain, such as payypal.com; whom the domain is registered to, etc. Furthermore, the threat is classified in terms of whether it has an attachment, and if so, what kind (e.g., zip file, pdf, word document), and whether it has malware, payment instructions, etc. The threat is further classified in terms of the language of the text, whether the message uses a cascading style sheet template of a legitimate company; whether it contains spelling errors; whether the grammar is incorrect; whether the text appears to be translated from another language, e.g., using Google Translate, and whether the text bears strong resemblance to other previously observed texts. This resemblance is one of a string distance measure, a measure of overlap of uncommon words according to TF-IDF or similar measures, whether the texts both contain an unusual phrase, and similar. Based on these and related measures, the attacks are classified and clustered. Different subsequent attacks associated with the same attacker or suspected group can be investigated as a function of time as it relates to the change of methods or absence thereof; potential influences, including likely collaboration or copy-cat attacks; and other similarities or differences. These are also used to tie-break clustering efforts aimed at determining what attacks should be attributed to what groups, and what groups are the most prominent threats.

The disclosed technology is also compatible with clustering methods. The classifications and clusterings are used for the purposes of determining whom to send take-down requests and law enforcement requests to, how to prioritize these requests, etc. They can also be used to identify what groups or attackers to infiltrate or otherwise corrupt to reduce the impact of the attacker's efforts.

A further benefit of the disclosed technology is that it enables the detection of attacker patterns, including temporal patterns, victim selection patterns, and methods and tricks used by various attackers and groups of attackers. This enables a predictive analysis of likely future attacks that, in turn, helps prioritize take-down efforts, the deployment or prioritization of other security measures and their roll-out, and which helps determine the assessed financial benefit associated with blocking the activities of each attacker or group of attackers, based on their estimated reach, attack volume, likely success based on the type of attack tools used, and other measurements, thereby helping organizations and law enforcements determine the size of the threat and whether it increases or decreases. Furthermore, by classifying the threat in terms of the functional goals of the attackers helps cluster and prioritize countermeasures. Examples of such functional goals include but are not limited to advance fee attacks, romance scams, business email compromise attacks, ransomware attacks, and more. These can be classified based on identification of terms indicative of each type of attack, e.g., "Western Union" (commonly associated with advance fee attacks), scripted love letters with great similarity between multiple instances (commonly associated with "romance scams"), and so on. They can also be classified based on the apparent target of the attack and the context of the attack; for example, a business email compromise attack typically involves the impersonation of one c-level executive to another c-level executive. They can also be classified based on potential payload (e.g., ransomware attacks commonly are associated with an executable attachment or an encrypted zipfile containing an executable file).

In various embodiments, attacks can be classified based on a taxonomy of abuse, such as the following example taxonomy:

The type of identity deception used:

a. Legitimate user -- no identity deception. (This could still be a malicious email, or spam -- but it is not using identity deception.)
b. Spoofing
c. Look-alike domain
  i. Type 1: Looks a lot like the impersonated domain (such as paypal.com)

-continued

The type of identity deception used:

ii. Type 2: Generic, to be used with subdomain (such as paypal.secure-pay.com)
    iii. Type 3: Generic, to be used without subdomain (such as office-of-ceo.com)
d. Display name deception
e. ATO
    i. The compromise was based on the password of the launchpad user being stolen
    ii. The compromise was based on OAuth opt-in of the launchpad user
    iii. The compromise is of the computer of the launchpad user
    iv. The compromise is of a computer managing email for the launchpad user The technical classification of the payload:

a. The payload comprises a URL
    i. The URL goes to a phi shing website
    ii. The URL goes to a malware-installing website
    iii. The URL goes to an advertising site
b. The payload comprises an attachment
    i. The attachment is executable
        1. A traditional executable
        2. A macro
    ii. The attachment is a zip file
        1. The zip file is encrypted
    iii. The attachment is a document with user instructions (e.g., payment instructions or modified invoices)
c. The payload comprises user instructions (e.g., BEC attack)

Figure 2B:
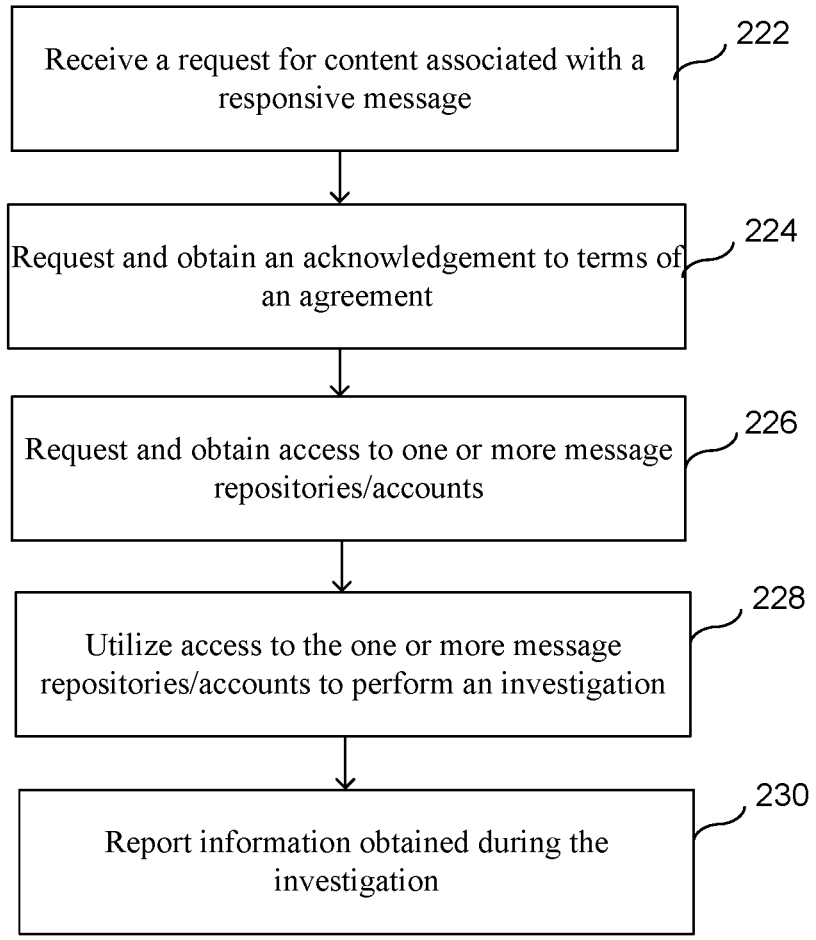
FIG. 2B is a flowchart illustrating an embodiment of a process for investigating a sender of a malicious message.

FIG. 2B is a flowchart illustrating an embodiment of a process for investigating a sender of a malicious message. At least a portion of the process of FIG. 2B may be at least in part implemented on analysis server 102 of FIG. 1, gateway 110 of FIG. 1, message server 106 of FIG. 1, and/or any other server. In some embodiments, at least a portion of the process of FIG. 2B is performed in 210 of FIG. 2A.

At 222, a request for content associated with a responsive message is received. For example, the responsive message is the responsive message sent in 208 of FIG. 2A that is in response to the initial received message of 202. The request for content may be a HTTP/network content request received at a webserver in response to a recipient of the responsive investigative message selecting a reference/link in the responsive message. Other examples of the request include opening a message attachment that makes the request, loading network content referenced in the responsive message, and any other content request associated with the responsive message.

In an attempt to gain access to messaging accounts of the attacker that sent the received malicious message (e.g., recipient of the responsive investigative message), the responsive message is sent (e.g., from a honeypot account) to the attacker account and includes a content reference (e.g., hyperlink, URL, etc.) that when selected or otherwise utilized to make a request, a network request is made and received at 222.

The content reference is identified in the responsive message as a link to access an apparent target content desired to be accessed by the attacker, enticing the attacker to open the message and access the content via the reference. For example, a link identified as leading to monetary transfer confirmation, payment redemption instructions, password information, etc. is included in the message. The reference may actually lead to a web content (e.g., webpage made to appear as a landing page that will eventually provide access to desired content) provided by analysis server 102, gateway 110, recipient message server 106, and/or any other server or security service.

At 224, an acknowledgement to terms of an agreement is requested and obtained. For example, when the attacker requests the content of the reference, access to a message repository of the attacker is requested as a condition of obtaining the apparent target content of the reference (e.g., content desired to be accessed by the attacker via the reference). To ensure that accessing a message account of the recipient of the responsive message and/or reporting associated information is not against the law, a terms/disclaimer requesting authorization is provided. Agreement to these terms/disclaimer is provided as a condition for proceeding (e.g., to obtain the desired content). For example, a webpage provides an End User License Agreement (EULA) request authorization to obtain/utilize the access credentials (e.g., passwords, reset questions, or OAuth credentials) for one or more specified uses (e.g., to prevent fraud or crimes). The user may indicate agreement and authorization by providing a digital authorization (e.g., select checkbox, select button, etc.).

At 226, access to one or more message repositories/accounts is requested and obtained. For example, once a user (e.g., recipient of the responsive message) has agreed to the agreement, the user is provided a request for access to one or more message repositories/accounts of the user. The user is provided a webpage that requests the attacker to grant access (e.g., OAuth access) to his or her email account, or other messaging account. Because the attacker is likely eager to obtain the content of the reference, the attacker likely will allow access to the message repository of the attacker. In some embodiments, once access to the one or more message repositories/accounts is obtained (e.g., access to email box obtained), access to desired apparent target content is provided. For example, automatically generated dummy content that appears to be the final content desired to be accessed by an attacker via the content reference is provided. By providing the dummy content, the attacker is less likely to be suspicious of the content reference and continue to allow access to the message account/repository of the attacker while an investigation is performed. This also encouraged the attacker to interact with similar future content references. The dummy content may appear to be legitimate content (e.g., appears to be a real fund transfer receipt due to formatting and overall look matching a legitimate example) and be personalized/customized for the parties involved (e.g., includes personal information of the message parties) but in fact may include false information (e.g., false account number) to prevent harm as a result of the dummy message.

At 228, access to the one or more message repositories/accounts is utilized to perform an investigation. For example, with access to the attacker's message repository, information about the sender of the malicious message (e.g., attacker) can be investigated and gathered.

If the attacker grants access, a security system is able to read all incoming and outgoing emails from and to the attacker's messaging account. The security system is then able to identify peers of the attacker with whom the attacker interacts. This identification may be performed by identifying the flow of stolen account data, exploit data, or other victim related data, such as address lists. If such data has been exchanged between the attacker and one other account—the "peer account," then the system may configure a new honeypot and start sending traffic to the peer account. This honeypot can be configured to appear like the attacker, e.g., have the same display name as the attacker, and send messages similar to those exchanged between the attacker and the peer account. Alternatively, the system can use the attacker's account, to which it has access, to send messages to the peer account. When the peer account responds to any such system-originated messages, this is detected, since the response message will use the same thread. Any such response will be hidden from the attacker, and responded to by the security system. This means that the security system now uses the account of the attacker as a honeypot to collect information from the peer account. The system may replace, add, or augment files and messages sent between the two accounts to add fake user data that is helpful for tracking purposes. The security system may further attempt to coerce the peer account holder to give the system OAuth access to his or her account, after which the security system scrutinizes the contents of that email account and identifies peers of that account. These can then be automatically interacted with. The security system can also scan the email messages sent to or from the account of a criminal, looking for apparent passwords, and automatically verifying whether these are valid. The security system can further use methods relating to phishing to gain credentials from the attackers and their peers.

A security system can further scan the messages sent to and from accounts of criminals that have allowed the security system access to his or her messages, identifying messages with malware attachments. Such malware instances can be replaced with flawed versions, with versions with backdoors, with versions that call home to the security system, and with versions that corrupt stolen information, in a way that may be not immediately detectable to the attacker. This way, the security system can reduce the yield of the attacker, track his or her illegitimate activities, protect end users, introduce tracking information, and more. The modified malware can be sent to peers. The security system will avoid sending messages to contacts of the criminal that cannot be determined also to be criminals, or will only send benevolent messages used to determine whether the peer indeed is a criminal. The messages sent from the accounts of criminals or from honeypots configured to look like accounts of criminals may be generated or selected from scripts according to an automated algorithm that takes into consideration the messages between the attacker and the peer account. Administrators of the security service may produce scripts based on such contents, where these scripts can be used by automated algorithms that select scripts and make suitable modifications and personalizations. For example, these modifications may be to mimic the greetings used by the attacker and the peer, or to use matching signature files, when honeypot accounts are used. These greetings can be automatically extracted from messages in the accessible mailboxes of the criminals.

In some embodiments, keyboard timings or other usage pattern information is detected from the attacker (e.g., in order to enable the recognition of repeat users of one or more devices, and the distinction of two different users of the same device). For example, using JavaScript on a provided webpage, entered information is detected. It may not matter whether the attacker enters information correctly or not. For example, assume an attacker is located in London, and is requested to enter information about his location as a confirmation to gain access to a file, and say that the attacker enters "Amsterdam." Assume further that the name of the attacker is John Nielsen, but he enters the name "Patrick Peterson" in a form. The system detects the timings of the keystrokes, both for keys pressed and keys released, and identifies patterns of use. For example, one user may always release the "A" key approximately 10 ms before pressing the "M" key when writing an "A" followed by an "M," whereas another user may depress the "M" before releasing the "A" when writing the same letter sequence. Yet another user may type some letter combinations very quickly in a phone keyboard, but very slowly on the keyboard of a regular computer. This timing action is commonly a result of the size and dexterity of the hands of the user, and of the user's familiarity with the keyboard in question. It is also a matter of typing style. As a result, from recording a few keystrokes from an unwitting attacker, it is possible to biometrically identify or distinguish this user, given a set of candidate users. This is helpful to determine the number of users associated with a device, and the number of devices associated with a user, which both help identify the size of a criminal group. Moreover, such information can be used in some jurisdictions as evidence in court.

At 230, information obtained during the investigation is reported. For example, the information about the attacker is gathered and automatically reported to enforcement authorities and/or to generate take-down requests.

Vital account information can be extracted with access to the message account of the attacker. A security system can obtain information sent to the honeypot accounts and sent to or from the messaging accounts of criminals who have given access to their accounts to the security service. This approach allows the security system to map out the network of the attacker, obtain email account data, obtain bank account information, obtain other vital information such as names and addresses of mules, and obtain personal information, including names, phone numbers, and addresses of criminals. Such vital information may be automatically reported to law enforcement agency, appropriate financial institutions, email service providers, and other security services, in order to disrupt the activities of the attacker and his or her peers. Vital account information is detected by comparing text in emails to templates. Examples of templates include a series of words that include the word "bank," followed by a number of the length of a bank account, a routing number, or other bank account identifier such as SWIFT codes. Another example of a template is an apparent email account, the word "password," "pwd," or similar, and a string with the format of a potential password, e.g., a combination of letters and digits, of length between 6 and 20 characters. These, of course, are only examples of templates, and a person skilled in the art will understand that there are multiple useful templates for each type of data. Once a match is made with a template, the associated data can be automatically tested, as in the case of an email account, or forwarded to a human operator that will review the material before it is being used for take-down. Take-down may involve filing a complaint to the appropriate authority, performing a DDoS attack, or attempting to take over the account, as in the case of email accounts. As an email account is taken over, its contents are parsed and potential peer accounts identified. The account that is taken over may then be used as a honeypot account, and vital account information scanned for. In one embodiment, traditional Data Leak Prevention(DLP) techniques and tools are used to identify vital account information.

In some embodiments, the generation and reporting of take-down requests is at least in part automated. In one embodiment, the system outputs lists of vital account information, along with its associated context, for an administrator to classify, verify, and forward to the appropriate authorities. In another embodiment, the system provides notifications to admins, with information relating to vital account information that has already been classified by the system, and with associated context either contained in the notification, or with hyperlinks or other record indicators associated with records containing the context. One classification may simply be the type of vital account information, e.g., email accounts or bank accounts. Another classification may be the assessed urgency to take down the account, which may be assessed based on indications of whether the account belongs to a large criminal operation or not, and whether there are lots of potential victims associated with the vital account information or not. This helps prioritize take-down efforts. Yet another classification may be an indication of the assessed jurisdiction associated with the vital account information, e.g., whether the criminal is in the US, the UK, Nigeria, or China. A further classification is the nature of the account, e.g., whether it is assessed to be a mule account, an account used by the criminal, an account used to coordinate several criminals, etc. Based on the information, including the classifications, the administrator may determine how to best process the information. In another embodiment, rules are set up for what admin to notify, based on the classifications. For example, a bank account belonging to a Dutch bank may cause the selection of three administrators, one associated with the Bank, one associated with the Dutch law enforcement, and one associated with a general admin associated with the operation of the security system. This may be supported with contextual information such as email messages or parts of email messages.

The system may automatically redact portions that are not needed for the recipient of the notification, or replace with a general description such as "A residential address in Denmark," or "A phone number in Ghana," or "A bank account with a Hong Kong bank." The same attack may also result in messages sent to email service providers, DNS hosts, etc. There, the email accounts would be shown, but the email content may be irrelevant, and may be replaced by general descriptions such as "This is a mule account," or "The recipient of the email is likely to be a victim of a romance scam, and the attacker which is the sender of the email is blackmailing the mule to facilitate a transfer of funds via Western Union." The system can generate these descriptions from a template of common components. Instead of notifications, it is also possible to provide API access to collaborators, allowing these to review information. This can also be combined with notifications, e.g., "There are three new email accounts to be taken down," and with redaction based on the roles of different users, and their organizations. This would be managed similar to the personalized redactions for the notifications described above. Further, the system may facilitate the use of common collaborative sharing tools, such as Google Docs, wherein the system has write access to the document, and where some consumers of data have only read access whereas others may also have write access, e.g., to provide feedback such as how many other accounts were registered to the same party. Alternatively, this feedback loop can be created by the recipients of the vital account data sending feedback to the security system, which then uses the feedback to update records and pursue further searches using the data received in the feedback.

In some embodiments, the recipient of the responsive message (e.g., attacker) is notified of the counter-attack on the attacker's resources, and identifies the reason for these counter-attacks to be mounted. At least some of the vital account information that has been collected may be used for communication purposes with the attacker, e.g., phone numbers, email addresses, Facebook account names, skype user names, and postal addresses. Messages can be sent to such accounts (e.g., to discourage future attacks). Messages can also be sent to bank accounts. For example, the security system can send a $1 wire to a bank account, with a message. The message would be part of the payment instructions. The message can also be part of the sender information. The message sent may include a clarification of why the attacker will be penalized, without going into specific details of the technology used to detect their attempt to abuse. For example, the message may be "You attacked ACME Co. Your bank accounts will now be locked down." or "ACME Corp is protected by Agari. Agari fights back." In addition, the attacker may be given an opportunity to look up results. For example, the message may contain the text "ACME Corp is protected, as shown at fightback.pro/acmecorp. Do not attack companies enrolled in FightBack™." Such messages can be sent to one or more of the addresses associated with an attacker. It can be sent from honeypot accounts, it can be sent from accounts associated with the security system, it can be sent from a domain registered to manage notifications, e.g., from "take-down.notification@fightback.pro," and it can be sent from corrupted accounts of peers. The security service can send messages from accounts that it controls or has gained control to, but can also spoof messages from the accounts of other attackers who have not been compromised, in order to create an appearance that these accounts are controlled by the security service. If these accounts cannot be spoofed due to use of DMARC, then collaboration with the email service providers of the recipients of the notification messages can be used to circumvent DMARC for the delivery of such messages. The notification messages are used to create an association between the attack and the take-down.

Figure 2C:
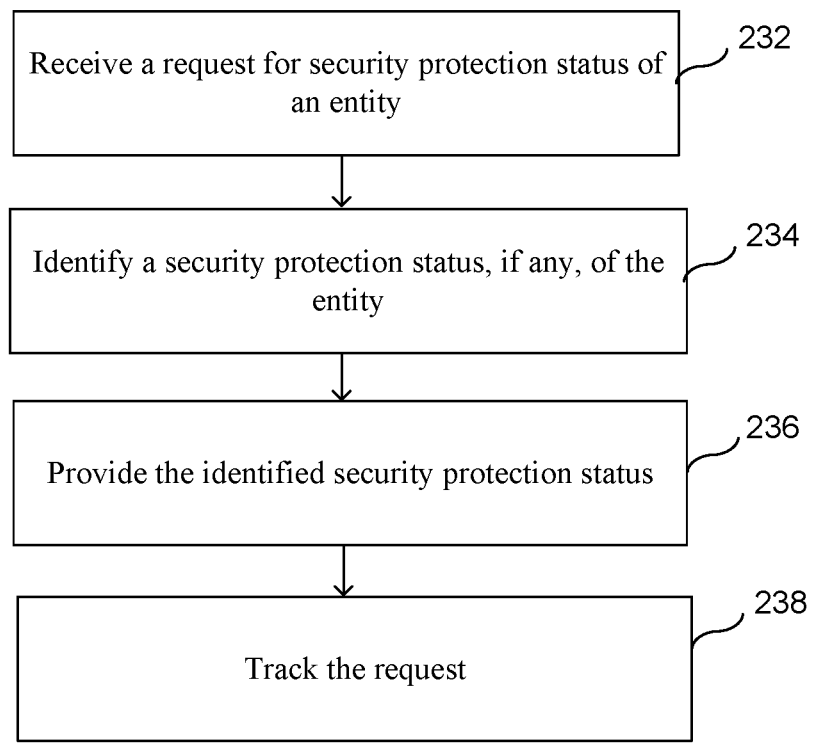
FIG. 2C is a flowchart illustrating an embodiment of a process for providing security protection status information.

FIG. 2C is a flowchart illustrating an embodiment of a process for providing security protection status information. At least a portion of the process of FIG. 2C may be at least in part implemented on analysis server 102 of FIG. 1, gateway 110 of FIG. 1, message server 106 of FIG. 1, and/or any other server.

At 232, a request for security protection status of an entity is received. For example, the request is received via a webpage that provides information on whether a particular entity has subscribed to a security service described in association with the processes of FIGS. 2A and 2B. This allows a potential attacker to verify whether a user is protected by the defensive technology. For example, from a previous attack, the attacker may have been provided a message such as "ACME Corp is protected, as shown at fightback.pro/acmecorp—Do not attack companies enrolled in FightBack™." When the attacker visits the site fightback.

pro/acmecorp, then this site may describe to the attacker that ACME Corp is enrolled in the security service. Some attackers may realize that by modifying the URL, they can verify whether other companies are also protected. For example, the attacker may want to verify whether Company2 is protected by visiting "fightback.pro/company2." If they are told that Company2 is protected, they are unlikely to want to attack Company2, as this is likely to mean that they would lose additional vital accounts. This feature will serve to encourage legitimate companies to enroll. Enrolling would lower a company's cybersecurity insurance premiums, as they would become less likely to be attacked in the first place, but also less likely to suffer a loss if they are attacked, given that attacks will be detected and deflected.

At 234, security protection status, if any, of the entity is identified. For example, using a database lookup, security services subscribed by the identified entity are identified.

At 236, the identified security protection status is provided. For example, identification of the security protection status is provided via a webpage and/or a message sent to an email or IP address associated with the party performing the request.

At 238, the request is tracked. For example, as the potential attacker visits a site where the request was provided, information relating to the visit, e.g., IP address, user agent, cookies, etc. is collected. A system may attempt to detect repeat visitors, and correlate the identifying information to identifying information associated with attack emails, attack SMSes, etc. (e.g., attack messages also carry identifying information). Some parts of the mail user agent (MUA) are also likely to be reflected in the user agent, for example, such as charsets, operating system versions, etc. There would also be a likely correspondence in IP addresses. This information is added to the profiles of attackers, which are associated with the attacks performed by this attacker. These records may contain collections of user information associated with one or more attacks, permitting the system to build databases over attacker groups. For example, when a party that is matched to an existing group visits "fightback.pro/company2," then Company2 may receive a notification that somebody was interested in attacking them. A system may maintain statistics over the frequency of lookups for companies, whether protected or not, as a function of time. This permits the system to offer early warnings to organizations, whether protected or not. These early warnings are helpful for security administrators to be aware of.

Figure 2D:
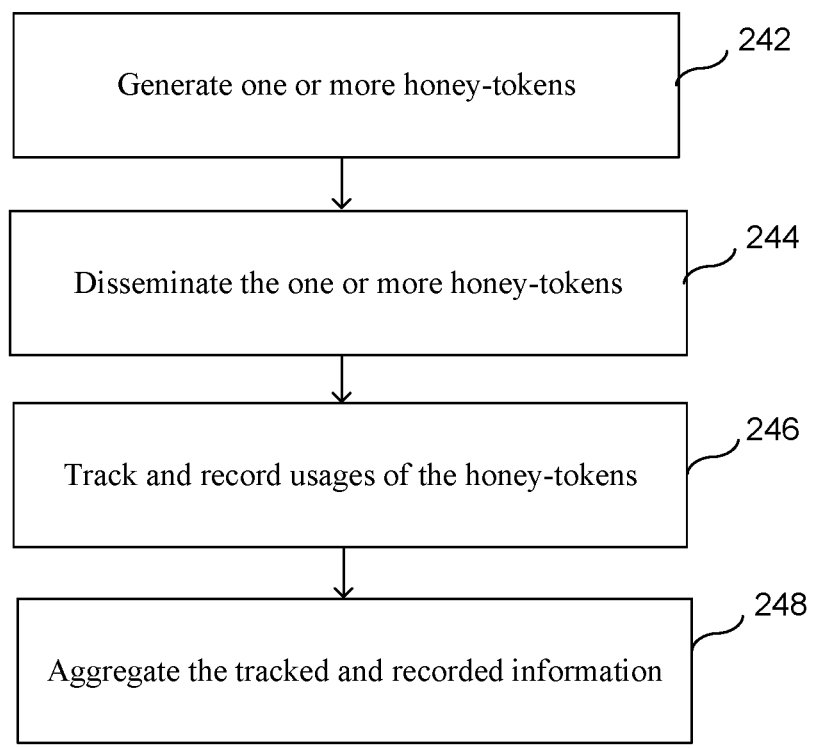
FIG. 2D is a flowchart illustrating an embodiment of a process for generating and using honey-tokens.

FIG. 2D is a flowchart illustrating an embodiment of a process for generating and using honey-tokens. At least a portion of the process of FIG. 2D may be at least in part implemented on analysis server 102 of FIG. 1, gateway 110 of FIG. 1, message server 106 of FIG. 1, and/or any other server.

At 242, one or more honey-tokens are generated. For example, honey-tokens are generated based on an entity's public and private information, social network information available online, and based on operation patterns.

The honey-tokens may include generating fake data items in forms of "public honey-token" or "private honey-token." Examples of such honey-tokens include email addresses, account numbers, project names, news, personal names, etc. These token are used for (I) attracting attackers, (II) tracking attackers, and (III) polluting attacker data. These tokens for attracting scammers can be referred to as "magnets," tokens for tracking attackers can be referred to as "trackers," and tokens for pollution can be referred to as "polluters." Magnets are used to trick the attacker to spawn a new thread of attack based on invalid, but apparently valuable information presented to them. Some magnets are synthetically created, with the sole purpose of attracting attackers, whereas others are legitimate accounts under attack. Trackers are used to create links when attackers use the data they have collected. Polluters help to contaminate the data collected by attackers in order to make it expensive for them to use them.

To be deceptive and used by attackers, the synthetic tokens should be indistinguishable from real names and entities for an outsider. Therefore, they should comply with the format of valid information. This can be achieved either by modification of valid information, or generation of them using a given format. Token generation based on modification can be achieved by replacing some characters, or flipping their orders. As an example, a fake account number can be generated by replacing one of the digits of a real account number. Also, a fake email address can be generated by changing some of the characters of an email address. Generation of honey-tokens based on a given format is another method. For example, an email address can be created based on a given format following the standard of naming of a company, including "[first letter of name][lastname]@[domain name]." As another example, the credit card number also should be generated based on a valid given format.

Both methods of generation of tokens may rely on a dataset of valid entities, including real names of people, email addresses, or phone numbers. These data can be collected based on public data or private data provided by a company that is being protected.

The functionality of magnet honey-tokens may be to attract attackers to target elements of a company based on fake data which is of value and potential interest of attackers. One benefit of these tokens is to burn attacker resources to fake targets distracting them from the valuable ones. Moreover, upon the contact of the attackers with these entities, the system will collect more information about the nature of interests of the attackers and their identity. All the methods mentioned above can be used to track the attackers down and gather more intelligence. The other benefit is to detect new attacks missed by the detection method as described in the first component of this disclosure, since we can be sure that normal users will not interact with the magnets. In other words, similar to magnets that only collect certain materials, these honey-tokens only attract scammers.

The functionality of trackers may be to track the attackers, including tracking interpersonal data exchange between collaborating attackers. This is not always possible using only links or bugs. For example, a trap phone number planted in a document shared with an attacker is a reference point to track the scammer or any of his team members when they call the number. Similarly, a made up staff name that is being mentioned in a document, and has a profile accessible by search engines, is useful to track scammers while they are doing reconnaissance (e.g., using a search engine) and at the time they contact the email address of the made up staff. Another example of tracker honey-tokens is a mail address that enables collecting physical attributes of an attacker, including address and fingerprints. In this case, the attacker is convinced to send a mail or package to a certain address. For example, the attacker might be asked by the system to send a cancelled check as part of a verification process or receive confidential information, such as a copy of W-2 via mail. Tracking includes determining the physical mail delivery address for an attacker, which is part of the vital information of the attacker. Trackers are a valuable asset for linking different campaigns and tracking flow of information collected by attackers within their organization. Moreover, these tokens are beneficial mechanisms of tracking scammers when other mechanisms fail. For example, when attackers block loading images to their computers, the tracking mechanism based on bugs (e.g., small images in the content of email) fails. In comparison, since tracker honey-tokens are actively used by attackers and are generated in a unique manner, they cannot be bypassed by the attackers.

The functionality of polluters may be to contaminate the information collected by attackers. This makes it more expensive for the attackers to distinguish valuable and useless information, which affects their profit margin. For example, if fake credit card information is fed to attackers, then it requires extra work for attackers to check the validity of the credit cards, or have somebody else do it. This also requires extra caution for attackers to avoid activating the trackers when they use an invalid credit card since this also acts as a tracker. Whereas the use of honey-tokens such as fake credit card numbers is known by a person skilled in the art, the use of these in the disclosed system is novel.

Both public and private honey-tokens can be used for the purposes of attracting and tracking. The main difference of these two methods is the way they are deployed and located. In the public honey-token, they are deployed so they become accessible by search engines, spread via the professional social networks, and are injected into the datasets of leaked data. Private honey-tokens are distributed upon initial contact of the attacker and in response to the attacker's requests. For example, a fake account number is introduced as a part of a document shared with an attacker in the process of replying to him. This method considers the mentality of the attackers in locating information useful for them to trick the attacker to use it. For example, an apparently benign sentence such as "for more information, contact email address X," or "for a copy of data, send an email to address Y" is effective in getting attackers to follow the fake leads. Other variations of the private honey-tokens are those sent to attackers "apparently by mistake." In this method, the defender sends a collection of supposedly sensitive information to an attacker, and then asks the attacker to delete it. This is done automatically by the system, in response to detecting an attack. The supposedly sensitive information, in addition to the method of delivery, convinces the attacker to use the honey-tokens. The system then tracks the attacker and attempts to infiltrate his network. Another method is to submit fake credentials to login pages where the attacker captures them. These fake credentials can be used to log in to the systems of a target company but only to a sandbox system that tracks the activities of the attackers.

At 244, the one or more honey-tokens are disseminated. For example, the one or more honey-tokens are disseminated publicly or privately, directly to third-party service providers, or embedded in messages it exchanges with an attacker (e.g., in a responsive message). At 246, usages of the honey-tokens are tracked and recorded. At 248, the tracked and recorded information is aggregated. For example, different pieces of identity collected from attackers are aggregated to build profiles of attackers and to provide links between attack campaigns and threat actors.

Figure 3:
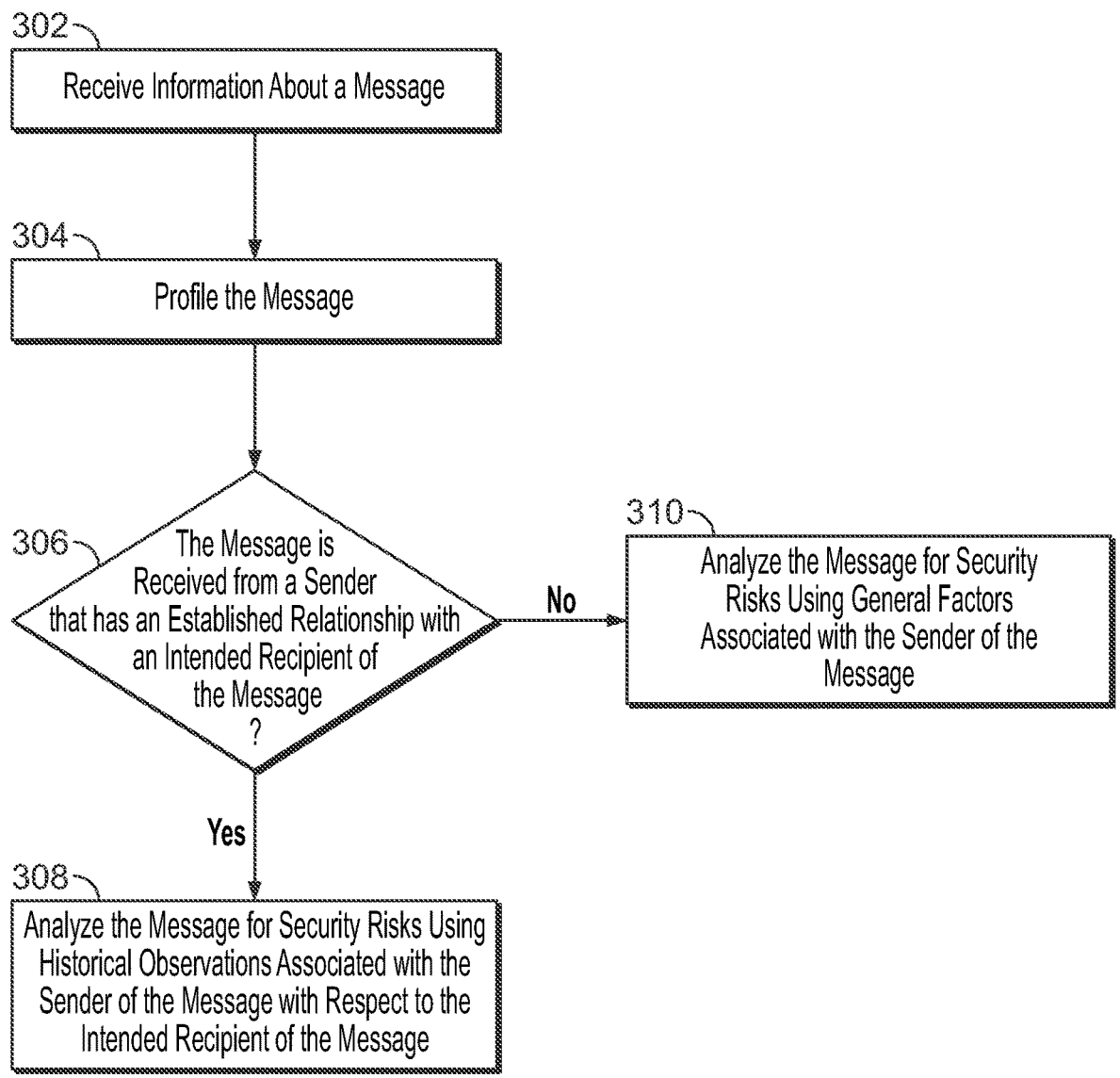
FIG. 3 is a flowchart illustrating an embodiment of a process for analyzing a received message for security risks.

FIG. 3 is a flowchart illustrating an embodiment of a process for analyzing a received message for security risks. For example, the process of FIG. 3 is utilized to detect account take-over risk of a sender of an electronic message and take responsive action to mitigate potential effects of the risk. The process of FIG. 3 may be at least in part implemented on analysis server 102, gateway 110, and/or message server 106 of FIG. 1. In some embodiments, at least a portion of the process of FIG. 3 is performed in 204 of FIG. 2A.

In some embodiments, a received electronic message is analyzed to identify signs indicative of a message coming from an ATOed message account. If the message is identified as being of a sufficient high risk of coming from an account that has been potentially ATOed, a security action is performed in an attempt to minimize a security risk associated with the message. It is desirable to reduce the false positives and false negatives such ATOed account detection.

In some embodiments, it is determined whether a sender of an electronic message has an established relationship with an intended recipient of the electronic message. For example, if the sender of the message has previously communicated with the intended recipient a sufficient number of times for at least a threshold length of time, the sender of the electronic message is determined to have an established relationship with the intended recipient. In response to a determination that the sender of the electronic message has an established relationship with the intended recipient, the electronic message is analyzed based at least in part on previously observed communication between the sender and the intended recipient to determine a security risk of the electronic message for the intended recipient. For example, given what is already known about the sender of the message based on a classification and analysis of previous communications between the sender and the intended recipient, it can be determined whether the newly received message conforms to a pattern detected in the previous communications. Based on the result of the analysis of the electronic message, a security action is performed, if applicable. For example, the electronic message may be blocked if a sufficiently high level of risk is detected and/or the message may be modified to include a warning about the ATOed account risk if a sufficient medium level of risk is detected based on the analysis. If no or a low level of risk is detected, the message may be allowed to be accessed by the intended recipient by delivering the message to a message inbox of the recipient.

In some embodiments, in response to a determination that the sender of the electronic message does not have an established relationship with the intended recipient, it is determined whether an electronic message account of the sender of the electronic message is likely an independently controlled account. For example, a message that was sent from an account that belongs to a large organization that closely controls who can send a message via its domain is not an independently controlled account whereas a personal email message account is an independently controlled account. In response to a determination that the electronic message account of the sender of the electronic message is likely an independently controlled account, the message is analyzed to determine whether the message is an automatically generated message. For example, a header of the message is analyzed to determine whether the message was automatically generated using a script or a program. In response to a determination that the message is an automatically generated message, a security action is performed. For example, the electronic message may be blocked if a sufficiently high level of risk is detected and/or the message may be modified to include a warning about a security risk if a sufficiently medium level of risk is detected based on the analysis. If no or a low level of risk is detected, the message may be allowed to be accessed by the intended recipient by delivering the message to a message inbox of the recipient.

At 302, information about a received message (e.g., message to be delivered to an intended recipient) is received. In some embodiments, the information is received at analysis server 102 of FIG. 1. The information may include information included in or related to the message. For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis. In some embodiments, the received information is the information received in 202 of FIG. 2A.

At 304, the message is profiled. In some embodiments, step 304 is only performed if it is determined that a security risk associated with the message is below a threshold (e.g., risk score determined in 308 and/or 310 is below a threshold). Profiling the message includes storing information about and/or included in the message in a database to track historical observations about the sender of the message. For example, in identifying accounts that might have been ATOed, messages sent by the account are to be analyzed based on past observations about typical messages sent by the sender and the degree to which a newly received message from the sender deviates from what has been typically observed about messages sent by the account of the sender. In some embodiments, the historical information about messages by the sender for a particular recipient may be combined with historical information about messages sent by the sender for other recipients to determine a combined message profile/history of the sender for use in assessing security risk of messages by the sender for recipient without an established communication history with the sender. In some embodiments, profiling the message includes profiling, tracking and/or storing content and/or header information of the message in a data structure that tracks historical information about messages sent by the sender for a particular recipient. In some embodiments, profiling the message includes profiling, tracking and/or storing content included in the message in a data structure that tracks historical information about types of content typically included in messages sent by the sender for a particular recipient. For example, the data structure tracks keywords and/or content topic/type included in messages sent by the sender for a particular message recipient and keywords and/or content topic/type detected in the newly received message are used to update this data structure.

In some embodiments, at least a portion of header information of the message is stored in profiling the message. In some embodiments, select information included in the header of the message is tracked and associated with a history message profile of the sender. For example, information in the header of the message that identifies one or more of the following is tracked for the sender of the message: a mail user agent, a time zone, IP address, X-headers, supported character sets, and any desired information of interest in the header. One or more different profiles for the sender of the message may be updated using the message. For example, certain header information and/or content of messages of the sender may be correlated with each other and associated groups of header entries and/or content entries of messages of the sender are updated when profiling the message. In one example, different profiles of the sender are categorized based on different devices used by the sender to send messages to a particular recipient.

The table below shows different header information that is collected to build different profiles about messages sent using different devices of the sender.

| Feature | iphone | Mac | browser | iPad | Android phone |
|---|---|---|---|---|---|
| DKIM signature? | yes | yes | no | no | yes |
| Mime version | 1.0 (1.0) | 1.0 (Mac OSX Mail 10.1\ (3251\)) | 1.0 | 1.0 (1.0) | 1.0 |
| Content type | text/plain; charset=us-ascii | text/plain; charset=us-ascii | text/html; charset=UTF-8 | text/plain; charset=us-ascii | text/plain; charset=UTF-8 |
| X-Mailer | iPhone Mail (14B72) | Apple Mail (2.3251) | N/A | iPad Mail (14B100) | N/A |
| Message ID | Type 1 | Type 1 | Type 2 (both formatting and subdomain) | Type 1 | Type 2 (both formatting and subdomain) |
| Cipher | TLS1_2 | TLS1_2 | N/A | TLS1_2 | TLS1_2 |

This table shows that by recording the header entries historically associated with messages from the same sender, a prediction can be made in terms of whether a newly received message and aspects of the message in combination are consistent with the past observations. Each trusted sender that has sent a message to a specific recipient is associated with a record that describes what different header configurations have been observed for the sender. This can be done both using a time window approach that emphasizes recently observed headers over very old headers, or an approach that takes into account all saved headers. Along with headers or portions of these, the data structure can store counts (e.g., how many times these were observed) and time intervals for the observations. For example, the number of times a particular message feature (e.g., message header item) was observed in received messages from the sender within a recent window of time (e.g., within a threshold time period and/or numerical count of past messages) and timestamps of each associated received message from the sender can be tracked and stored.

In some embodiments, statistics on the commonality of combinations of tracked aspects of messages (e.g., header entry, message body content, etc.) of a sender are determined and updated based on the newly received message. These statistics allow a determination of the likelihood that various aspects of a message would be observed together in the message. This also can be used to determine the likelihood of a new aspect detect in a message from the sender conforms to previously detected changes over time in previous messages from the sender. For example, this information can be used to determine the likelihood that the sender would change from one computing platform to another, the probability that the sender would upgrade their system, and the probability that the sender would use another machine temporarily. Thus message profile data of previously received messages from the sender can be used to determine a Bayesian probability score of a particular message feature being consistent with past observations for a communication between the sender and the recipient, given the context of other aspects of the message and a pattern of previous changes as a function of time.

In some embodiments, profiling the message includes identifying content included in a message signature and updating a data structure that tracks observations about message signatures of messages from the sender and associated context in which particular message signatures were utilized. For example, if a message signature that states "Sent from my iPhone" has been tracked and observed in a sufficient number of messages sent by the sender using a mobile phone message client and if a newly received message includes this signature but was sent using a desktop computer message client, this abnormality can be detected based on the historical observations about message signatures of the sender.

At 306, it is determined whether the message was received from a sender that has an established relationship with an intended recipient of the message. In some embodiments, the sender of the message has an established relationship with the intended recipient of the message if the sender (e.g., from email address of the sender) has sent a message to the intended recipient of the message (e.g., recipient email address of the message) a threshold number of times, if the intended recipient has previously sent a message to the sender a threshold number of times and/or if the sender has been sending messages to the intended recipient of the message for a threshold length of time. For example, the sender of the message is the established relationship contact of the intended recipient of the message if a threshold number of messages have been exchanged between the sender and the recipient. In some embodiments, a sender model developed for the sender of the message is utilized to determine whether the sender is an established relationship contact of an intended recipient of the message.

In some embodiments, determining whether the message was received from an established relationship contact of an intended recipient of the message includes determining a trust score associated with the sender of the message for the intended recipient of the message. If the trust score is above a threshold, the sender is identified as having an established relationship with the recipient and otherwise, the sender is identified as not having an established relationship with the recipient. The trust score indicates the closeness of the relationship between the sender and the intended recipient. This can either be a binary predicate or a real number. In a simplified example, the trust score can be set to 1 (e.g., indicating established relationship) if each of the two parties has sent the other at least three messages over a course of no shorter than one month, and otherwise to 0 (e.g., indicating not an established relationship). In another example, the trust score can be a function of the number of messages received by the recipient organization sent by the sender's organization and the number of messages that have been identified as undesirable, whether by the classifier or by a recipient.

In some embodiments, the trust score of the message identifies the extent to which the system recognizes the sender based on its historical message traffic; as such, it may not be limited to the history of the recipient or her organization. For example, a message from a sender with a very brief history would receive a low trust score, especially if the communication pattern is similar to that of previously identified malicious senders. A sender with a longer history and low traffic volume (but very few or no complaints of past abuse) would have a higher trust score, and a sender with a long history, high volume, and few or no complaints would correspond to an even higher trust score.

In some embodiments, determining whether the sender of the message has an established relationship with the intended recipient includes determining whether the sender of the message is included in a contact list (e.g., address) of the intended recipient. For example, if the sender of message is included in the contact list of the intended recipient and a sufficient number of the message was previously exchanged between the sender and the recipient, it is determined that the sender has an established relationship with the recipient.

In some embodiments, determining whether the sender of the message has an established relationship with the intended recipient includes obtaining a social, organizational, communication, collaboration, business and/or other relationship information of the sender and/or the intended recipient. Information about the sender and/or other users connected/related to the intended recipient may be obtained by requesting the desired information from a service (e.g., an external third-party service accessed via an Application Programming Interface such as Microsoft Graph API). For example, an identifier of the intended recipient of the message is provided to the service, and the service provides a list of other users connected to the intended recipient (e.g., connected via a social network, organizational relationship, business contact, etc.) that is ordered by the various other user's relevance to the intended recipient (e.g., order based on previous communication, collaboration, business relationships, etc.). It is determined that the sender of the message has an established relationship with the intended recipient if the sender is included in this list as having a sufficient relationship with the intended recipient (e.g., included in the list). Otherwise it is determined that the sender of the message does not have an established relationship with the intended recipient. In another example, an identifier (e.g., email address) of the sender of the message is provided to the service and the service provides information about the sender (e.g., information about the sender gathered across various different message repositories, contact lists and social networks). This information about the sender is used to assess a strength of a relationship between the sender and the intended recipient of the message (e.g., along with message history between them), and if the strength value of the relationship is greater than a threshold value, it is determined that the sender of the message has an established relationship with the intended recipient. Otherwise it is determined that the sender of the message does not have an established relationship with the intended recipient.

If at 306, it is determined that the message was received from the sender that has an established relationship contact with the intended recipient of the message, at 308 the message is analyzed for security risks using historical observations associated with the sender of the message with respect to the intended recipient of the message.

An example of the historical observations is the historical observations updated in 304. The historical observations include information about messages from/to the sender of the message to/from the recipient of the received message. In some embodiments, there exists a plurality of aspects of the message to be analyzed using the historical observations, and each aspect is analyzed to determine a risk component score associated with each component. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores. For example, there exists ten risk component scores and five of the component scores are only associated with a malware risk type, four of the component scores are only associated with a phishing risk type, and one of the component scores is associated with both the malware risk type and the phishing risk type. In this example, a total malware risk type score is calculated using the six of the ten risk component scores that are associated with the malware risk type while the total phishing risk type score is calculated using the five of the ten risk component scores that are associated with the phishing risk type. Examples of the aspects of the message analyzed using historical observations include message content keyword, a mail user agent, a time zone, an IP address, an X-header, supported character sets, a message signature, and any information about the message.

In some embodiments, using past observation data generated by profiling past messages from the sender to the specific recipient of the message, various data and statistics as well as clusters of metadata/configurations/content of messages that are likely to be observed together in combination in a message from the sender can be determined. For example, using past observation data generated by profiling past messages from the sender, statistics on the commonality of various combinations of metadata/configurations/content of messages have been determined and stored in a data structure. Using this information in combination with identified information in the contents and/or header of the message, a likelihood the received message conforms to a typical message from the sender for the intended recipient is determined. This likelihood takes into account statistics of likely changes over time. For example, the determined risk reflects the likelihood that the sender would change from one platform to another, the probability that the sender would upgrade their computer system, and the probability that the sender would use a new machine temporarily. Thus, a component risk score value for an aspect of the message may be computed using a Bayesian probability score of the particular observation/feature/content/metadata being consistent with past observations of communications between the sender and the recipient, given the context of other aspects of the message and a pattern of previous changes as a function of time. In some embodiments, past observation data about messages from the sender is analyzed to determine a probability that a combination of features/contents/metadata of the message being analyzed is likely to be exhibited together and this probability is utilized to determine a risk component score.

Therefore, in some embodiments, a risk is identified by determining the conditional probability of a set of message aspects, given the past observations relating to the sender, the sender's organization, and of users in general. It may also take into consideration the meaning of mismatches, e.g., upgrades and potential changes from one phone to another. IP addresses and associated IP traces may also be taken into consideration, along with data about the common case for the considered user. Any aberration is identified, and a risk score is computed from the conditional probability of the observations. This may be done by comparing the probability to at least one threshold and assigning an associated risk score, by algebraically converting the probability to a risk score, or a combination of these approaches. The risk score is also affected by the exposure of the recipient to attacks, message content, and other risk identifiers.

In an illustrative example, Alice and Bob regularly communicate with each other using email. For roughly 75% of the messages Alice sends to Bob, the message emanates from a mail client with mime version "1.0 (Mac OS X Mail 10.1 \ (3251\))" and with additional characteristics such as those shown in the "Mac" column of the table above. For roughly 25% of the messages Alice sends to Bob, the message emanates from a mail client with mime version "1.0" and with additional characteristics such as those shown in the "Android ph" column of the table above. Bob's system receives an email E1 from Alice that is sent from a mail client with characteristics such as those shown in the "Mac" column of the table above. This is considered consistent with Alice's past sending behavior, and E1 is delivered. Bob's system receives an email E2 from Alice, that is sent from a mail client with characteristics such as those shown in the "Mac" column of the table above, except that the message is associated with mime version "1.0 (Mac OS X Mail 9.1 \(3121\))." This would correspond to a downgrade of Alice's system, as opposed to an upgrade. This is considered unusual, and a security action is initiated. The contents of E2 is scrutinized, both using an automated tool and using a manual audit by an admin, after which it is concluded that the message is safe, and is delivered. The new mail client characteristic is entered in a record associated with Alice, along with details relating to the message and its treatment. Bob's system receives an email E3 from Alice that is sent from a mail client with characteristics such as those shown in the "iphone" column of the table above. This is not an entry that is associated with Alice's past observations. In addition, it is known that Alice has an Android phone. This causes an escalation of the message scrutiny. The message is found to have content matching a content risk filter. The determination is that E3 is at high risk of being a message that comes from an ATOed system. An SMS verification message is sent to Alice's previously recorded phone number, and Alice's record is marked as being at high risk of being corrupted. E3 is not delivered, but Bob receives a message saying that a suspect message has been blocked by the system, and that the message came from Alice's account. Cindy also knows Alice, and Cindy receives an email E4 from Alice. The system looks up Alice's record and determines that her account is considered at high risk of being corrupted. The message E4 is automatically scrutinized, but does not match any rule associated with a high risk. Therefore, E4 is marked up with a warning "This message comes from an account that is temporarily associated with risk. Please proceed with caution. Before performing any sensitive action, please verify with the owner of the account." However, it turns out that Alice really did send E3, from her new phone. Accordingly, she confirms that E3 was sent by her. The security system delivers E3 to Bob, and replaces the marked-up version of E4 in Cindy's inbox with the "clean" version of E4. The system also removes the "corrupted" flag in the record associated with Alice, and records the header configuration associated with E3 in the record. The system does not know whether Alice will still use her Android phone. However, it knows from the response to the verification challenge—which was sent from an iPhone—that the phone number on record for Alice is likely to be associated with an iPhone, but that the phone associated with the "Android ph" device may also be used. Later on, Bob's system receives an email E5 from Alice, not matching any of the previously recorded headers, but instead matching a header configuration commonly used by previously observed scammers. The message scrutiny is escalated, and automated scrutiny indicates that E5 contains a zip file that, when decompressed in a sandbox, contains a malicious file. The system concludes that Alice's device has been corrupted, and adds information about this in the record associated with Alice. A notification message is sent to Alice using SMS. However, Alice does not respond to it. The security system initiates a notification to Alice's mail service provider, indicating that it is likely that Alice's system has been corrupted. Alice's mail service provider reviews the activity associated with Alice's account, and concludes that it is likely that Alice's account has been taken over. They automatically block access to the account and initiate an effort to allow Alice to regain access to her account. Several days later, this completes. Dave has not interacted with Alice in the past, but receives an email E6 from Alice. The system looks up Alice's record and determines that her account is considered at high risk of being corrupted. The message E6 is automatically scrutinized. It is found that it is identical to a message sent in the past from corrupted accounts. Therefore, E6 is not delivered. Alice's account sends another email E7 to Bob, which is trapped by the security system. It does not have content found to be dangerous, and so, is delivered along with a warning "This email was sent from a sender that may be hacked. Please proceed with caution." The system generates an inquiry to Alice's mail service provider whether the recovery has completed; when the mail service provider responds that Alice's system has been recovered, the flag associated with corruption in Alice's record is set to "none," and the modified message is searched for. However, the security system cannot find it, and so, does not replace it with its clean version E7.

In various embodiments, in addition to using historical observations associated with the sender of the message to analyze the security risk of the message, other types of security risk analysis are performed in determining a total risk score associated with the message. For example, in addition to one or more risk component scores for risk factors determined using past observations, one or more other risk component scores are determined for other types of security risk analysis. The various different types of risk component scores are combined to determine a total risk score. Examples of the other types of security risk analysis include a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

If at 306 it is determined that the message was received from a sender that does not have an established relationship with the intended recipient of the message, at 310, the message is analyzed for security risks using general factors associated with the sender of the message. For example, the message is analyzed to identify security risks without the benefit of observations of previous communication history between the sender of the message and the intended recipient of the message. However, generalized past observations about messages from the sender (e.g., generalized based on messages for other recipients from the sender) and/or an organization/domain of the sender is utilized to analyze a message content keyword, a mail user agent, a time zone, an IP address, an X-header, supported character sets, a message signature, and any other information about the message to determine whether the message is sufficiently different from the generalized past observations to indicate a security risk. In some embodiments, analyzing the message for security risks includes performing a plurality of analyses and determining a risk component score for each of the analyses. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores.

In some embodiments, in 310, it is determined whether the electronic message account of the sender of the message is likely an independently controlled account. For example, an account that belongs to a large organization that closely controls who can send a message via its domain is not an independently controlled account whereas a personal email message account is an independently controlled account. In response to a determination that the electronic message account of the sender of the electronic message is likely an independently controlled account, the message is analyzed to determine whether the message is an automatically generated message. For example, a header of the message is analyzed to determine whether the message was automatically generated using a script or a program. In response to a determination that the message is an automatically generated message, a risk component score of the message is set to be high enough to warrant performing a security action.

In various embodiments, examples of other types of analyses performed in 310 include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message (e.g., attacker may prefer targeting people one by one, to avoid detection), and determining whether the sender from a domain with a Domain-based Message Authentication, Reporting and Conformance (DMARC) policy passes Sender Policy Framework (SPF) and DomainKeys Identified Mail (DKIM) validations.

Figure 4:
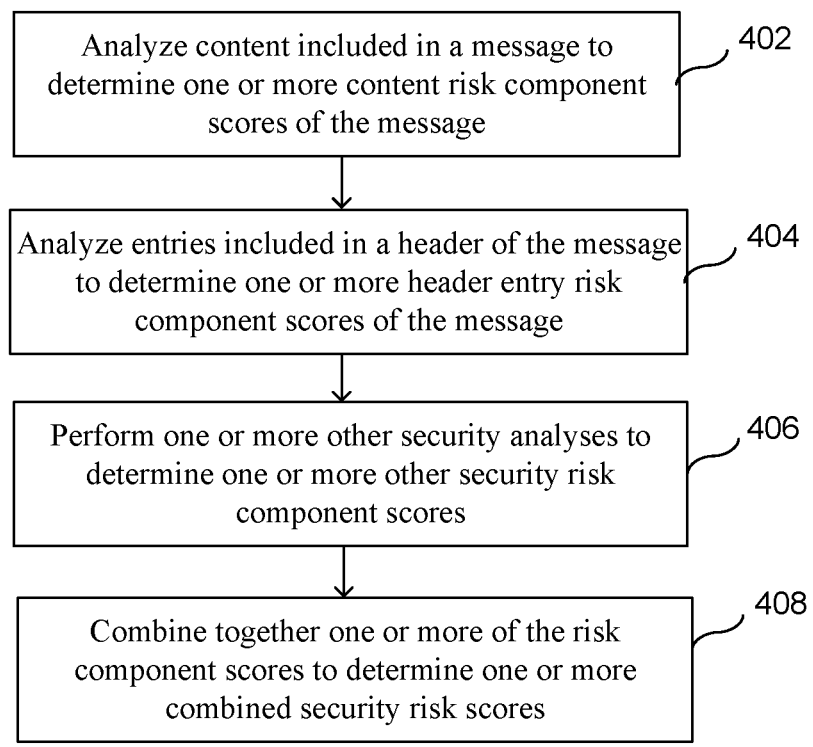
FIG. 4 is a flowchart illustrating an embodiment of a process for analyzing individual aspects of a message for security threats.

FIG. 4 is a flowchart illustrating an embodiment of a process for analyzing individual aspects of a message for security threats. The process of FIG. 4 may be at least in part implemented on analysis server 102, gateway 110, and/or message server 106 of FIG. 1. In some embodiments, at least a portion of the process of FIG. 4 is performed in 204 of the process of FIG. 2A and/or 308 and/or 310 of the process of FIG. 3.

At 402, content included in a message is analyzed to determine one or more content risk component scores of the message. For example a message body of the message is analyzed to identify whether it includes one or more text/keywords from a list of keywords associated with a security risk. A keyword may be included in the list because the keyword identifies conversations about sensitive content that could cause harm to the recipient if the recipient replies or takes action related to the keyword. For example, keywords "social security number," "password," "login," "wire instructions," "confidential," "payment," "ID," obfuscated text, etc. may be included in the list of keywords associated with a security risk. A content risk component score is determined based on whether the message includes a text/keywords from the list of keywords (or associated synonyms or related words) associated with a security risk. For example, an increase in the number (e.g., of different types) and degree of risk of security risk keywords included in the message increases the associated content risk component score.

If the sender of the message has been determined to have an established relationship with the recipient of the message, past observations about messages sent by the sender are utilized in determining the content risk component score based on whether the message includes a text/keywords from the list of keywords (or associated synonyms or related words) associated with a security risk. For example, if it is common for a sender to communicate with the recipient about invoices and payment, an inclusion of a keyword related to invoices and payment would not cause the content risk component score to go up as much as compared to a situation in which it is not common for sender to communicate with the recipient about invoices and payment. Thus a contribution of a security risk keyword included in the message to the content risk component score is reduced if the same or similar keyword in scope and topic (e.g., keyword that is a synonym or topically related word) has been previously observed in previous messages from/to the sender to/from the recipient. The magnitude of this reduction may depend on the number and length of time the same or similar keyword in scope and topic has been previously observed in previous messages from/to the sender to/from the recipient.

In some embodiments, analyzing content included in the message to determine one or more content risk component scores of the message includes determining a content risk component score based on a message signature included in the message. For example based on past observations about types of email signatures typically included in email messages from the sender of the message, the associated content risk component score is increased if an expected signature is not included in the message (e.g., given other detected attributes of the message and the expected signature for the given other detected attributes) or if an unexpected signature is detected (e.g., never observed signature or included signature is an out of context signature that does not match an expected signature for the given detected attributes of the message).

At 404, entries included in a header of the message is analyzed to determine one or more header entry risk component scores of the message. Examples of the entries included in the analyzed header include one of more of the following: a mail user agent (i.e., MUA) identification, time zone identification, IP address, X-header, supported foreign language character sets of the sender, identification of automation or script that generated the message, or any other data included in the header (e.g., email header) of the message. For each header entry to be analyzed, a header entry risk component score is calculated based on a risk factor associated with the entry. For example, certain sender IP addresses and/or header entries, given what is known about the intended recipient (e.g., mismatch between sender and recipient) may increase the associated header entry risk component score. If the sender of the message has been determined to have an established relationship with the recipient of the message, past observations about headers of messages sent by the sender are utilized in determining the header entry risk component scores. For example, the header entry risk component score for a header entry is reduced if the same or similar entry (e.g., change in entry from a previously observed entry conforms to known change pattern) has been previously observed in previous message headers of messages from the sender of the message. The magnitude of this reduction may depend on degree of similarity and/or conformance to a typical pattern of change from previous observations.

In some embodiments, the header entry risk component score for a header entry is associated with whether the message is an automatically generated message. For example, one or more x-header entries identify whether the message was automatically generated. These entries may be identified based on keywords that identify that the message was generated using a script (e.g., generated using a PHP mailer/script). If the sender of the message has been determined to have an established relationship with the recipient of the message, past observations about headers of messages sent by the sender are utilized in determining the header entry risk component scores. For example, the header entry risk component score for a header entry identifying an automatically generated message is reduced if the sender typically sends automatically generated messages (e.g., including the same or similar header entry) to the recipient of the message. The magnitude of this reduction may depend on degree of similarity and/or conformance to a typical pattern of change from previous observations. The following are examples of header entries identifying an automatically generated message and these entries are identified by matching one or more search terms with at least a portion of the text of these entries:"X-Mailer: PHPMailer 5.2.23 (https://github.com/PHPMailer/PHPMailer)"; "X-Php-Originating-Script: 1002:srjvdopc.php(1189): runtime-created function (1): eval( )'d code(1): eval( )'d code."

At 406, one or more other security analyses is performed to determine one or more other security risk component scores. This step may be optional in various embodiments. Examples of other types of analysis performed include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

In some embodiments, performing a security analysis includes identifying which domains and subdomains are used to send legitimate traffic, e.g., by recording what subdomains/domains are used to originate large volumes of emails, and which are not known to be spam or fraud email. For example, "large amounts" may mean greater than a threshold value, such as 100 emails per week, or at least 0.1% of the traffic associated with a particular domain, or any traffic that is not known to be good, e.g., by being associated with correct SPF and/or DKIM data in the headers. Next, any traffic associated with a subdomain and domain that is not on the list of subdomains/domains that are known to send legitimate traffic is flagged, and, depending on a policy and/or contents, quarantined, blocked, marked up, or escalated for additional scrutiny.

In some embodiments, a security analysis involves web bugs, which are also referred to as web trackers. Some users set their browser preferences not to permit web bugs, whereas others do not. Therefore, the acceptance or rejection of a web bug is a trait that can be tracked. When it changes, that is indicative of risk. A web bug can be set to send a signal to the security service when the email or webpage in which it is integrated is rendered. The security service can send a message to a user considered at risk for having been corrupted, and then determine whether the web bug is operating in a manner that is consistent with past uses. The email can also demand that the user allows web bugs, after which user-specific information can be collected. If this is found to be inconsistent with past observations, the associated risk component score is increased.

At 408, one or more of the risk component scores are combined together to determine one or more combined security risk scores. Determining a combined security risk score includes statistically combining (e.g., adding together, weighting then adding together, averaging, weighted averaging, etc.) together the various risk component scores to determine a single combined risk score. In some embodiments, each of the risk component score(s) is associated with one or more specific types of risk. For example, risk component scores of each risk type are to be combined together by type to determine a total risk score for each specific risk type. For example, a security risk component score may be identified as being associated with a malware risk type and/or a phishing risk type and a combined security risk score for the malware risk type and a separate combined security risk score for the phishing risk type are calculated. In some embodiments, the combined security risk scores are utilized in determination of which security action to perform in 212 of FIG. 2A.

Figure 5:
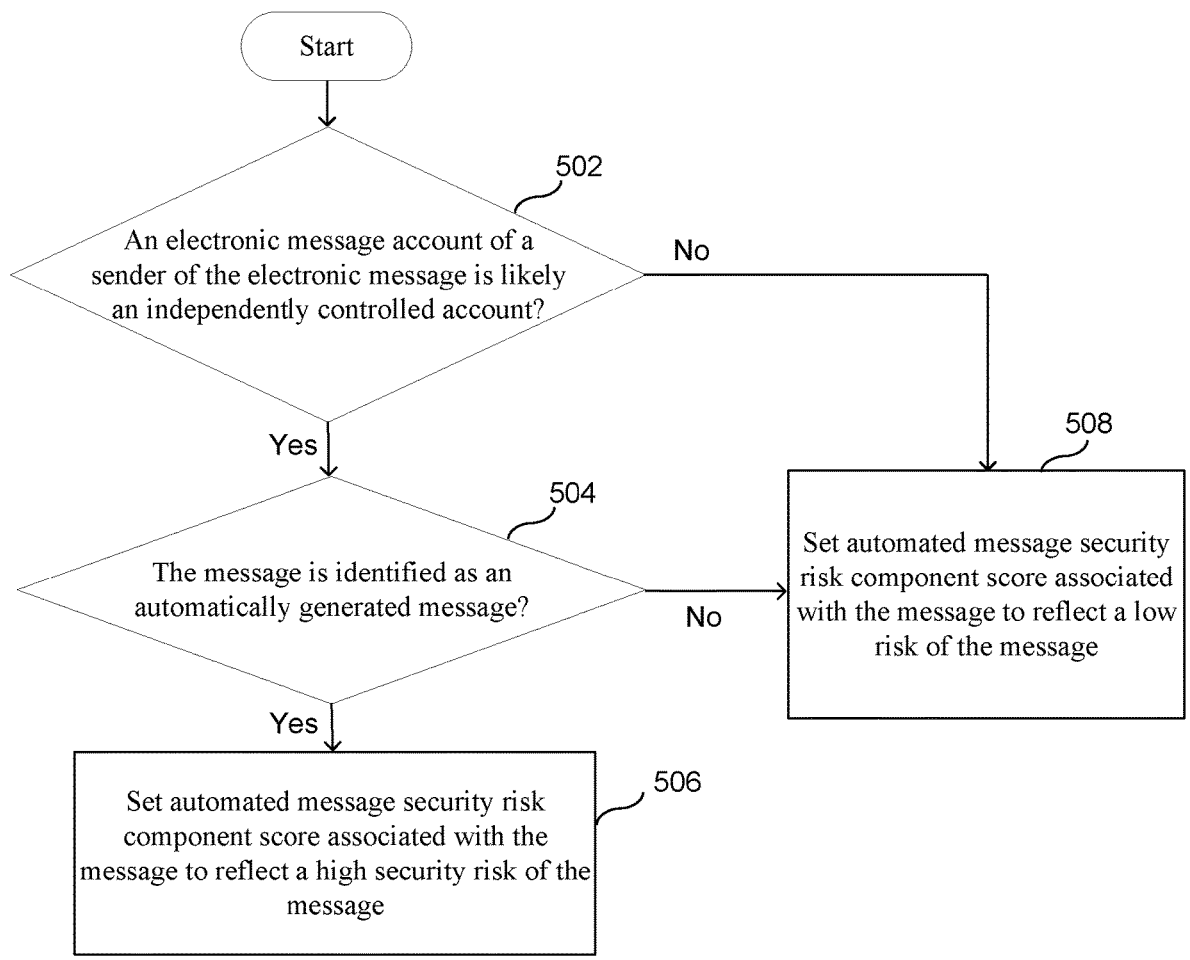
FIG. 5 is a flowchart illustrating an embodiment of a process for analyzing aspects of a received message based on whether the message is from an independently controlled account of a sender.

FIG. 5 is a flowchart illustrating an embodiment of a process for analyzing aspects of a received message based on whether the message is from an independently controlled account of a sender. The process of FIG. 5 may be at least in part implemented on analysis server 102, gateway 110, and/or message server 106 of FIG. 1. In some embodiments, at least a portion of the process of FIG. 5 is performed in 308 and/or 310 of the process of FIG. 3 and/or 204 of the process of FIG. 2A. For example, the process of FIG. 5 is performed in response to a determination that the sender of the electronic message is not an established communication contact of the intended recipient of the message.

At 502, it is determined whether an electronic message account of a sender of the electronic message is likely an independently controlled account. For example, a message that was sent from an account that belongs to a large organization that closely controls who can send a message via its domain (e.g., web domain) is not an independently controlled account whereas a personal email message account is an independently controlled account.

In some embodiments, determining whether the electronic message account of a sender of the electronic message is likely an independently controlled account includes identifying a domain of an address (e.g., email address) of the sender of the message using the domain to identify using preconfigured data, whether the domain corresponds to independently controlled accounts. For example, certain domains are known to only allow not independently controlled accounts and any email address using these domains is identified as not an independently controlled account, while other domains are known to allow independently controlled accounts and any email address using these domains are identified as an independently controlled account. If the domain is unknown, the electronic message account of the sender is identified as an independently controlled account.

In some embodiments, the electronic message account of the sender of the electronic message is determined to be likely an independently controlled account based on a message traffic pattern associated with the electronic message account of the sender. For example, based on the volume of messages (e.g., large volume of message traffic above a threshold to/from the sender indicates that it is not an independently controlled account) and/or number/ratio of sent messages vs. received messages (e.g., a ratio of sent messages by the sender as compared to messages to the sender that is above a threshold indicates that it is not an independently controlled account where as a generally even ratio of sent vs. received indicates an independently controlled account), it is determined whether the electronic message account of the sender of the electronic message is likely an independently controlled account.

The notion of autonomy (e.g., independently controlled) of an account is important with respect to trust of the account. For example, a "gmail" account is autonomous (e.g., independently controlled). Even though many members share the same domain, there is no coherency in their actions. On the other hand, an official work organization email address of one employee is not autonomous from another employee of the same organization.

In a first example, consider Alice with an email address with the domain "Aliceco.com" that sends an email to Bob at an email address with the domain "Bobco.com." Assume that the recipient Bob has a trust relationship with Alice (i.e., the recipient email address for Bob has sufficient interaction with the Alice email account). Then there is "personal trust" by the recipient directed to the sender. Assume that the recipient does not have a trust relationship with Alice, but somebody else at "Bobco.com" does. Then there is "organizational trust" by the recipient directed to the sender. Assume now that the recipient Cindy at "Bobco.com" has no trust relationship with Alice, but Cindy does have one with Dave at Aliceco.com. Then there is "personal transitive trust" by the recipient directed to the sender. This is because Alice and Dave both belong to "Aliceco.com," and "Aliceco.com" is one autonomous entity—Alice and Dave are not two independent autonomous entities. Finally, assume that the recipient has no trust relationship with either Alice or Dave—or anybody else at "AliceCo.com"—but that somebody else at "Bobco.com" does. This shows "organizational transitive trust."

In another example, consider Bob using his "gmail" personal account, sends an email to somebody at "Bobco.com." Assume that the recipient has a trust relationship with Bob (e.g., the recipient email address has sufficient interaction with the Bob "gmail" email account). Then there is "personal trust" by the recipient directed to the sender. Assume that the recipient does not have a trust relationship with Bob's "gmail" account, but somebody else at "Bobco.com" does. Then there is "organizational trust" by the recipient directed to the sender. Assume now that the recipient has no trust relationship with Bob, but they do have one with Cindy's personal "hotmail" account. There is no trust—Bob and Cindy are not two independent autonomous entities when represented by their personal email addresses.

Thus if an email comes from a stranger whose email address is similar to a party the recipient trusts, then this is a high-risk scenario. Trust is different from more general reputation: one is not more likely to act on an email from a trustworthy but unknown organization than one of an email from a non-trustworthy and unknown organization. However, whether one has a good relationship with a sender matters more in terms of trust than whether others have a good relationship with the sender. Different kinds of trusts may be computed in different ways but also have different strengths. For example: strength("personal trust")>strength ("organizational trust"); strength("personal trust")>strength ("personal transitive trust"); strength("personal transitive trust")>strength("organizational transitive trust"); strength ("organizational trust")>strength("organizational transitive trust"). In some embodiments, different weights can be assigned to these different types of trust to determine a risk of a message.

If at 502 it is determined that the electronic message account of the sender of the electronic message is likely an independently controlled account, at 504, the message is analyzed to determine whether the message is an automatically generated message. For example, a header of the message is analyzed to determine whether one or more x-header entries identify whether the message was automatically generated. These entries may be identified based on keywords that identify that the message was generated using a script (e.g., generated using a PHP mailer/script). The following are examples of header entries identifying an automatically generated message and these entries are identified by matching one or more search terms/keywords with at least a portion of the text of these entries: "X-Mailer: PHPMailer 5.2.23 (https://github.com/PHPMailer/PHP-Mailer)"; "X-Php-Originating-Script: 1002:srjvdopc.php (1189): runtime-created function(1): eval( )'d code(1): eval( )'d code."

In some embodiments, determining whether the message is an automatically generated message includes identifying a likely scripted behavior associated with a protected account. For example, attackers typically configure accounts they have compromised to forward emails to another account, either selectively (such as based on the subject line, the sender, the thread, etc.) or for all emails. In addition, attackers sometimes configure compromised accounts so that selective emails are hidden, as will be described in more detail below. When attackers make such a configuration, then this affects the traffic patterns in a way that will be measured and detected by the security service. By monitoring the different mail folders, including the inbox, the sent box, the archive, the trash folder and other folders, the security service provider will detect forwarding behavior that is anomalous in that it has not been performed by the account owner before; that is selective; that is rapid; or that is to recipients that are considered high risk, or any combination of these. It also detects signs of scripted forwarding, which is indicated by a very short time period between receipt of an email and the forwarding of the email. In addition, the security service also looks for other indications of scripted behavior, such as an anomalous addition of an account in the bcc, which is considered anomalous by not having been performed previously, and/or which is considered scripted due to the time periods being very short. Another related detection method is to observe if the MUA of emails to some recipients of emails sent from the protected account are different than those of others, and considered high risk, e.g., due to information that is anomalous for the account owner.

If at 504 it is determined that the message is an automatically generated message, at 506, an automated message security risk component score associated with the message is set (e.g., set to a high value) to reflect a high security risk of the message (e.g., higher than otherwise). This security risk component score may be utilized in 212 of FIG. 2A and/or 408 of FIG. 4.

If at 502 it is determined that the electronic message account of the sender of the electronic message is likely not an independently controlled account or if at 504, it is determined that the message is not an automatically generated message, at 508, the automated message security risk component score associated with the message is set to reflect a low risk of the message (e.g., lower than otherwise).

Figure 6:
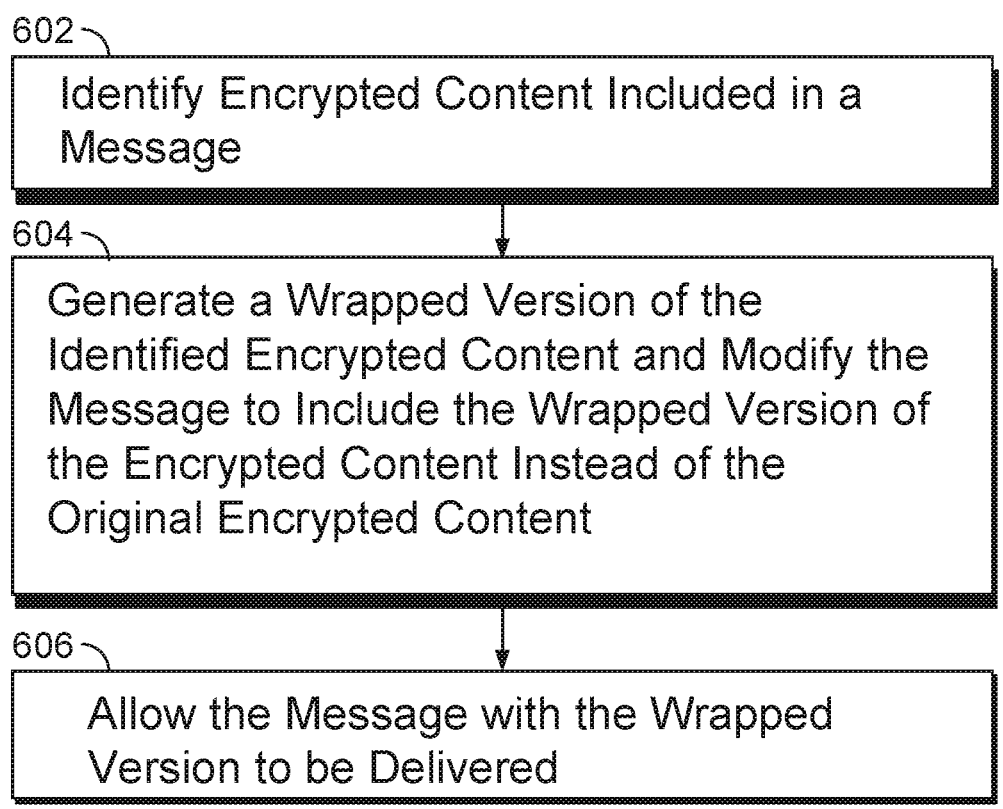
FIG. 6 is a flowchart illustrating an embodiment of a process for wrapping encrypted content of the message.

FIG. 6 is a flowchart illustrating an embodiment of a process for wrapping encrypted content of the message. The process of FIG. 6 may be at least in part implemented on analysis server 102, gateway 110, and/or message server 106 of FIG. 1. In various embodiments, at least a portion of the process of FIG. 6 is performed in 212 of FIG. 2A. For example, the process of FIG. 6 describes one of the security actions that is selected to be performed.

If a message includes encrypted content such as an encrypted email attachment, that encrypted content is often unable to be properly analyzed for security threats because analysis tools are unable to access the encrypted content. Hackers may take advantage of this by sending an encrypted malware attachment along with a password to be utilized by the recipient to open the attachment.

At 602, encrypted content included in a message is identified. Examples of the message include an email, instant message, a chat message, and any other forms of electronic messages. The message may be analyzed as a part of a computer security analysis and filtered to identify and neutralize security threats prior to allowing an intended recipient of the message to access the message. In some embodiments, each message received for delivery to its intended recipient associated with the system performing analysis of the message is to be analyzed. Examples of the encrypted content include: an encrypted executable file, an encrypted zip file, an encrypted text, an encrypted script, an encrypted image, and any other encrypted content. The encrypted content may have been identified by identifying content that requires a password to access it.

At 604, a wrapped version of the identified encrypted content is generated and the message is modified to include the wrapped version of the encrypted content instead of the original encrypted content. In some embodiments, wrapping the encrypted content includes embedding the encrypted content in an executable program. When the executable program is executed, the executable program requests a decryption password from the user and the encrypted content of the message is encrypted using the decryption password and the decrypted content is analyzed for security threats prior to allowing the user access to the decrypted content once the analysis has completed without identifying a security threat. If the security analysis identifies a threat, a user may not be allowed to access the decrypted content and the security threat may be logged or reported to an administrator.

For example, the wrapped version of an encrypted zip file is a file that, when opened, causes execution, whether of the file wrapper itself or of an associated application that the message recipient needs to download, and as the file wrapper is executed, it requests and receives a decryption key, PIN, or password from the user and uses the PIN or password to decrypt the wrapped zip file. This is done by executing the unzip program associated with the zip file, or a compatible version to this, providing the unzip program with the PIN or password provided by the user. It then automatically accesses the contents of the unzipped file and analyzes it for security risks. This can be done in a multiplicity of ways, including detonating each file, determining whether any of the files match an anti-virus signature, determining whether any of the files has executable code segments in it, etc. The same approach also works for messages with attachments that are encrypted pdfs, or any other encrypted file. In such cases, the execution of the wrapper file causes the decryption of the encrypted file, which is then analyzed for security risks, including executable code. If a file, independent of type, passes the verification, then the decrypted content is made available to the recipient. Thus, the user experience associated with the opening of wrapped encrypted content would be the same as that of unwrapped encrypted content, except for a delay during security analysis (e.g., in most cases this would be too short to detect).

At 606, the message with the wrapped version of the encrypted content is allowed to be delivered. For example, the modified message is allowed to be delivered to an email inbox (or other email categorization folder to be actively accessed by a user to obtain new messages, e.g., not a spam or trash folder) of an end recipient. Allowing the modified message to be delivered includes allowing an intended user recipient of the message to be able to access the wrapped encrypted content. When the recipient opens the wrapped encrypted content, the wrapper program requests a decryption key, decrypts the encrypted content using the decryption key, and initiates the security analysis of the decrypted content prior to allowing the recipient access to the decrypted content of the encrypted content. Any security analysis technique or method described in this specification may be performed on the decrypted content to analyze it for security threats. If a security threat is detected, the user may not be allowed access to the decrypted content and a security may be performed. The security action may include revoking access to the message, deleting the message, forwarding the message, reporting the message, further modifying the message, moving the message (e.g., to a different folder), preventing access to a portion of the message, providing an additional warning, and/or performing further analysis.

Figure 7:
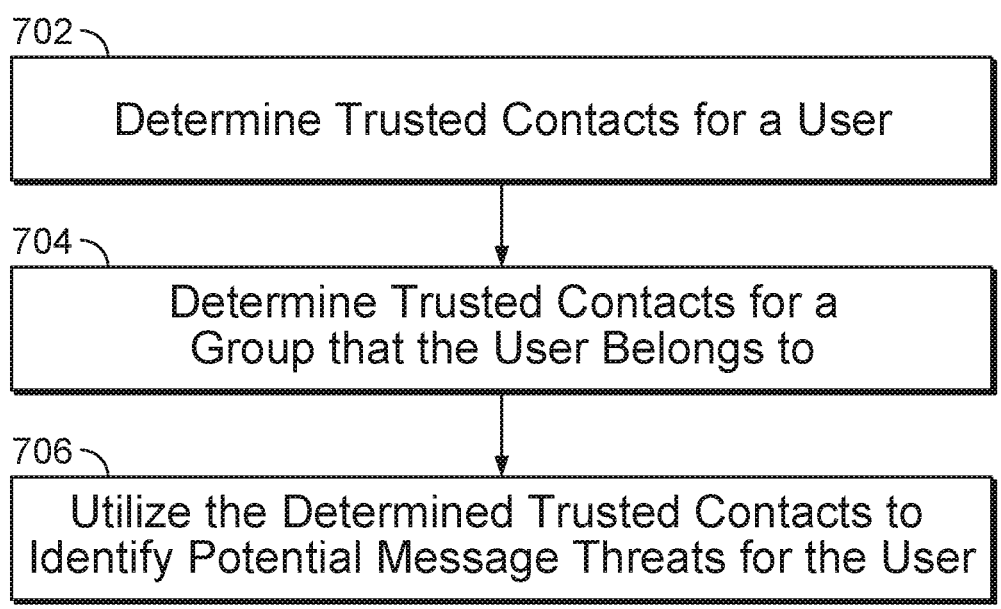
FIG. 7 is a flowchart illustrating an embodiment of a process for tracking trusted contacts.

FIG. 7 is a flowchart illustrating an embodiment of a process for tracking trusted contacts. The process of FIG. 7 may be at least in part performed by analysis server 102, gateway 110 and/or message server 106 of FIG. 1. Examples of the contacts include email addresses, usernames, display names, user identifiers, an identification photo, and any other identifier that may be utilized to identify a sender or recipient of a message. At least a portion of the process of FIG. 7 may be performed in 204 of FIG. 2A and/or 306 of FIG. 3. For example, one or more steps of the process of FIG. 7 are performed to determine whether a sender of a message is a trusted contact or has an established relationship with the recipient of the message.

At 702, trusted contacts for a user (e.g., message recipient) are determined. The trusted contacts are to be utilized to identify potential message threats of the user. The trusted contacts identify one or more contacts (e.g., senders or recipients of messages) that are familiar to the user because the user has previously interacted with the contact and/or is aware of the contact. In some embodiments, determining the trusted contacts includes receiving a list of contacts for the user. For example, the user provides access to an address book of the user and information about contacts in the address book is received. In some embodiments, the trusted contacts include contacts that have been specifically identified by the user. In some embodiments, information about the trusted contacts is stored. For example, the trusted contacts for the user are stored in a database of trusted contacts. This database may track trusted contacts for a plurality of different users and allows trusted contacts to be retrieved for a specific identified user. The stored information of each contact may include one or more of the following: email address, associated name (e.g., display name), relationship identifier, identifying image (e.g., contact photo), username, instant message identifier, address, phone number, a measure of trust, a measure of message interaction, and any other identifier utilized to identify a sender or a receiver of a message.

In some embodiments, the trusted contacts for the user are at least in part determined automatically based on contacts detected in messages sent or received by the user. For example, by observing and analyzing message traffic of the user and patterns of message recipients and senders, contacts that receive messages from the user and contacts that send messages to the user can be determined and correlated to infer and determine trust, frequency, and/or importance of interaction and relationship between the user and the contact to identify one or more of these contacts as a trusted contact. In one example, if a threshold number of messages has been sent to and from a contact for a user, the contact is identified as a trusted contact and added to a stored list of trusted contacts for the user. Information about the messages of the user utilized to at least in part automatically determine the trusted contacts has been obtained for analysis by receiving at least a portion of the messages (e.g., a copy of the entire message, email addresses and names of contacts of messages, etc.) for analysis (e.g., at server 102 from server 104, gateway 110, or server 106 of FIG. 1).

At 704, trusted contacts for a group that the user belongs to are determined. For example, trusted contacts for the users included in the group are aggregated to identify patterns among the aggregated trusted contacts. Examples of the group include a network domain that the user belongs to (e.g., domain of the email address of the user), an entity/organization that the user belongs to (e.g., company that the user belongs to), a message service provider, or an authority that controls a message account of the user. In some embodiments, determining trusted contacts for the group includes aggregating information about a trusted contact and/or a network domain of one or more trusted contacts from information gathered for different users for the trusted contact and/or the network domain. In some embodiments, determining the trusted contacts for the group includes storing information about the trusted contacts in a data storage structure and associating this stored information with the group.

At 706, determined trusted contacts are utilized to identify potential message threats for the user. For example, the contacts in the trusted contacts may be utilized as a proxy for contacts that are familiar to the user and if an attacker tries to attack the user using an impersonation attack, contact being impersonated likely corresponds to one of the contacts in the list of trusted contacts of the user. By determining a measure of similarity between a sender identifier of a message received for the user with each identifier of each trusted contact, messages attempting impersonation attacks may be identified. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack and filtered. Filtering the message may include blocking the message, quarantining the message, further analyzing the message, and/or modifying the message (e.g., insert a warning).

Figure 8:
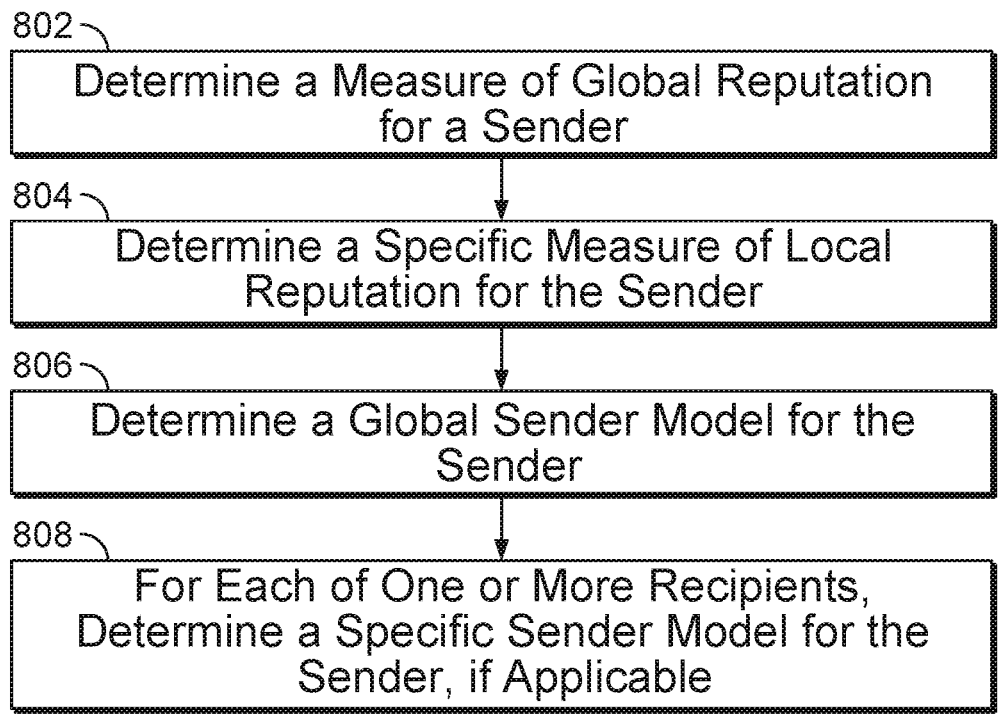
FIG. 8 is a flowchart illustrating an embodiment of a process for determining information about a message sender to be utilized to assess a risk of a message.

FIG. 8 is a flowchart illustrating an embodiment of a process for determining information about a message sender to be utilized to assess a risk of a message. The process of FIG. 8 may be at least in part implemented on analysis server 102, gateway 110, and/or message server 106 of FIG. 1. In some embodiments, at least a portion of the process of FIG. 8 is performed in 702 and/or 704 of FIG. 7. For example, the process of FIG. 8 may be repeated for each trusted contact determined for a user (e.g., for each contact in a list of trusted contacts stored in a repository) and stored in a data structure that tracks the trusted contacts. The process of FIG. 8 may be repeated periodically. At least a portion of the process of FIG. 8 may be performed in 204 of FIG. 2A and/or 306 FIG. 3.

At 802, a measure of global reputation for a sender is determined. The sender may correspond to a group of individual sender addresses in some embodiments or an individual sender address in other embodiments. For example, the sender corresponds to a trusted contact in a list of trusted contacts determined using the process of FIG. 7. In another example, the sender corresponds to a domain of a trusted contact identified using the process of FIG. 7. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 804) for the sender determined for each recipient of a group of different recipients to determine a combined measure (e.g., combined score).

At 804, a specific measure of local reputation for the sender is determined for each of one or more different recipients. For example, although the measure of global reputation determined in 802 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 702 of the process of FIG. 7. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 806, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/

Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 808, a specific sender model for the sender is determined for each of one or more recipients, if applicable. For example, although the sender model determined in 806 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 806 except for utilizing data specific to the recipient rather than various different recipients. For example, using a repository storing messages received from the sender to only the recipient, individual or neighborhoods of IP addresses associated with the sender model for a sender are automatically determined.

Figure 9:
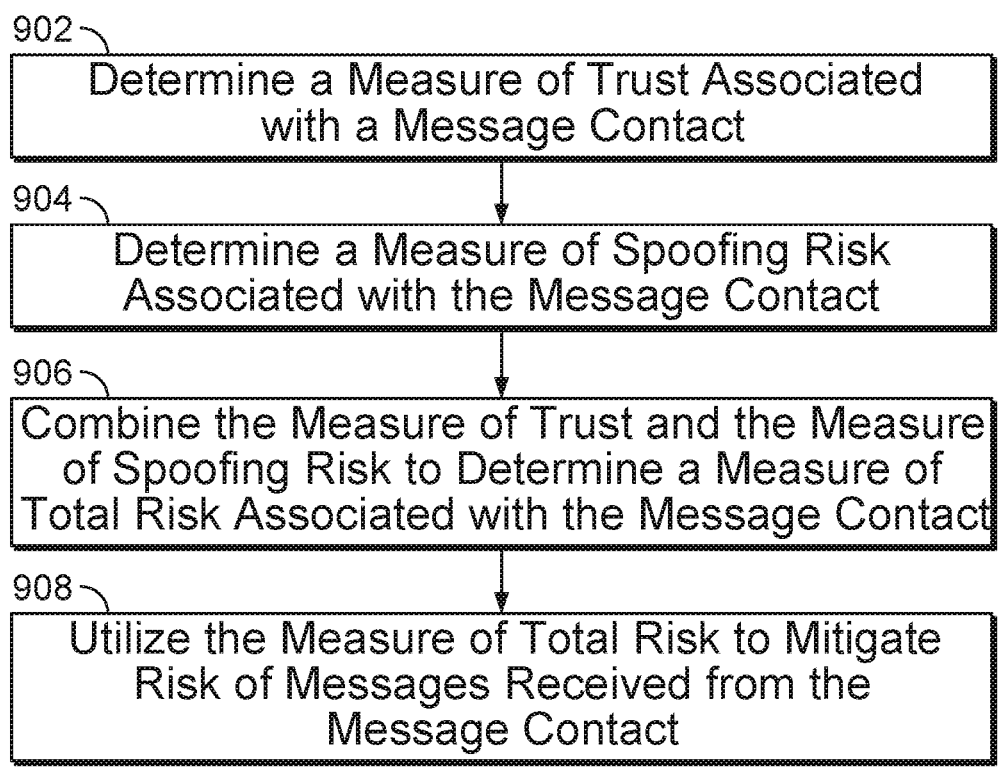
FIG. 9 is a flowchart illustrating an embodiment of a process for determining a total risk measure of a contact.

FIG. 9 is a flowchart illustrating an embodiment of a process for determining a total risk measure of a contact. The process of FIG. 9 may be at least in part implemented on analysis server 102, gateway 110, and/or message server 106 of FIG. 1. At least a portion of the process of FIG. 6 may be performed in one or more steps of the process of FIG. 2A and/or FIG. 3 (e.g., in 204, 306, etc.).

At 902, a measure of trust associated with a message contact (e.g., sender of a message) is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 8. For example, the measure of trust is the specific measure of local reputation determined in 804. In another example, the measure of trust is the measure of global reputation included in the global sender model determined in 806. In another example, the measure of trust is determined based on a combination (e.g., average, sum, product, etc.) of the measure of global reputation and the specific measure of local reputation.

At 904, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 906, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 908, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Figure 10:
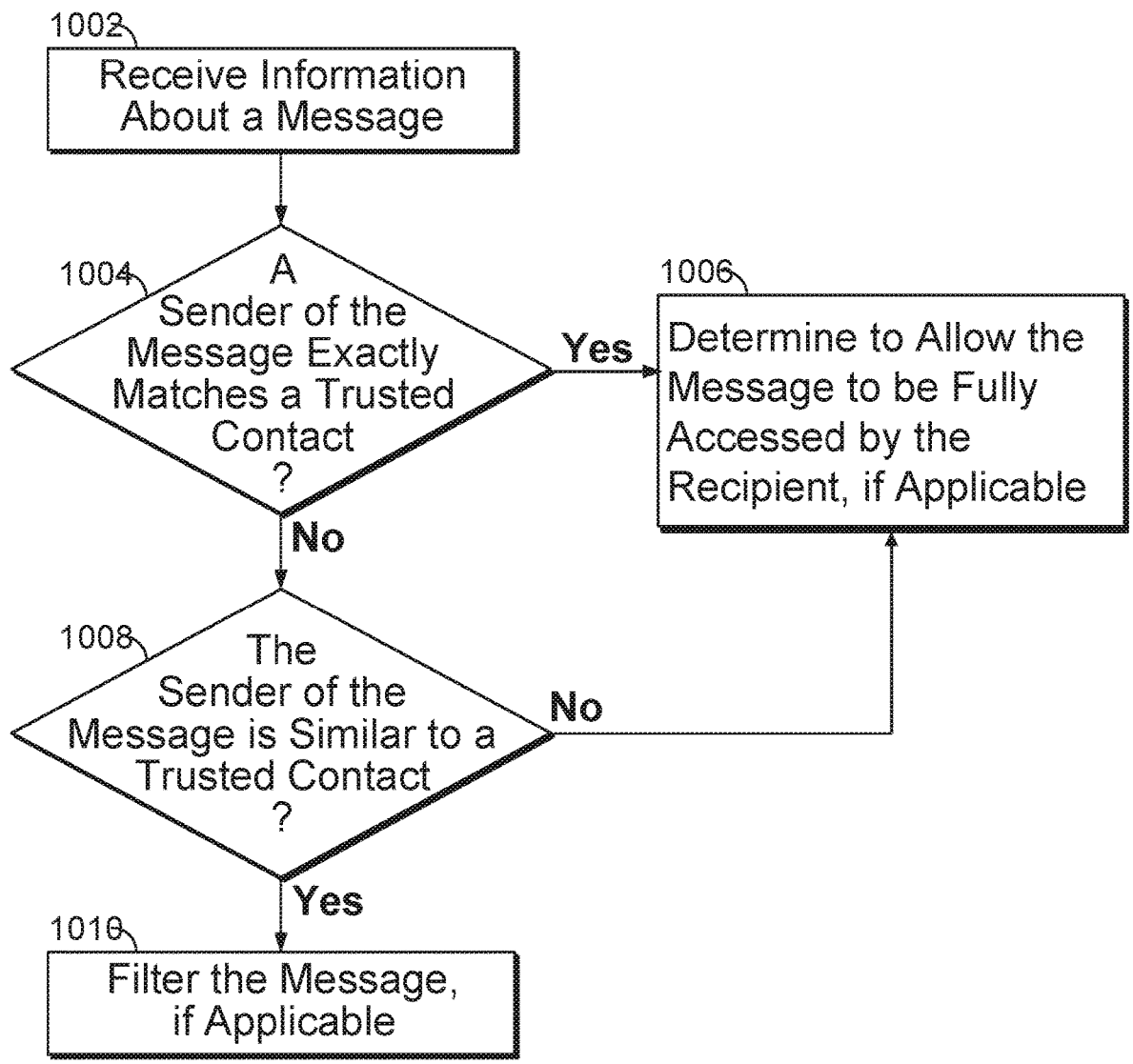
FIG. 10 is a flowchart illustrating an embodiment of a process for assessing a received message for filtering.

FIG. 10 is a flowchart illustrating an embodiment of a process for assessing a received message for filtering. The process of FIG. 10 may be at least in part implemented on analysis server 102, gateway 110, and/or message server 106 of FIG. 1. At least a portion of the process of FIG. 10 may be performed in 308 and/or 310 of FIG. 3 and/or 204 and/or 212 of FIG. 2A. At least a portion of the process of FIG. 10 may be performed in 406 of FIG. 4.

At 1002, information about a message is received. In some embodiments, the information is received at analysis server 102 of FIG. 1. The information may include information about a sender of the message. For example, the information includes email address header information including an email address and a display name of the sender of the message. In some embodiments, the information about the message includes contents of the message. Examples of the message include an electronic mail (i.e., email), an instant message, a chat message, and any other forms of electronic messages.

At 1004, it is determined whether a sender of the message exactly matches a trusted contact. For example, it is determined whether an address of the sender of the message (e.g., in a "From:" field of a message header) exactly matches an address of a trusted contact in a list of trusted contacts for the recipient of the message. In some embodiments, the trusted contacts include trusted contacts identified in 702 and/or 704 of FIG. 7. For example, a list of trusted contacts for the recipient of the message is obtained from storage and email addresses for each trusted contact of the list are compared with the email address of a sender of the message to identify whether there is an exact match.

If at 1004 it is determined that the sender of the message exactly matches the trusted contact, at 1006, it is determined to allow the message to be fully accessed by the recipient, if applicable. For example, because the sender of the message exactly matches the trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware. In some embodiments, the total risk score determined using 906 of FIG. 9 is utilized to determine whether to allow full access to the message. If a value of the measure of total risk of the sender is above a threshold value, the message is identified as a risk and the message is filtered as in 1010 to reduce its risk to the recipient.

If at 1004 it is determined that the sender of the message does not exactly match a trusted contact, at 1008, it is determined whether the sender of the message is similar to a trusted contact. For example, by determining whether the sender of the message is similar to a trusted contact, a likelihood of confusion by a recipient of the message that the message is from a trusted contact is determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss<bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss<bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted)

based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

In some embodiments, it is determined that the sender of the message is similar to a trusted contact if any measure of similarity (e.g., string distance measure) meets a threshold value. For example, if any string distance measure determined for a list of trusted contacts is greater than a threshold value, the message is identified as potentially an impersonation attack message and it is determined that the sender of the message is similar to the trusted contact.

In some embodiments, messages that are highly authentic (e.g., associated with a valid DMARC signature, correct SPF records, or both) but which come from domains that are associated with low control are to be subject to increased analysis. For example, a measure of control of the domain of the sender is determined. The measure of control measures how easy it is to create an account of the domain without having to pass a careful screening. For example, any user is able to create a Google Gmail account by setting the username to any available user name and setting the display name to any correctly formed display name. Thus, domains correspond to a very low degree of control by the domain owner. In contrast, the typical enterprise or government entity has high control over account creation, allowing only employees and affiliates to create accounts, where these have to satisfy some common criteria related to the real-life identity of the user. When the message is identified as having high authenticity but low domain control, then the display name is to be scrutinized (e.g., compared to trusted display names using string distance as previously discussed), whereas for domains with high control, the display name is not scrutinized (e.g., display name impersonation detection not performed).

If at 1008 it is determined that the sender of the message is similar to a trusted contact, at 1010, it is determined to filter the message, if applicable. Filtering the message may include modifying at least a portion of the message, affecting delivery of the message, providing a notification regarding the message, and/or performing additional analysis on the message. An example of filtering the message is performing a security action.

In some embodiments, modifying at least a portion of the message includes modifying (e.g., replacing, adding or removing/deleting) data included in a data field (of the message) that includes an identification of the sender of the message. For example, the data field that is identified to include the identification of the sender is selected from a plurality of data fields of a message header and contents of the selected data field is modified. Examples of the identification of the sender includes a display name, an email address (e.g., "from" email address), a reply-to address, a phone number, an image, a content link, or any other identifier/identification of the sender specified in the message. The data field of the message may be included in a header of the message. For example, the data field of the message is a "From:" field, a "Reply-To:" field or a "Return-Path:" field of an email message header. In some embodiments, the message is a SMS message or a MMS message and a phone number of the sender in the data field is modified. For example, the sender phone number is removed or changed to a different number. In some embodiments, modifying data included in the data field includes modifying a location identifier of content associated with the sender of the message. For example, a URL to an image of the sender is modified to reference a different image (e.g., replacement image includes a warning message).

One example filtering is quarantining the message and sending an automated message to the email address in the "From:" field of the message regarding the quarantine. The automated email may require the recipient to click on a hyperlink that is unique and not predictable to an attacker. If the system determines that such a link was clicked on (e.g., by receiving a corresponding GET request), then the email may be taken out of quarantine and delivered.

Another example filtering is sending an automated email in response to the received message (e.g., whether to the address in the from field or a potential address in the 'reply-to' field or both), requiring the recipient to click on a hyperlink where he or she has to enter a code obtained from an authenticator module, such as a SecurID token or Google authenticator app. If the entered code is correct, the message is taken out of quarantine and delivered.

In an alternative embodiment, the received message is not quarantined but delivered to its recipient after being modified. For example, a warning message is added to one or more header fields and/or the body of the message (e.g., add warning message to subject of message, add warning message to modify sender address, etc.). In some embodiments, the received message is modified to change, remove, and/or censure at least a portion of the message (e.g., remove attachment, remove hyperlinks, remove/modify reply to address, etc.).

If at 1008 it is determined that the sender of the message is not similar to a trusted contact, the process returns to 1006. In an alternative embodiment, if at 1008, it is determined that the sender of the message is not similar to a trusted contact, the message is identified for filtering if the recipient of the message has never sent a message to the sender of the message. In some embodiments, the total risk score determined using 906 of FIG. 9 is utilized to determine whether to allow full access to the message. If a value of the measure of total risk of the sender is above a threshold value, the message is identified as a risk and the message is filtered in 1010 to reduce its risk to the recipient.

Figure 11A:
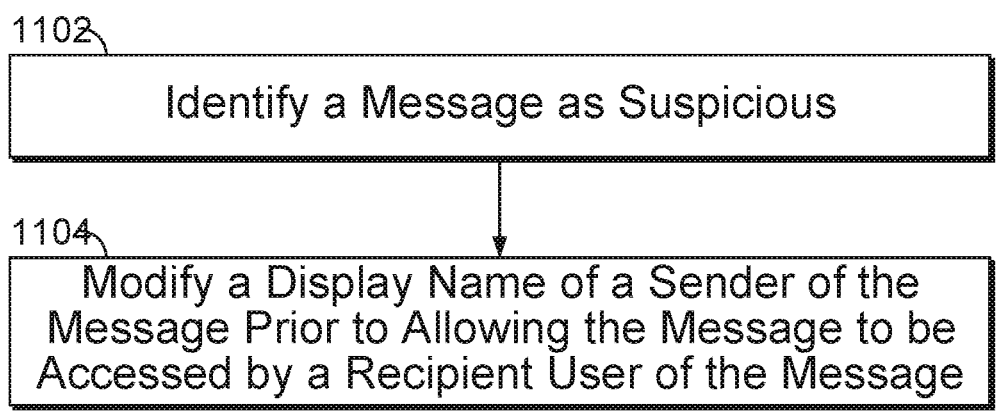
FIG. 11A is a flowchart illustrating an embodiment of a process for modifying a display name of a sender of the message.

FIG. 11A is a flowchart illustrating an embodiment of a process for modifying a display name of a sender of the message. The process of FIG. 11A may be at least in part implemented on analysis server 102, gateway 110, and/or message server 106 of FIG. 1. In some embodiments, at least a portion of the process of FIG. 11A is performed in filtering the message in 1006 and/or 1010 of FIG. 10. At least a portion of the process of FIG. 11A may be performed in 212 of FIG. 2A. For example, 1104 of FIG. 11A is performed in 212 of FIG. 2A as a selected security action to perform.

At 1102, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1104, a display name of a sender of the message is modified prior to allowing the message to be accessed by a recipient user of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name 'Pat Peterson.'" Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name.

In some embodiments, in addition to or instead of the display name, an email address of the sender is also modified. For example, the entire "From:" field of a header of the message that includes both the display name and an email address is modified with a warning.

Figure 11B:
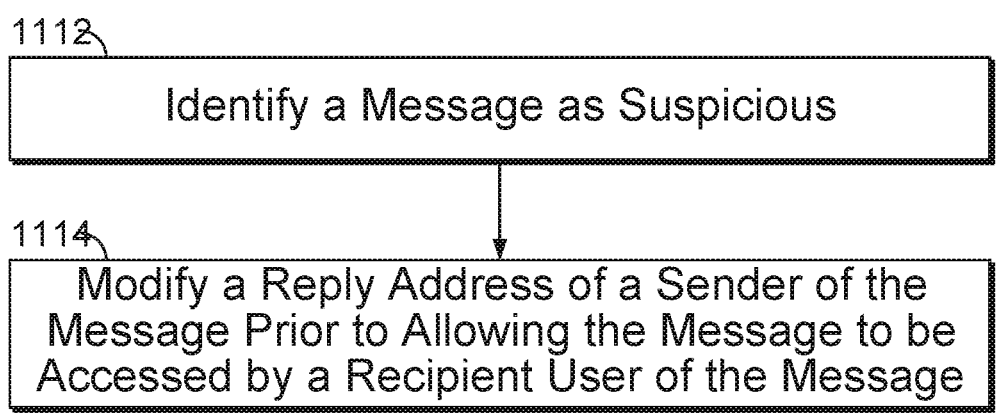
FIG. 11B is a flowchart illustrating an embodiment of a process for modifying a reply address of a sender of the message.

FIG. 11B is a flowchart illustrating an embodiment of a process for modifying a reply address of a sender of the message. The process of FIG. 11B may be at least in part implemented on analysis server 102, gateway 110, and/or message server 106 of FIG. 1. In some embodiments, at least a portion of the process of FIG. 11B is performed in filtering the message in 1006 and/or 1010 of FIG. 10. At least a portion of the process of FIG. 11B may be performed in 212 of FIG. 2A. For example, 1104 of FIG. 11B is performed in 212 of FIG. 2A as a selected security action to perform.

At 1112, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1114, a reply address of a sender of the message is modified prior to allowing the message to be accessed by a recipient user of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email.

In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause on some message clients to bounce the email.

Figure 12:
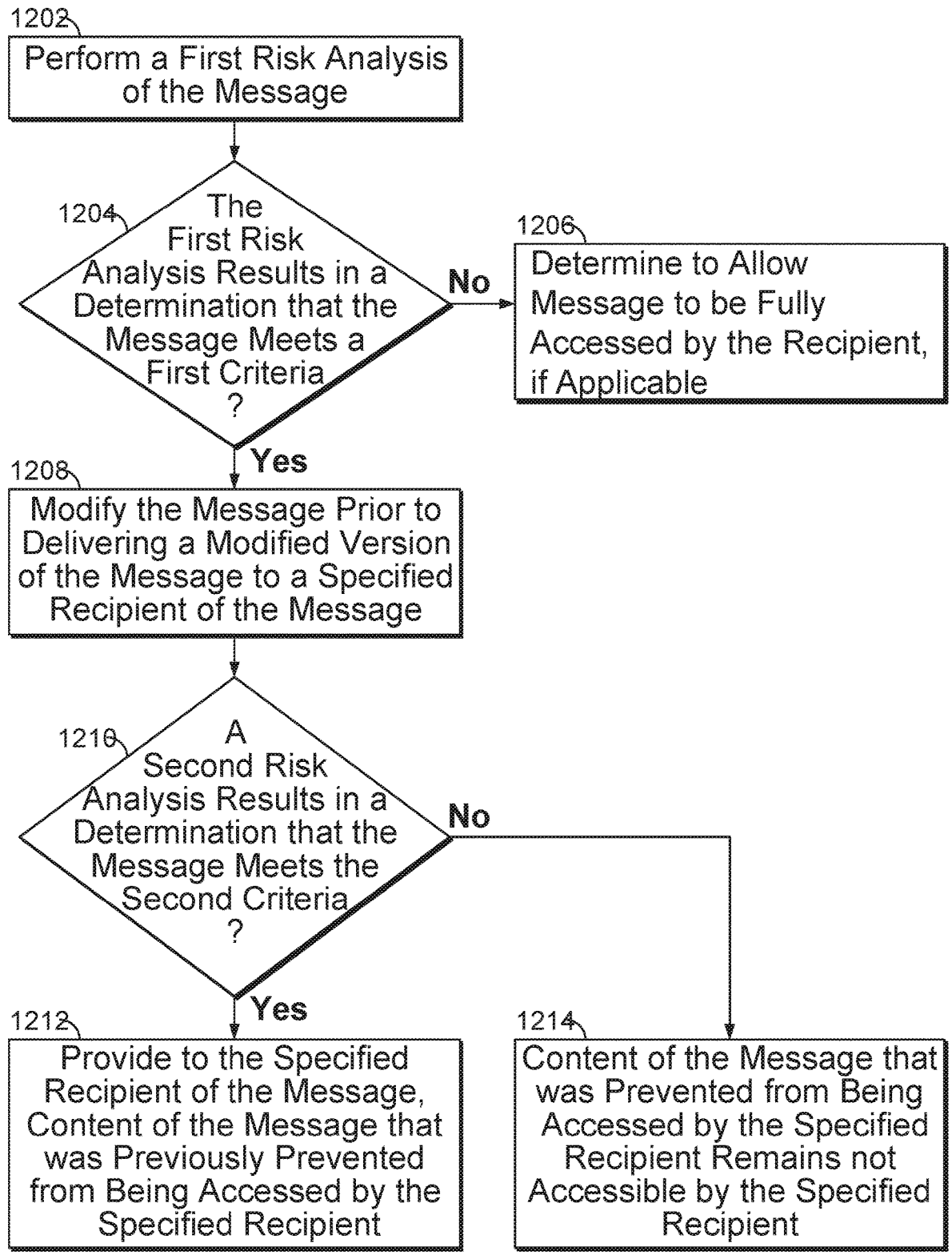
FIG. 12 is a flowchart illustrating an embodiment of a process for securing a message.

FIG. 12 is a flowchart illustrating an embodiment of a process for securing a message. The process of FIG. 12 may be at least in part implemented on analysis server 102, gateway 110, and/or message server 106 of FIG. 1. In some embodiments, at least a portion of the process of FIG. 12 is performed in filtering the message in 1006 and/or 1010 of FIG. 10. At least a portion of the process of FIG. 12 may be performed in 204 and/or 212 of FIG. 2A and/or 308 and/or 310 of the process of FIG. 3. At least a portion of the process of FIG. 12 may be performed in 406 of the process of FIG. 4.

At 1202, a first risk analysis of the message is performed. For example, it is determined whether the message is suspicious. In some embodiments, steps 1004 and/or 1006 of FIG. 10 is performed in 1202. For example, it is determined whether the sender of the message is similar to a trusted contact. By determining whether the sender of the message is similar to a trusted contact, a likelihood of confusion by a recipient of the message that the message is from a trusted contact may be determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss<bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss<bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

At 1204, it is determined whether the first risk analysis results in a determination that the message meets a first criteria. For example, it is determined whether the message meets a criteria to be deemed suspicious. In some embodiments, message meets the first criteria if a measure of similarity (e.g., string distance measure) meets a threshold value. For example, if any string distance measure determined for a list of trusted contacts (e.g., determined in 1202) is greater than a threshold value, the message is identified as potentially an impersonation attack message and it is determined that the message meets the first criteria.

In some embodiments, the message meets the first criteria if a sender of the message has not previously sent a message to a recipient identified in the message. In some embodiments, the message meets the first criteria if a recipient identified in the message has not previously sent a message to the sender of the message. In some embodiments, the message meets the first criteria if a spam detector, a virus detector, and/or a malware detector has detected that the message includes a spam, virus or malware.

In some embodiments, a total risk score determined using 906 of FIG. 9 is utilized to determine whether message meets the first criteria. For example, if a value of the measure of total risk of the sender is above a threshold value, the message is identified as meeting the first criteria.

If at 1204 it is determined that the message does not meet the first criteria, at 1206 it is determined to allow the message to be fully accessed by the recipient, if applicable. For example, because the sender of the message exactly matches the trusted contact or sender of the message is not similar to any trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware.

If at 1204 it is determined that the message does meet the first criteria, at 1208 the message is modified prior to sending a modified version of the message to a specified recipient of the message. For example, a warning message is added to one or more header fields and/or the body of the message (e.g., add warning message to subject of message, add warning message to modify sender address, etc.). The first risk analysis is performed before sending the modified version of the message. Sending the modified version may include delivering the modified version to the specified recipient (e.g., deliver to a mailbox of the specified recipient on server 106 of FIG. 1).

In some embodiments, modifying at least a portion of the message includes modifying (e.g., replacing, adding or removing/deleting) data included in a data field of the message that includes an identification of the sender of the message (e.g., modify an identifier of the sender). Examples of the identification of the sender includes a display name, an email address (e.g., "from" email address), a reply-to address, or any other identifier/identification of the sender specified in the message. The data field of the message may be included a header of the message. For example, the data field that includes the identification of the sender is a "From:" field, a "Reply-To:" field or a "Return-Path:" field of an email message header. The contents of the data field may be modified to provide a warning to a recipient, prevent a potential confusion of an identity of the sender of the message by the recipient of the message and/or prevent the recipient from responding to the message or sending a message to the sender of the message.

In some embodiments, the received message is modified to change, remove, and/or censure at least a portion of a content of the message (e.g., remove attachment, remove hyperlinks, remove a portion of the message content beyond a selected beginning body portion, etc.). For example, a message body section of an email message is modified to censure at least a portion of a content of the email message. In some embodiments, modifying the message includes inserting an inquiry associated with a verification of the sender of the message, wherein the inquiry requests a user response.

At 1210, a second risk analysis of the message is performed and it is determined whether the second risk analysis results in a determination that the message meets the second criteria. In some embodiments, the modified version of the message is sent to the specified recipient of the message (e.g., sent to a mailbox of the specified recipient on server 106 of FIG. 1) prior to a conclusion of the second risk analysis. For example, the modified version of the message is sent and delivered to a mailbox of the specified recipient of the message prior to the conclusion of the second risk analysis. In some embodiments, the second risk analysis concludes upon determination of whether the second risk analysis results in a determination that the message meets the second criteria.

In some embodiments in 1210, any of a plurality of different types of verification/security actions may be performed to further analyze and verify the message (e.g., verify an identity of the sender of the message). For example, it is determined whether a classification of the sender of the message requested and received from the specified recipient of the message matches an automatically identified classification of the sender, and it is determined the message meets the second criteria if a user response to the requested classification matches the automatically identified classification (e.g., see the process of FIG. 13A). In another example, an automatically generated reply message to a received message is sent the sender of the received message requesting verification of an identity of the sender of the message and it is determined the message meets the second criteria if the sender has provided a valid identity in response to the reply message (e.g., see the process of FIG. 14A).

If at 1210 it is determined that the second risk analysis results in a determination that the message meets the second criteria, at 1212, content of the message that was previously prevented from being accessed by the specified recipient is provided to the specified recipient of the message. The second risk analysis may be a more in-depth and/or resource intensive analysis of the message reserved for messages that fail the first risk analysis. For example, an original version of the message prior to the modification in 1208 is sent to the specified recipient of the message. This original version may be a duplicate message in addition to the initially provided modified version of the message (e.g., original version delivered as a new message to the specified recipient) or this original version may be a replacement message of the initially provided modified version of the message (e.g., initially provided modified message is deleted from mailbox of the specified recipient of the message and replaced with the original version). In some embodiments, the content of the message that was previously prevented from being accessed is included a new message sent to the specified recipient of the message.

If at 1210 it is determined that the second risk analysis results in a determination that the message does not meet the second criteria, at 1214 content of the message that was prevented from being accessed by the specified recipient remains not accessible by the specified recipient. In some embodiments, the message is deleted or quarantined. For example, after a period of time of message not meeting the second criteria and/or if it is determined during the second risk analysis that the message is potentially hazardous to a specified recipient of the message, the message is automatically deleted or quarantined to prevent access by the specified recipient to the entire message. In some embodiments, a notification is provided to an administrator. For example, the administrator is provided a warning about the message failing the second risk analysis.

Figure 13A:
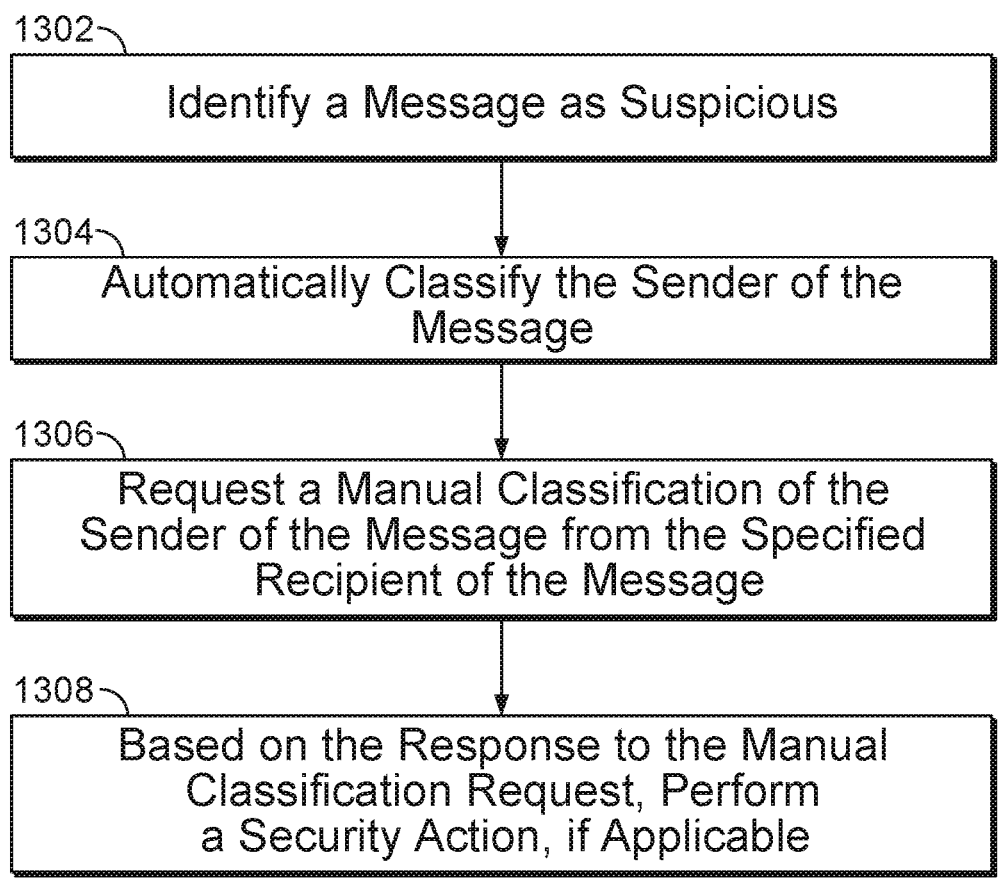
FIG. 13A is a flowchart illustrating an embodiment of a process for detecting misrecognition of a sender of a message by a recipient of the message.

FIG. 13A is a flowchart illustrating an embodiment of a process for detecting misrecognition of a sender of a message by a recipient of the message. The process of FIG. 13A may be at least in part implemented on analysis server 102, gateway 110, and/or message server 106 of FIG. 1. In some embodiments, at least a portion of the process of FIG. 13A is performed in one or more steps of the processes of FIGS. 2A, 3 and/or 4. In some embodiments, at least a portion of the process of FIG. 13A is performed in one or more steps of the process of FIG. 12. For example, at least a portion of the process of FIG. 13A is performed in performing the first and/or second risk analysis of the process of FIG. 12.

At 1302, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

In some embodiments, by basing the whether the message is suspicious on knowledge about trusted contacts of the specified recipient of the message, a message is only classified as suspicious and risky based on the likelihood that the recipient will confuse the sender with a trusted contact specific to the recipient. Otherwise, the risk may be marginal if the recipient does not know or trust the sender of the message since the sender is likely not impersonating someone that the recipient already knows. Thus a message is particularly dangerous if it is not from a trusted party, but the recipient thinks it is. In contrast, if the recipient knows that an email from an untrusted party is from an untrusted party, he or she is not as much at risk as he or she is not likely to feel compelled to comply with the requests or instructions in the message At 1304, the sender of the message is automatically classified. In some embodiments, classifying the sender includes identifying a classification/category of the sender. For example, a relationship classification/category of the sender with respect to the specified recipient of the message is automatically determined based on a property of an identifier of the sender (e.g., domain), previous message history between the sender and recipient, and/or other list or database (e.g., database of business contacts of the recipient). Examples of the classification of the sender include a college, a business partner, a friend/acquaintance, or unknown.

For example, if the sender is associated with the same domain as the recipient, then the sender is classified as a colleague classification. This classification may also be used if the email address of the sender is a known personal email address of a user with a colleague message address. This personal address may be determined using manual registration of such addresses by the account owner, as well as by identification of message traffic indicative of a work account being related to a personal account, such as having closely related display names and extensive forwarding of material from one account to the other. If the sender is a service provider or a client of an entity associated with the recipient, then the sender is classified as a business partner classification. This type of classification may be identified by detection of a sufficient volume of message traffic over time between the sender and the recipient, or from a database/list of recorded business contacts/relationships. In some embodiments, the sender is classified as a friend/acquaintance classification for a given sufficient volume of message traffic over time between the sender and the recipient but cannot be classified as a colleague or a business partner. If the sender cannot be classified as a colleague, business partner, or friend/acquaintance, the sender is classified as known/stranger.

In some embodiments, the sender of the message is automatically classified based on a list of trusted contacts tracked for the recipient (e.g., tracked using the process of FIG. 7). For example, a trusted contact in the stored list of trusted contacts may be associated with a classification identifier provided by a user and/or automatically determined. An identifier of the sender of the email may be utilized to locate a corresponding entry in the stored list of trusted contacts to identify its classification.

At 1306, a manual classification of the sender of the message is requested from the specified recipient of the message. For example, before the message is fully provided to the recipient, a classification of the sender of the message is requested from the user in order to verify the recipient's believed classification of the sender as compared to the automatically determined classification. In some embodiments, the message is modified to change, remove, or obfuscate (e.g., remove attachment, remove hyperlinks, hide phone numbers, only retain a beginning portion of contents of the message and hide ending portion of the message, etc.) at least a portion of the message to prevent the recipient from having full access to the message prior to verification of the recipient's knowledge about the sender of the message. In some embodiments, the message is modified to include selection choices corresponding to the classification options (e.g., different selectable HTML hyperlinks included in the message and selection of a particular hyperlink option sends a request to the unique address of the hyperlink that can be detected by a server to identify which classification option was selected based on the unique address of the request corresponding to the selection option). In some embodiments, if a recipient replies to the message to the sender prior to providing the classification, the reply message is held/ quarantined at a mail server until it is determined that it is safe to send the message. Another classification option is to identify the sender as a spammer or malware attacker. Selection of this classification may result in the removal of the email and blocking of future messages from the sender.

Figure 13B:
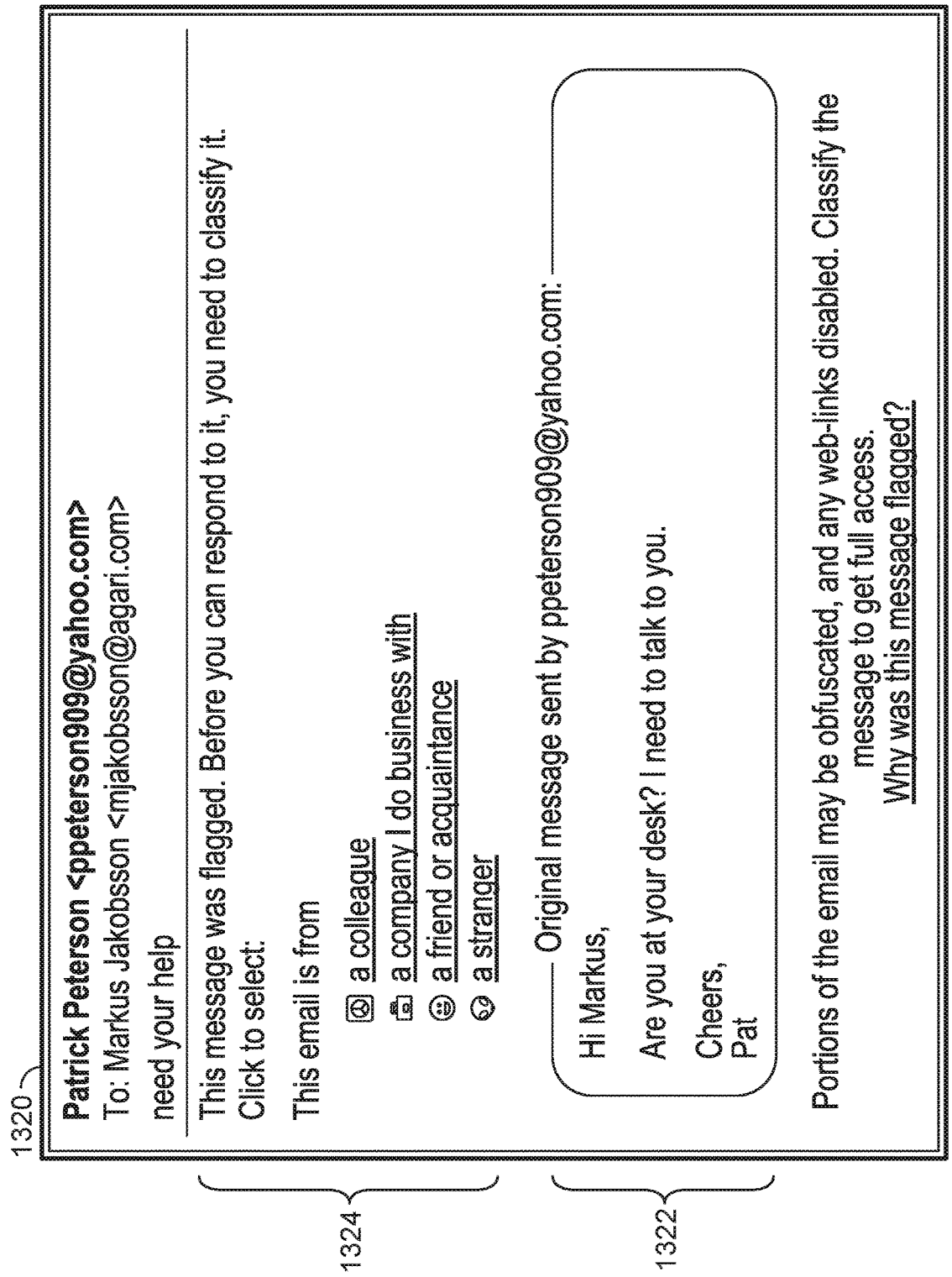
FIG. 13B shows an example of a modified message requesting manual classification of the sender of the message.

FIG. 13B shows an example of a modified message requesting manual classification of the sender of the message. Message 1320 includes contents of the original message 1322 as well as added selected choices 1324 that requests the recipient to classify the sender of the message.

Returning to FIG. 13A, at 1308, based on the response to the manual classification request, a security action is performed, if applicable. In some embodiments, if the manual classification response does not match the automatically determined classification, a security action is performed to warn the recipient about the mismatch and/or prevent the user from fully accessing or replying to the message. For example, the message may be deleted and replaced with a version of the message that has been modified (e.g., subject, sender display name, sender address, reply to address, and/or content of the message removed or modified with a warning indicator). In another example, the message may be deleted and quarantined for additional review by the recipient and/or an administrator. In some embodiments, in the event the sender of the message was correctly classified manually by the recipient and the automatic classification was incorrect, an opportunity is provided to add the sender of the message to the list of trusted contacts for the recipient and/or add an identifier of the sender (e.g., email address and display name) to an existing contact (e.g., as a secondary email address) in the list of trusted contacts. The sender may be added to the list of trusted contacts by the recipient, an administrator, or by the sender (e.g., by requiring the user to prove access to an account of an existing trusted contact).

Figure 14A:
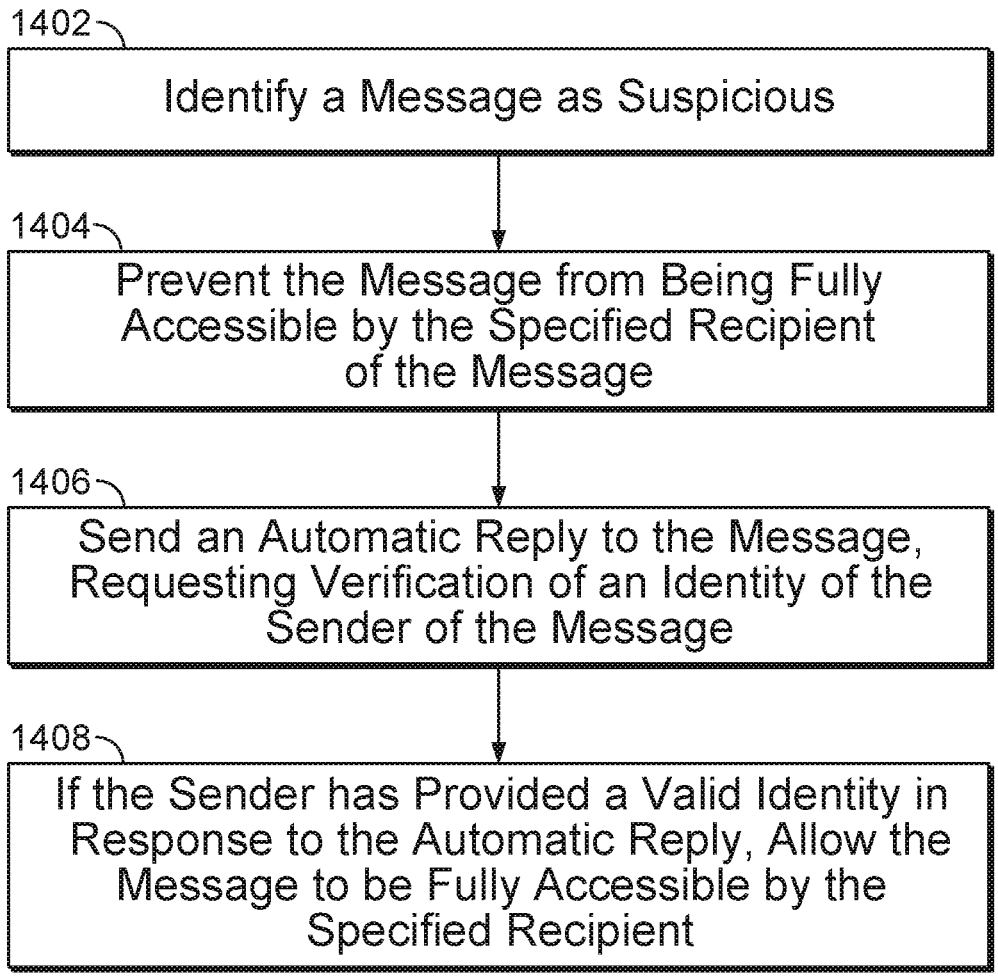
FIG. 14A is a flowchart illustrating an embodiment of a process for requiring a sender of a message to verify an identity of the sender.

FIG. 14A is a flowchart illustrating an embodiment of a process for requiring a sender of a message to verify an identity of the sender. The process of FIG. 14A may be at least in part implemented on analysis server 102, gateway 110, and/or message server 106 of FIG. 1. In some embodiments, at least a portion of the process of FIG. 14A is performed in filtering the message in 1006 and/or 1010 of FIG. 10. In some embodiments, at least a portion of the process of FIG. 14A is performed in one or more steps of the process of FIG. 12. For example, at least a portion of the process of FIG. 14A is performed in performing the first and/or second risk analysis of the process of FIG. 12. At least a portion of the process of FIG. 14A may be performed in one or more steps of the processes of FIGS. 2A, 3 and/or 4. For example, it is performed as a security action in 212 of FIG. 2A.

At 1402, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1404, the message is prevented from being fully accessible by the specified recipient of the message. For example, at least a portion of the message is modified or removed. In another example, the message is quarantined and not delivered to the recipient.

At 1406, an automatic reply to the message is sent requesting verification of an identity of the sender of the message.

This verification attempt may be utilized to identify good emails from accounts that are not trusted, but which are nevertheless associated with trusted persons. For example, if one executive's name is John Adams, and another executive receives an email from a John Adams—but not the same account as to which she has a trust relationship—then this is a potentially deceptive email—but also an email that is potentially from another account (such as the personal account) of the trusted person. The reply message includes the message "Your email triggered an alert. Have you sent emails to the recipient using another email address? If so, please click here. Otherwise, click here." The first hyperlink (associated with the first occurrence of "here") would lead to a website where the visitor enters his or her "other" email address (e.g., trusted contact address), and a verification email is sent to that address. That verification email contains a challenge value, such as a secret string of alphanumeric characters, that the recipient has to copy and paste into the site where the email address was entered. The second hyperlink takes the user to a site where he or she is offered to solve a CAPTCHA, associate a phone number (e.g., by sending an SMS challenge value to the phone number), or perform another action that attackers are typically unwilling to perform.

FIG. 14B shows an example of an automatic reply message requesting verification of an identity of the sender of the message. Message 1420 informs the user that the sender's message has been quarantined and will not be delivered unless identity of the sender is established. Message 1420 instructs the sender to forward the automatic reply message to a second message account (e.g., account of trusted contact) that the sender has previously used to communicate with the recipient and using the second account, forward again the forwarded message to a verification system for verification of the possession of the second account.

Returning to FIG. 14A, the automatic reply to the message may be utilized to detect spoofing attempts. For example, the automatic reply is sent to a system of the sender to request verification that the sender identified in the message actually sent the message. For example, at least two installations of message security systems, where a first installation is associated with a first entity and a second installation is associated with a second entity, the second system identifies receipt of an email originating with a sender associated with the first system. The second system then sends an inquiry to the first system, where the inquiry contains information related to the email. The first system determines whether the email associated with the inquiry was sent from the indicated apparent sender, and generates a response to the second system. If the second system receives a negative response, then the email is not delivered to the intended recipient, or if it has already been delivered, then it is either removed from the inbox or a notification is sent to the recipient, warning the recipient of the email. In addition, a notification may be sent to an administrator associated with the second system. In some embodiments, a notification is also sent to an admin associated with the first system. If, on the other hand, the response to the inquiry is a positive response, then the email is delivered to the recipient. If an email has more than one recipient within the second system, then it is delivered to each such recipient. Here, the first and second systems may access emails in different ways. For example, the first system may correspond to an outbound collector of emails and the second system to an OAUTH access of one or more email boxes. The first system may also be an appliance controlling or relaying emails, or be an OAUTH-enabled method to access the various mailboxes (including the sent folder) of one or more users. In some embodiments, all communications between the two security systems are encrypted and authenticated.

At 1408, if the sender has provided a valid identity in response to the automatic reply in 1406, the message is allowed to be fully accessible by the specified recipient. For example, if the user has provided an established position of an alternate trusted account that can be trusted (e.g., account of trusted contact) or has otherwise provided or proved an identity of the sender, the message is allowed to be fully accessible. Making the message fully accessible may include allowing the message to be delivered and accessed by the recipient with all of its original content. This may also cause the sender (e.g., sender email address) to be whitelisted or associated with an increased trust value (e.g., add to trusted contacts). In some embodiments, the provided full access message includes a warning, bringing to the attention of the recipient that this is an email from a potential stranger.

If the sender does not provide a valid identity in response to the automatic reply in 906, the message may remain unable to be fully accessible by the specified recipient of the message. In some embodiments, the message is indicated to an administrator and/or deleted.

In some embodiments, if the reply to the address of the message is identified or unknown to be unattended (e.g., not monitored by a recipient user), the message is provided to the recipient in a modified form and/or with a warning.

Figure 15:
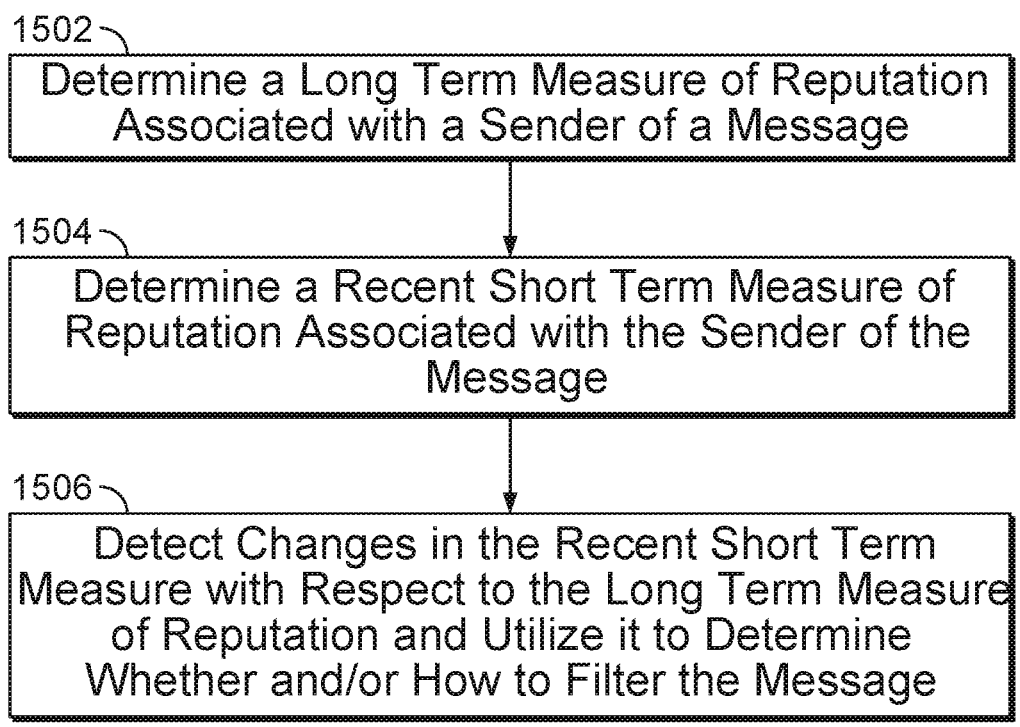
FIG. 15 is a flowchart illustrating an embodiment of a process for determining a change in historical reputation of a sender of a message.

FIG. 15 is a flowchart illustrating an embodiment of a process for determining a change in historical reputation of a sender of a message. The process of FIG. 15 may be at least in part implemented on analysis server 102, gateway 110, and/or message server 106 of FIG. 1. In some embodiments, at least a portion of the process of FIG. 15 is performed in filtering the message in 1006 and/or 1010 of FIG. 10. In some embodiments, at least a portion of the process of FIG. 15 is performed in one or more steps of the process of FIG. 12. For example, at least a portion of the process of FIG. 15 is performed in performing the first and/or second risk analysis of the process of FIG. 12. At least a portion of the process of FIG. 15 may be performed in one or more steps of the process of FIGS. 2A and/or 3.

At 1502, a long term measure of reputation associated with a sender of a message is determined. The long term measure of reputation may be for a specific address and/or domain of the sender. For example, long term measure of reputation is determined based on the amount of historical message traffic between the sender (or network domain of sender) and the recipient (or network domain of recipient). Large amounts of traffic may correspond to a high long term measure of reputation, unless there is a sufficient portion of the traffic that is flagged as undesirable (e.g., being spam, including virus/malware, etc.). Additionally, a long time period of traffic may correspond to a high long term measure of reputation, unless a sufficient portion is flagged as being undesirable. To the extent that it is available, a large open rate (e.g., the recipient opened the message) or a high response rate (e.g., whether replying to message or selecting links in message) also may correspond to a high long term measure of reputation, unless a sufficient portion is flagged as being undesirable. An example of a "sufficient" portion may mean that a fixed portion of the traffic, such as 2%. The long term measure of reputation may capture historical message traffic within several recent months. In some embodiments, when determining a long term measure of reputation for a domain, individual long term measures of reputation for accounts of the domain may be aggregated to determine the long term measure of reputation for the domain.

At 1504, a recent short term measure of reputation associated with the sender of the message is determined. The recent short term measure of reputation may be for a specific address and/or domain of the sender. The recent short term measure of reputation is determined using the same/similar factors as the long term measure of reputation but within a smaller time window. For example, the recent short term measure of reputation may capture historical message traffic within a day.

The recent short term measure of reputation may be low if a large portion (e.g., 5% of traffic within the time window) of message traffic between the sender (or network domain of sender) and the recipient (or network domain of recipient) is associated with complaints, spam detection, the detection of unwanted URLs, or unwanted attachments. An unwanted URL/attachment is one that is judged likely to be associated with risk, e.g., using a blacklist or an anti-virus scan. Complaints may correspond to users reporting an email as spam or phish, or placing it in a spam folder. Complaints can either be local (only a very small number of users, such as less than 1% of recipients, report the message) or pervasive (a greater portion of users report the email, e.g., more than 1%).

At 1506, changes in the recent short term measure with respect to the long term measure of reputation are detected and utilized to determine whether and/or how to filter the message. For example, if the sender is associated with a low (bad) long term measure of reputation (e.g., below a threshold) and a low (bad) recent short term measure (e.g., below another threshold), the message from the sender is identified as suspicious and filtered (e.g., blocked and/or modified with a warning). In some embodiments, if the sender is associated with a high (good) long term measure of reputation (e.g., above a first threshold) but low (bad) recent short term measure (e.g., below a second threshold), the message from the sender is identified as likely taken over by a malicious attacker. For example, the message may be filtered (e.g., blocked and/or modified with a warning), may require manual review by an administrator, or require an action by the sender (e.g., require sender to respond to a challenge) prior allowing delivery of the message (e.g., modified message with warning).

In some embodiments, let $R_i$ be a reputation associated with a receiver, and for concreteness, assume that this corresponds to a numeric value between 0 and 1, inclusive. Let $B_i$ be a recent short term measure of reputation associated with an email E received by the same recipient. For concreteness, this is also a value between 0 and 1, inclusive. Here, i is a number corresponding to the recipient. Further, let G be the long term measure of reputation associated with the email E, and may be a number between 0 and 100, for example. The value $SUM(B_i*R_i)/G$ is computed, where SUM corresponds to adding the entries associated with all recipients of E. If $SUM(B_i*R_i)/G > t1$, where t1 is a first threshold, then a first action is taken. This action may be to block emails from the sender of E, remove E from the inbox of all recipients, and determine whether any of the users who appear to have opened E have had their computers corrupted or credentials stolen. This can be determined by asking the user, by scanning the user's machine, or by reviewing logs of incoming/outgoing traffic to the user's machine, where this review is preferably automated. Further, the action may involve increasing $R_i$ by 10% for each user who filed a response $B_i$ indicative of a threat. If $SUM(B_i*R_i)/G < t2$, where t2<t1 then the reputation $R_i$ of each user who filed a response $B_i$ indicative of a threat is decreased, e.g., by 5%. If the number of users filing a response $B_i$ is indicative of a threat within a time T of receipt of the email E, then the email is considered to be associated with pervasive badness, otherwise local badness.

Generation of Flash Signatures for Defense Against Targeted Attacks

Targeted attacks are a threat to enterprises, governments, and wealthy individuals. Most targeted attacks use email for delivery, due to the ubiquity of email and the poor built-in security of email.

The traditional approach to detecting abusive emails is to create a blacklist of artifacts known to be unwanted; additions to this blacklist are typically made after large volumes of a malicious artifact have been transmitted, and some of the emails reported or trapped in honeypots and thereby brought to the attention of a person or algorithm that initiates the blacklisting of the artifact. This is a process that is poorly suited to targeted attacks, since such attacks typically intentionally avoid volume use of artifacts.

A better approach to detect targeted attacks is to identify when an email is deceptive, e.g., an email from a stranger that uses a display name that matches the display name of a party that the email recipient trusts. However, while believed to catch most deceptive emails, no security technology is foolproof, and it is therefore beneficial to create backup detection methods that help provide a second line of defense.

Detection of deceptive emails is utilized to train an early-detection structure based on signatures. A simple example illustrating the method is to detect a collection of deceptive emails, such as emails that use some form of identity deception, and to extract all artifacts from these deceptive emails; then to determine that some artifacts occur some minimum number of times, such as at least twice, and then to determine that these artifacts are not common among desirable emails (e.g., high confidence in determining malicious emails); such artifacts are determined to be high-risk, and a signature is automatically generated to identify them. This signature is then applied to other emails that were not identified as being deceptive. These include both emails being sent at a future time, and emails that have already been delivered. A security action is then taken on any detected emails; this security action would preferably be the same as that taken for the emails from which the artifacts were first extracted, or based on a classification rule that changes as the system learns more about the nature of the threat. Such additional learning includes insights derived from sandboxing (whether automatic or manual), automated website scraping, and more. Example security actions comprise not delivering the email, or if it already has been delivered, to remove it from the user inbox; to quarantine the message; to mark up the message with a warning; and to send the message for additional scrutiny, including manual review, or automated analysis such as sandboxing, or to feed the email to an active defense system that automatically, semi-automatically, or using manual effort engages in a conversation with the apparent attacker in order to identify the nature of the threat, collect identifiers such as bank accounts and email accounts to be sent to service providers for take-down, and more. If the blacklisted artifact, i.e., the artifact from which a signature was produced, is associated with a sender that the system recognizes as trusted, then this preferably triggers a review of whether this sender has been compromised; whether the sender sent the artifact legitimately; and whether the signature associated with the artifact should be modified or removed. As the system observes additional uses of the artifact, it manages counters related to whether the artifact was part of a known-bad email, e.g., based on the email having a deceptive identity as the sender; whether it is associated with an apparent stranger with respect to both the recipient and the system as such; and whether the email is associated with a sender that the system has listed as trusted, whether with respect to the recipient or in general. The system generates and maintains a risk score based on these counts, and preferably also based on the time of arrival of the different associated emails. Using this score or weighted score, the system selects what signatures to consider active, meaning traffic is compared with respect to them; and which ones are stored for potential future use. As a weighted score falls below a threshold, the associated signature for the artifact is not considered active; as it falls below another and lower threshold, the signature is not stored as a prospective signature for which the score is still maintained. If a score associated with a signature that is stored as a prospective signature increases above the first threshold, then the signature is again made active. Signatures whose score falls below the second threshold are not stored as prospective signatures, but either not stored at all or only stored as a historical signature. A person skilled in the art will recognize that this approach enables an agile system with low error rates, and furthermore, by associating an action such as delete, quarantine, or mark up with a warning on a per-signature basis, it is possible to minimize the practical impact of a false positive in which a legitimate email is flagged as deceptive based on containing a blacklisted artifact. A person skilled in the art will further appreciate that an artifact can be one or more attached files; one or more included URLs; one or more matches with text sequences; a match with a cascading style sheet or other formatting convention; the attack type classification of an email; or any combination of these. A feature is an individual measurable property or characteristic of a phenomenon being observed.

To address an adversary with ever-changing strategies, there is a need to detect signatures of attacks as the latter are created or modified. This is the notion of agility, which is one of the benefits of the disclosed method. This is achieved by frequent evaluation of threats and comparison with established signatures and other detection methods, to determine what signatures and other methods to retire. Alternatively, in an embodiment wherein signatures are verified according to a probabilistic schedule, a signature that is more likely to be triggered, especially when no other detection method is likely to trigger, is attempted to be matched with a potential threat with a greater probability than a signature that is less likely to trigger. The benefit of this approach is that it is sensitive to cache sizes, where the cache is used to hold signatures to be attempted to match with potential threats. Not all signatures are necessarily compared for any one potential threat. The selection may be made based of detected features, such as potentially deceptive display name, emails from likely strangers, emails from senders with low reputations, emails containing attachments (especially of types that can be executed), and emails with subject lines that are considered high risk. These are only some examples of such features, as will be understood by a person skilled in the art. Signatures are selected to be placed in a cache at least in part based on their associated probabilities of matching threats that are not detected by other detection methods including other signatures, which are identified by a benefit score. The benefit score can be computed in a variety of ways. In one example embodiment, it comprises three values: one counter indicating how often it has been attempted to be matched within a window time period; one counter indicating how often it is triggered in this window time period but where no other signature with a higher current benefit score triggered; and one score that is the second counter divided by the first counter. Thus, if one signature has been the signature with the highest benefit score to trigger eight times during a time period of two days out of an attempted two hundred attempts, then the score is 0.04. Another signature with a score of 0.16 is four times as useful for an unknown threat. Therefore, the first signature is selected with a probability of $0.04/(0.04+0.16)=20\%$ of the time, should the cache only allow one of these two signatures to be stored. This is a simplified example, though, as a realistic implementation would use caches with space for hundreds if not thousands of signatures, and the system may maintain hundreds of thousands of signatures at any point in time. Here, the cache does not need to correspond to a physical storage cache, but could be represented by another form of storage; the cache corresponds to the storage space associated with a filter sensor. In one example embodiment, this filter sensor corresponds to a local filter in a mail server or gateway. Additional signatures may be stored locally, on other computers and storage, and accessed through a LAN, or may be stored in a cloud server, or a combination of these. Periodically, a central repository of signatures feed new signatures to local repositories, which then select which ones to store based on associated scores, including benefit scores. Not all mail filters would cache or store the same signature at a particular point in time. Thus, one server may detect threats using different signatures than another server, but as some signatures trigger at a larger number of threats, their associated benefit scores increase locally. A central authority collects updated scores and promotes useful signatures to local filters by sending updated scores for already cached signatures, or scores and signatures for signatures that are not cached. This causes good signatures to be identified at a local level but promoted to a global level, thereby taking advantage of the distributed system identifying their usefulness.

In a system where the time constraints limit the amount of signatures matched to potential threats, these are also preferably selected using a probabilistic method based on their estimated benefit score. A local server can request from a repository, including a cloud repository, to receive signatures corresponding to selected criteria, e.g., addressing BEC threats; addressing malware threats and having benefit scores above a threshold; and addressing threats associated with attachments, signatures with estimated false positives below a threshold value, and more. This way, a decentralized detection system using the disclosed technology allows for local differences in terms of specializations and requirements. As a result, different distributed systems can be clustered in terms of the similarity of their needs and requirements: they will correspond to greatly overlapping collections of signatures being cached. This will happen automatically, but is helpful for the centralized authority to quantify, as it permits effective sharing of threat information, including information relating to scores and signatures, between entities that are in one and the same cluster. It also helps identify risky subsystems: when one such subsystem is successfully attacked, other, closely related subsystems can be reconfigured. One such reconfiguration is to cache a larger number of signatures of a particular type; or to forward all emails matching some criteria to a cloud detection unit that then performs a more in-depth security analysis of these emails, without significantly increasing the computational load on the subsystem at risk. This can be reconfigured again once the threat is identified as having changed anew.

A first phase of an embodiment, is the detection of high-risk emails based on a detection method not using signatures or artifacts, but based, for example, on a deceptive sender identity. An example of emails with deceptive sender identities include spoofed emails, which can be detected by observing an email without a DMARC signature when one is expected, or with invalid SPF data. Another example of emails with deceptive sender identities are emails from strangers, with respect to the recipient, with display names matching trusted parties with respect to the recipient; or emails sent from webmail accounts where the display name is set to correspond to a brand identity, such as "ACME Bank." This type of deceptive email can be detected by identifying emails coming from non-trusted senders but where the display name matches a trusted sender, wherein "trusted" can be defined as a sender that a recipient has had at least a minimum amount of interaction with, has in his or her contacts list, or which corresponds to an entry in a whitelist of commonly known brands. A person skilled in the art will recognize that there are additional methods of defining trusted, and that this is just an example definition for the sake of concreteness. Yet another form of deceptive email is an email that comes from a sender using a look-alike domain, such as "<user>@AcmeBank.high-security1234.com," where <user>corresponds to a user name such as Alice Boss, high-security1234.com is an unknown domain registered by the attacker, and AcmeBank is a well-recognized brand used as a subdomain. A person skilled in the art will recognize that there are many other examples of look-alike domains, and will know that they can commonly be detected by using a distance metric and a whitelist, where the system determines whether a domain, subdomain, or combination thereof have a distance from a whitelisted domain that is below a threshold set by the system. Yet another form of deceptive email is an email sent from a corrupted account. This can be a trusted corrupted account, following the above definition of trusted, in which case it can be detected by the system recording what Mail User Agents (MUAs) are associated with a given email sender, followed by the detection of an email that uses another and potentially suspect MUA. A new MUA is not immediately a sign of certain corruption, but a sign that can be used to automatically or manually establish whether an account take-over (also known as a corruption) took place. A corrupted sender is trusted in a situation such as where the attacker sends malicious emails to prior contacts of the account owner of the account he compromises. In contrast, an attacker sends emails to other email users, e.g., by sending malicious emails to a set of users not associated with the corrupted account. Emails from corrupted accounts that are untrusted senders can be detected by use of detecting the presence of blacklisted artifacts, or by detecting emails from non-trusted parties but containing files that are high-risk, such as encrypted zip files or executables. The former use case indicates another important use of flash signatures derived from blacklisted artifacts. Emails can also be identified as likely to be deceptive based on complaints filed by recipients, who may, for example, forward such emails to the security service or provide feedback to their mail reading program, where an example feedback is to place the email in the spam folder. An automated agent with access to the user mailbox can detect that an email was moved by the recipient from the inbox to the spam folder, and thereby identify it as potentially deceptive or high risk, and export the email or portions of it to a server processing high-risk artifacts and generate signatures from these.

A second phase associated with an embodiment of the disclosed method is the selection of artifacts to generate signatures from. The system identifies artifacts associated with malicious emails, such as emails from known bad senders, containing known-bad artifacts, and emails that are deceptive, as described above; it then extracts all artifacts from it. Artifacts might be explicit or implicit. Explicit artifacts are pieces of information that exist in the content of an email or its header. In comparison, implicit information is information that is computed based on a function defined over the explicit functions. For example, location of a sender of an email is an implicit artifact that is generated based on the IP address of the email sender, which is an explicit artifact of a received email. A malicious email may have multiple artifacts (both implicit and explicit artifacts), such as a text snippet; an attachment; location of the sender; a subject line; or a display name. Having extracted one or more artifacts from the malicious email, the system determines whether these have already been recorded, and if so, increases the associated counts associated with senders that are believed to be malicious. Otherwise, the system generates one or more tentative signatures from the one or more artifacts, where a signature depends on one or more artifacts. The system then determines the commonality of the generated artifacts in traffic from trusted senders, and in traffic from untrusted senders that do not appear to be malicious. If these counts are below set thresholds, such as no more than 0.00001% of trusted emails containing the artifact and not more than 0.01% of untrusted but believed to be non-malicious senders having the artifact, then the tentative artifact signature is stored, otherwise it is discarded. If an email contains two artifacts and both of these result in the tentative signatures being discarded, then the system determines whether a signature generated from the combination of the two artifacts would be also discarded. This way, the system generates signatures that are "sufficiently unique" to malicious traffic to cause no more than an acceptable number of false positives. This corresponds to the confidence of the signature. These signatures are stored, along with the statistics used to validate them. Later on, these statistics are updated and used for selection of what signatures to use as active signatures, which ones to retire from being active, which ones to prioritize if the system is short of resources, and so on. In one example, an email contains an attachment that has a name, a size, a type, and a content. A signature may be generated from the name, size, and type, or if that is not sufficiently unique, from all of the features. A signature can also be generated from the attachment features and, in addition, from additional features of the email, such as "sent by a trusted party," "sent using an API," "subject line is less than 20 characters long," and "subject line contains the word 'invoice'." The signature is a description of the artifact and its features, and may be expressed as a list of these descriptors, or optionally, as a value that results from ordering the artifacts and features according to a pre-set order, such as alphabetically, and applying a hash function such as MD5 to the ordered list. Alternatively, more than one signature can be generated from one set of artifacts, where one signature could be in "accessible" format, and therefore readable by a program or a person, and another signature can use a compression function or cryptographic digest function to generate a fixed-length signature. In cases where the "accessible" signature is too long to be practical to read and process each time an email needs to be scored with respect to matching stored artifacts, the digest signature is preferred. On the other hand, in situations where approximate matches with signatures is desired, such as "9 out of 11 features are matched," the accessible signature is preferred. In one embodiment, the system also stores multiple signatures that are accessible, where each signature is associated with a certain degree of certainty. For example, many attacks may use zip file attachments that contain files whose names include the word "invoice," but this may not be sufficient to determine that the email should be blocked, but only for a warning to be incorporated in the email; however, if another signature is also matched, describing that the length of the file in the zip file is 10225 bytes long, then the email is blocked. This is because this adds certainty to the system. Thus, the automated analysis of one or more malicious emails may result in multiple signatures per such emails, each one of which is associated with different expected error rates, and also associated with different security actions to be performed when the signature is triggered, whether alone or in combination with other signatures. All generated signatures that pass the thresholds described above are stored in a memory area, out of which there is at least one type, but preferably many types, each type corresponding with a treatment of the signature. Example treatments include active signatures that are matched to a large share of incoming emails, where the exact selection may depend on the general risk exposure at the time of the delivery; the risk associated with at least one of the sender, recipient and message; and system aspects such as the system load. Another treatment is to store the signature in a storage area whose signatures are updated when malicious emails are detected, or periodically, such as once every night when the system load is low. Yet another treatment is to simply store the signature for later review of it and its catch rate. When a collection of features are being observed in an email, they form a pattern. We can call a pattern that is qualified to detect abuse a "signature." One measure of the quality of a signature is a score that we refer to as the support score; a high support score corresponds to a pattern having identified a malicious email a large number of times. In one embodiment, if two signatures detected the same set of malicious emails, but one of them detected an additional malicious email, then that is better. Thus, the system determines, preferably in batch mode, when such pairs of signatures exist and remove the signature with the smallest support score.

Implicit features are those extracted from implicit information of an email. For example, the number of words and characters in the subject line, and the language of the email can be determined based on the subject line and content of an email. Another example of implicit information is the location of a sender of an email that can be extracted using an IP address of a sender. Also, features indicating if a sender is using a proxy or Tor for sending an email are other examples of implicit features. Auxiliary information also can be used to form implicit features. For example, HR information of an organization can be used to determine if a receiver of an email is a "C" level executive. Another type of implicit information includes applying quantization methods. For example, a feature can be extracted to identify if the email is received during the work hours, or it is being received after hours. Similarly, if the email is received during the weekdays or weekends is determined. Another class of implicit features is related to stylometric aspects of the content of emails, such as length of sentences, usage of punctuation, pronouns, etc.

A typical format of a signature is in the form of a set of name-values. However, for sake of scalability of comparison of incoming emails with signatures, a signature will be normalized as a string of characters that is formed by concatenating name values in ascending or descending order of names.

A third phase in an embodiment is the management of signatures. A score is kept for each signature, where this score preferably is a function of the commonality of the associated artifact(s) in deceptive or otherwise malicious email; the commonality in emails from strangers that is not classified as deceptive or malicious; and the commonality in emails from trusted parties. The function also preferably normalizes these counters by counters indicating the volume of deceptive, malicious, from-stranger, and trusted emails, and uses windowing to discount historical events in favor of recent events. An example scoring function is the value S, where S=0 if the commonality of the artifact(s) in trusted email exceeds a first threshold, such as 0.00001% of all trusted emails, and S=10000*DA/DT+SA/ST otherwise, where DA is the count of deceptive emails in the last week having the artifact, DT is the total volume of deceptive email in the last week, SA is the count in the last week of the artifact in emails from strangers (relative to the recipient), and ST is the total number of emails from strangers in the last week. Here, 10000 is a scaling factor that can be configured by individual recipients or their organizations, and which is used to trade the importance of artifacts in targeted attacks against that of non-targeted attacks. The system then manages a collection of the highest-scoring signatures as active signatures; these will be used to detect potential abuse. The system may also maintain a collection of active signatures relative to a particular organization that is a client of the security system, where this collection may add a weight for attacks of some types, such as BEC attacks or ransomware attacks, and may use a different window size or other windowing technique. Preferably this latter list would not keep any duplicates relative to the "universal" active list. The recipient-specific active list would be used to detect threats for traffic sent to the associated client. A client can also configure the system to identify threats in outgoing traffic; this detection can be governed by yet another list of active signatures, computed according to yet different criteria. Each signature is also associated with at least one action indicator, where different clients can select different actions, and where the actions may depend on whether the traffic is incoming or outgoing, and on the observed volume of the detected artifact. A more common artifact, for example, can receive priority in terms of manual and automated review, making quarantine potentially more attractive than marking the email up with a warning and delivering it, or the use of open quarantine, which a person skilled in the art will recognize is a combination of quarantine and email content modification. In addition to maintaining active lists, the system also maintains lists of potential threats. These correspond to signatures with lower associated scores. The signatures of this type are not matched to incoming emails, but are periodically updated with respect to their associated score. When a new signature is generated, it is placed in this list, unless its signature score is sufficiently high for it to be placed in an active list. If a signature score falls below another threshold, the signature is removed from this list and only stored in a historical list; alternatively, the system may keep signatures with scores below this threshold for some amount of time, such as one week, and then remove the signatures unless their associated scores have increased above the threshold again. In one embodiment, signatures are primarily generated to address targeted threats, such as spear phishing and Business Email Compromise attacks, whereas in another embodiment, signatures are primarily generated to address malicious scattershot attacks such as malware attacks, including ransomware attacks; in yet another embodiment, both of these types of threats are addressed. In this latter case, the signatures associated with targeted attacks may be kept separately from the signatures of the non-targeted (or scattershot) attacks, or separate quotas for the two are maintained; alternatively, the two types may be weighted in different ways when the score is computed. For example, a targeted attack may have an associated multiplier weight of 10 associated with the generation of its signature, relative to the scattershot attack. This is to account for the likely lower volumes of targeted attacks, and the commonly higher risk associated with them. In another embodiment, the score associated with a signature takes as input a value that corresponds to the risk associated with the attack, where the risk value corresponds to a combination of the likelihood of victimization and the expected losses for each victimization. For example, for a BEC attack, the system may have a likelihood weight of 22 and a loss weight of 10, whereas for a scattershot ransomware attack, the likelihood weight may be 3 and the loss weight 7.25. In an example embodiment where the risk score is computed as the product of the likelihood weight and the loss weight, these two attacks would have risk scores of 220 (=22*10) and 21.75 (3*7.25). These risk values may be used to impact the scores associated with signatures for two associated threats; if used as additive values, the score for the BEC attack would be increased by 220 whereas the score of the ransomware attack would be increased by 21.75. Such risk-based modifications can preferably be performed conditional on a certain recent activity, e.g., only if the signature has been matched at least twice in a day; risk-based score modifications can also be performed using any other arithmetic and logical operations, just like the score function may be using any such operations. Additional scores are also preferably managed, such as the benefit score described above. The use of scores associated with signatures enables the selection, propagation, updating, prioritization, modification, and retiring of signatures, as will be clear to a person skilled in the art. The scores represent false positive rates, false negative rates, cost of evaluation, and the extent to which the associated signatures contribute to the detection of malicious content in the presence of other signatures—the latter is a form of coverage score indicating the extent to which only the associated signature identifies a threat. Thus, low coverage means that other signatures detect the same types of threat. Scores can be Booleans, integers, real values, and multidimensional representations comprising such values; scores can be absolute, like a false positive score, but can also be relative to other signatures, such as coverage scores. A person skilled in the art will appreciate that the scores associated with a signature represent a modifiable and flexible description associated with the management of the signature. Similar records of scores are also useful to associate with other detection methods for the same purposes, as will be appreciated by a person skilled in the art.

Signatures and other detectors are preferably associated with a hierarchy. For example, one detector determines whether an email comes from a party with a relationship to a recipient, e.g., is from a party who has exchanged at least a threshold number of emails, such as six, with the recipient over a time exceeding a threshold time value such as two weeks. If this detector triggers, then a first collection of associated rules and signatures are evaluated, whereas if it does not trigger, another second collection of associated rules and signatures are evaluated. The first collection, evaluated only when the email comes from a party with a relationship with the recipient, may contain a rule or signature aimed at determining if the email contains a malicious attachment. If so, it is concluded that the trusted sender has been corrupted, and this party is notified of the breach. The message is also redacted to make the unsafe components safe, e.g., removing macros from an excel spreadsheet, or wrapping the spreadsheet in a file, as described above, where this file causes the macros to be suppressed, or which evaluates their functionality in a sandbox. The first collection may also contain rules and signatures identifying spoofed messages. The second collection, evaluated only when the email comes from a party without a relationship with the recipient, may also contain a rule or signature aimed at determining if the email contains a malicious attachment, but if so, then the email is simply not delivered. The second collection may also contain rules and signatures aimed at detecting the use of display names indicative of a trusted party. A person skilled in the art will appreciate that additional levels of a hierarchy are beneficial, and can be used for further contextualization of what rules and signatures are evaluated provided a particular context. The context comprises the received email, its sender, the history between the sender and recipient, as well as indicators not related to the message, such as local and global threat levels; one such threat level indicator can be used to prioritize the detection of one or more types of threats, and is useful to suppress wide-spread campaigns of related attacks.

Some of the signatures are global and some are local. Global signatures apply to multiple parties to be defended, whereas local signatures are specific to one group of users, such as those belonging to one organization or part thereof.

A fourth phase of an embodiment is the detection of malicious emails using system-generated signatures. As emails are processed by the system, the system determines the potential presence of artifacts in these emails. This can be done for all emails, or it can be performed selectively or even probabilistically. For example, the system may scan for a particular type of artifact, or for a particular signature, only if the recipient matches a list of high-priority recipients, or the sender or the message triggers a deep scan in which signatures are matched. Such a trigger may be dependent on the sender and the message, e.g., the message being received from an anomalous location, at an anomalous time (both with respect to other messages from the sender). It may also be dependent on the recipient, e.g., a recipient that has recently been in the news and may therefore be more targeted, or a recipient whose associated end user has been found to perform dangerous actions, such as clicking on attachments from strangers. Some signatures may be attempted to match only for some messages, which may be selected using a pseudo-random method (such as selecting a pseudo-random number between 1-100 and determine if it is less than a threshold set to 37), or if some criteria not known to be typical senders are satisfied (e.g., the sending date and time converted to seconds after a baseline time is an odd number). If such a probabilistic scan results in detection, the system may automatically modify the matching for this signature, all signatures belonging to a similar category (such as 'associated with malware distribution'), or all signatures. This is similar to how some organizations, when under attack, scrutinize each incoming entity, but otherwise only scrutinize entities assessed to be high-risk, or selected at random. Another matching approach is to use the score associated with a signature to determine the likelihood of a probabilistic verification. However, if the system attempts to match one signature with a high score, and this involves scanning for keywords in the subject line and scanning for the existence of an attachment that is a zip file, then other signatures also depending on scanning subject lines and the type of the attachments are preferably also verified, since the incremental cost of doing so is marginal. Therefore, signatures are preferably organized within their relative lists in a manner that reflects the type of artifacts they depend on, allowing simple "discounted" verification of signatures by a system that is resource constrained and cannot verify all signatures. Another alternative is to perform some verifications in real-time, and others in batch mode. For examples, messages sent to a user that is not believed, based on his or her account activity, to be currently active could be delivered or quarantined at the time of arrival of the message, and scanned before the user is believed to again become active. This allows delayed scanning and delivery of messages during inactive hours, such as during the night; if a user suddenly appears to be active during a time it was assessed he would not be active, all messages for this user, whether quarantined or delivered without a careful scan with respect to signatures, can be processed. In one embodiment, the scanning of messages with respect to signatures can be outsourced by the security service to agents located closer to the recipient, such as mail servers and gateways. In another embodiment, the scanning of messages is run as a cloud-based service, and in another using an appliance-based security service inserted in the delivery path to the recipient. In one embodiment, only cached signatures are scanned for, where some portion of the active signatures is cached by servers performing the matching. Different servers may receive different sets of cached signatures, where some signatures are given to all or many servers and other signatures are only given to some. The allocation of signatures to servers can be probabilistic or based on historical detections, as well as on configurations made in response to requests by clients; or a combination of these approaches.

Signatures can be automatically classified based on their value and error, where the value corresponds to a combination of the assessed likelihood that the signature will block a threat and the risk associated with the threat; and the error corresponds to the assessed or measured risk that the signature will result in a false positive, i.e., the incorrect classification of a message as being malicious. The latter can also be weighted by the harm associated with such a misclassification, where this is a value that reflects the assessed loss of benefit associated with performing the filtering action associated with the signature when this should not have been done. It is evident that the loss is greater for the blocking of messages than the open quarantining of messages, for example, making the loss a recipient-specific value given that different recipients may have different actions configured for one and the same signature. (Alternatively, signatures can be generated and maintained on a per-recipient basis, with potential overlap between organizations. From a system storage and computation perspective, this may be done virtually only, and the real representations and processes stored in a manner that allows greater resource reuse.)

In one example use case, an attacker sends ten emails that are malicious. Four of these are detected as malicious by a security service that detects identity deception, and another two are detected based on a security service that identifies servers and IP addresses that are associated with malicious behavior. However, the remaining four emails are not detected. Based on having identified six emails to be malicious, along with other malicious messages that are also detected, the disclosed technology extracts features from the known-malicious emails and clusters these. The clustering results in the six above-mentioned emails being found to be similar, based on having the same features. These features include subject lines, header contents, email text, email formatting such as cascading style sheets, and attachments and descriptions of these attachments. Example attachment descriptions include the name of the software that produced the file, the name of the file, the length of the file, the date the file was produced, the size of the file, the type of the file, keywords in the file, and more. This collection of features comprise an agile signature. The system determines whether this signature triggers traffic that is not known to be malicious. In this example, it only triggers the four emails that were part of the burst sent out by the attacker, and not other emails. It does not trigger emails that have been observed from trusted senders. This makes it a good signature, as it is likely to have low false positives. One or more such signatures are generated from each cluster of malicious messages. These signatures are stored for a limited period of time, and scored. A signature's "hit score" increases every time it matches an email. A signature also has a "confirmation score" that increases every time the signature matches an email that was already known to be malicious, based on other metrics and detectors, such as identity deception detectors. In addition, the system stores when such matches took place. A signature with a high confirmation score is trustworthy. A signature with a low hit rate is not useful. A signature that is trustworthy and useful is good. If a signature has a low confirmation score, this could be due to catching non-malicious emails, i.e., causing false positives, or due to there being a large number of malicious emails that is not detected using the techniques that were first used to identify the cluster and generate the signature. The former is undesirable, whereas the latter is a sign of success for the signature method. While it is better not to rely on signatures in the long run, as they are not believed to be as robust against adversarial changes, it is desirable for the signatures to pick up where other measures fail. To resolve whether a low confirmation score corresponds to a high false positive rate or a high catch rate of the signatures relative to the catch rate of other techniques, messages that cause the hit score but not the confirmation score to increase are further scrutinized, whether all of them, or a sample of them. This additional scrutiny can be implemented in a multiplicity of ways, including but not limited to manual review by an expert, additional computational analysis, such as sandboxing and detonation, one or more rounds of automated interaction with a party associated with the sender, such as the apparent sender, a party associated with the reply-to address, a trusted party with the same display name as the display name of the sender, and more.

By performing additional analysis, it is determined whether the triggering messages were malicious (indicative of a high relative catch rate of the signature, which is desirable) or benevolent (indicative of a high false positive rate, which is not desirable). If a signature is found to have a high relative catch rate, this can trigger a notification to an admin to attempt to find other non-signature methods to detect the malicious cluster of emails, and if a signature is found to have a high false positive rate, then it may be retired or augmented. An augmented signature is one with additional requirements imposed for it to trigger, such as additional features required to be detected. If a signature is retired or augmented, then messages that triggered the old signature, prior to this action, can be re-evaluated and, conditional on another triggering outcome, a retroactive action can be taken.

Good signatures that keep getting triggered are saved, whereas signatures that are not good are deleted or retired, and signatures that do not keep getting triggered are retired based on resource constraints, such as constraints on how many signatures can be kept active at any time, where an active signature is matched against at least some email to determine whether it triggers. When a good signature is triggered on an email, a security action is taken in this email. This action may be associated with the signature that was triggered; for example, a signature that is associated with a malicious campaign involving certain abuse causes the email to be blocked, whereas a signature associated with a likely malicious campaign involving likely abuse causes the triggered email to be augmented with a warning. When a signature is created, the system preferably retroactively detects whether messages triggering this signature have been delivered to users, and are in their inboxes; if so, the system may take a retroactive filtering action.

Another inventive aspect of the disclosed technology is a wrapping technology that is used in the context of encrypted zip files. These constitute a risk to systems as risks associated with these are poorly detected, and commonly both attackers and benevolent users send encrypted zip files. As the files are opened and decrypted by the user, the mail security software is no longer in control. To address this, encrypted zip files are detected when they are sent as attachments to emails and other messaging systems, such as Skype, and then replaced with what we refer to as "wrapped" versions. A wrapped version of an encrypted zip file is a file that, when opened, causes execution, whether of the file wrapper itself or of an associated application that the message recipient needs to download, and as the file wrapper is executed, it performs three tasks: (1) it requests a PIN or password from the user, and receives this; (2) it uses the PIN or password to decrypt the wrapped zip file. This is done by executing the unzip program associated with the zip file, or a compatible version to this, providing the unzip program with the PIN or password provided by the user; and (3) automatically accessing the contents of the unzipped file, determining for its contents whether any of these files is risky. This can be done in a multiplicity of well-known ways, including detonating each file; determining whether any of the files match an AV signature; determining whether any of the files has executable code segments in it, and more. As a person skilled in the art will appreciate, the same approach also works for messages with attachments that are encrypted pdfs, or any other encrypted file type; in such cases, the execution of the wrapper file causes the decryption of the encrypted file, which is then scanned for risky elements, including executable code. If a file, independently of type, passes the verification, then the decrypted file is made available to the recipient, whether this corresponds to the decrypted zip file or its contents, a decrypted pdf, or other file. After the verification passes, the wrapped file would preferably be opened for the user to see. Thus, the user experience associated with the opening of wrapped files would be the same as that of unwrapped files, except for a delay that in most cases would be too short to detect, and but for the effects of opening a malicious file, which of course is the goal of the novel approach to address. If an encrypted file is found to be malicious after having been decrypted, then a signature is preferably created for the encrypted file and the emails it was associated with. Such a signature may, for example, be a file type, such as "encrypted zip file," the size may be 18007 bytes, and the creation date may be "Jan. 6, 2017." Based on this signature, other malicious messages containing this payload with a very big likelihood can be detected. This is preferably done not only for emails to be received by the system after the signature is created, but also retroactively, by accessing the inboxes of users, or by accessing a database proactively built as the messages arrived, describing the features of emails that are high-risk according to some measure, such as having an encrypted zip attachment and being from a non-trusted party. Such records would indicate what users received these attachments, and identify the emails. As soon as the system has identified candidate messages to be compared with the new signature, a match is made, and if the new signature triggers, then a retroactively applied filtering action is taken.

In one example, an attacker has corrupted a collection of email accounts, and is using that to send malicious emails. In FIG. 16, one such example email is shown. The headers of the example email is also shown in FIG. 17. In some embodiments, a system detects this as coming from a non-trusted sender, which is a measure relative to the recipient. The system then scrutinizes the email in more detail. Based on the signature field of the email and other content of the email, the email is determined to appear to be associated with BBB, which is a US institution. However, scrutiny of the headers reveals that it was not sent by a server associated with BBB, and it was in fact sent from a time zone that is not associated with US mail servers but which may be associated with UK mail servers or West African mail servers. Based on this, a determination is made that this is a malicious email. Additional scrutiny involving databases of known corrupted accounts, such as accounts known to be breached in large-scale breaches, indicates that this email came from such an account. The system generates a collection of signatures for this threat. A first example signature determines that the email is sent from a known-corrupted account to a party that does not consider the sender trusted, and containing the text "Better Business Bureau." A second signature generated is an email coming from a time zone outside the US, from a party that is not trusted to the recipient, where the email has a URL that is associated with a URL shortening domain, and containing the phrases "within 48 hours" and the phrase "download." Additional signatures are also generated, as will be understood by a person skilled in the art.

In one example embodiment, an email is classified as likely unwanted if it comes from a stranger (a party the recipient has never received an email from), and the email address of the sender is on a blacklist such as "havelbeenpwned" or another list of compromised email accounts, and the email contains at least one of a URL and an attachment. For such emails, it is determined whether any signature in use would have blocked it. If yes, then the score associated with any such signature is increased; if no, then a signature is generated. In one example, the signature may create a signature that says: if the email comes from a stranger, contains a URL or an attachment, and contains a word or a phrase contained in the originally detected email triggering this signature generation, but which is not commonly occurring in other emails. This way, if an attacker sends the same email from another corrupted account, but where this account has not been reported to the system as corrupted, then the signature will still catch the email, whereas the generic rule would not.

In another example embodiment, the use of agile signatures is used to reduce computational load. It is well understood that sandboxing and related technologies are creating a computational burden for receiving systems that is often not manageable. In response to that problem, the disclosed technologies dramatically reduce the computational burden of the systems.

The approach is explained using the illustrative example below:

1. The system determines if a sender is spoofed. Example approaches involve using DMARC, using IP-based reputation, and by determining whether a sender-based model is matched. If the email is determined to not be spoofed, or that the risk of being spoofed is below a threshold set by the system, then the system determines whether the sender is a "high control" sender. High control senders do not offer free accounts to users, and maintain a very high standard of security. The system curates a list of high control senders over time by identifying domains and companies that adhere to high security standards, e.g., has a DMARC p=reject policy, and which do not transmit UGC (User Generated Content). As will be understood by a person skilled in the art, additional methods can be used to make a list of high control domains. This list is consulted to determine whether a sender is on it. Emails from high control senders are not scrutinized for malware attachments unless a malware-related signature is matched. Such signatures may identify a set of criteria associated with a malware attack that has been discovered to infiltrate organizations that are considered high control, or whose associated score is close to that required by the system for the system to identify it as high control. Examples of high control senders are well-recognized financial institutions. If the sender is high control and there are no triggering signatures associated with high-control domains, then any attachments and URLs are not scrutinized for malware.

2. Otherwise, the system determines whether the sender is trusted with respect to the recipient. The trusted predicate can be determined by measuring the amount of traffic in both directions that is sent between the sender and the receiver, and determine whether this exceeds a threshold, such as at least four emails in both directions. If the sender is trusted, then it is determined by the system whether there is an ATO (or corruption) sign associated with the email. This corresponds to a higher than acceptable risk of the account being under the control of an attacker. One example method of doing this, as disclosed in a co-pending application, is to automatically examine the headers of the email and determine whether the Mail User Agent (MUA) is significantly different from historically observed MUAs for the same sender. Another method is to evaluate signatures associated with corruption, as disclosed in this application. If the sender is trusted and there is not a high risk of corruption, then attachments and URLs are not scrutinized for malware.

3. Otherwise, if the sender is a stranger to the recipient, which means that the email comes from a party the sender has not previously communicated with, then it is determined whether the email has an attachment that is high-risk in that it is associated with executables. For example, word documents with macros can be dangerous, and therefore, these are high-risk; similarly, encrypted zip files are associated with higher than normal risk. If the email has such an attachment and it is not from a domain with a reputation exceeding a high threshold, then the email is stripped of its attachment and not screened. Similarly, if the email contains a URL that is not associated with a very trustworthy domain that is not used to distribute malware, then the URL is preferably stripped or proxied, where proxied URLs are evaluated by the system as the user clicks. Thus, in these circumstances, the email attachments and URLs are also not scrutinized for malware, except where a recipient policy requires proxying of semi-suspect URLs.

4. Otherwise, the attachment or URL should be scrutinized, but preferably not in real-time. Therefore, attachments are preferably wrapped, as described previously, and URLs are proxied. This results in a delayed computational burden, and only if the recipient of the email clicks on the attachment or URL, and not if he or she ignores them.

This way, the computational burden is significantly reduced using the disclosed technology, which enables systems to selectively scrutinize emails to a much greater level, without the malware detection effort causing the systems to thrash or otherwise fail to operate in an efficient manner. Thus, the disclosed security measures improve the efficiency, which in turn allows for a more careful security scrutiny of potential threats, which thereby increases the security of the users of the system.

Figure 18:
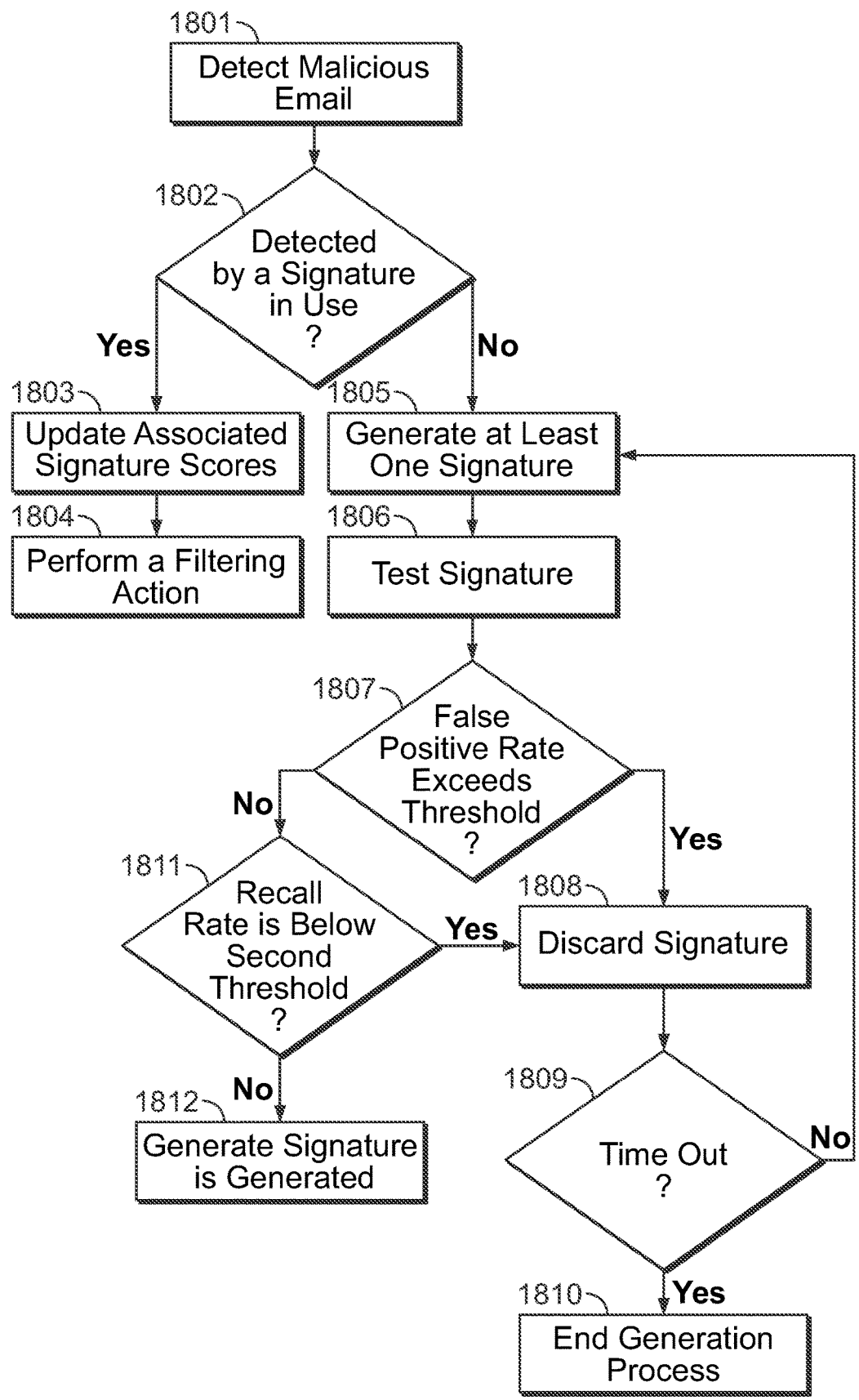
FIG. 18 is a flowchart illustrating an embodiment of a process for generating a signature.

FIG. 18 is a flowchart illustrating an embodiment of a process for generating a signature. At 1801, a malicious email is detected based on an existing detector. In 1802, it is determined whether the email is also detected by a signature in use. If it is, then in 1803, the associated signature scores are updated, and in 1804, a filtering action is performed. If it isn't detected, then in 1805, at least one signature is generated, and tested in 1806 with respect to at least a corpora, one for benevolent messages and one for malicious messages. It is determined what the false positive rate is by determining how many benevolent messages are detected by the generated signature, and it is determined what the recall rate the signature corresponds to by determining how many malicious messages are detected by it. In 1807, the determined false positive rate is compared to a threshold, and if the false positive rate exceeds the threshold, then the process continues to 1808, where the signature is discarded. Otherwise, the computation proceeds to step 1811 where the recall rate is compared with a second threshold, and if this is below the second threshold, then the process continues to 1808, otherwise to 1812 where a signature is generated and its scores set according to the computed false positives and the recall rates, or using another scoring system as described previously. In 1809, it is determined whether to time out based on the number of attempts to create a signature. For example, if ten signatures have failed to be created for the email, then the system may conclude that it should time out and proceed to 1810 where the generation process is ended;

otherwise, the process continues by going to 1805 and generating another signature. Other criteria for timing out can also be used, and these may depend on the estimated danger of the threat posed by the email, where a high threat corresponds to many attempts to create a signature. Moreover, the thresholds associated with steps 1807 and 1811 may also preferably depend on the assessed threat, where a high threat corresponds to a greater willingness to accept false positives and low recall rates.

Figure 19:
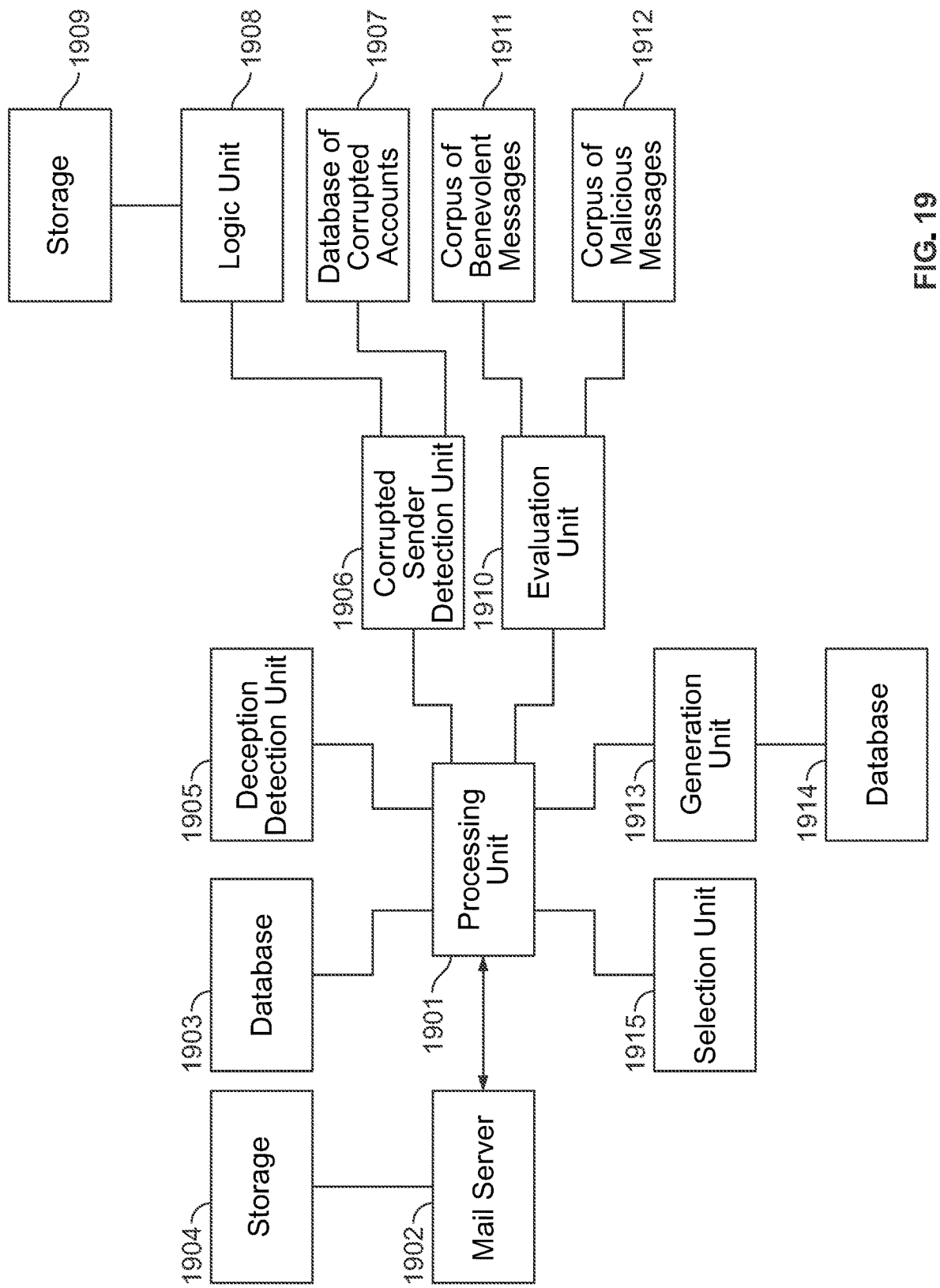
FIG. 19 is a diagram illustrating an embodiment of components of a system.

FIG. 19 is a diagram illustrating an embodiment of components of a system. Unit 1901 is a processing unit, in communication with a mail gateway or mail server 1902. Unit 1901 is also connected to a database 1903 containing signatures, at least some of which are represented in storage 1904 accessible from mail gateway or mail server 1902. Unit 1905 is used to determine when an email is deceptive, based, for example, on being spoofed, using display name deception, or using a look-alike domain. Unit 1906 determines whether an email is likely to be from a corrupted sender based on a database of corrupted accounts 1907 and logic unit 1908 used to determine whether the email is corrupted, using headers and historical headers of the sender stored in unit 1909. Unit 1910 evaluates a generated signature using a corpus of benevolent messages 1911 and a corpus of malicious messages 1912. Unit 1913 generates prospective signatures from an email, using logic identifying what makes the email different from other emails, using a database stored in 1914. Database 1914 is used to create signatures to be tested by unit 1910. If a signature passes the tests, it will be stored in database 1903. Based at least in part of the scores associated with a signature stored in database 1903, and a probabilistic selection performed by selection unit 1915, a collection of signatures will be selected and sent to database 1904, along with a list of what signatures to remove from database 1904. Mail gateway or mail server 1902 periodically updates unit 1901 with new scores based on what signatures are triggered by emails, and unit 1901 updates a centralized score kept in database 1903, and uses changes in scores to select new signatures to update, retire, and propagate. As a person skilled in the art will understand, unit 1901 is connected to a multiplicity of mail gateways and mail servers such as unit 1902, and interacts periodically with each one of these to receive statistics or update signature selections.

FIG. 20 is a block diagram illustrating an example of a message that includes a potentially executable or otherwise risky attachment. Email 2001 includes a potentially executable or otherwise risky attachment 2002. As this is processed by the system, such as in a mail gateway or mail server, or in a cloud server or appliance in connection with the gateway or mail server, the system replaces the attachment with a wrapped attachment. Thus, email 2001 with attachment 2002 is replaced with email 2003 with attachment 2004, where attachment 2004 wraps the risky element 2005, which corresponds to attachment 2002. Instead of delivering email 2001 with attachment 2002, the system delivers email 2003 with attachment 2004 containing risky element 2005. Alternatively, the system may inspect the inbox of a subscriber and replace the email 2001 with associated attachments with email 2003 with associated attachments. As a third option, the system may receive a copy of the potentially risky email 2001 containing attachment 2002 from the gateway or mail server, then issue a request to have email 2001 with attachment 2002 replaced by email 2003 with attachment 2004 containing risky element 2005. Here, the text part of email 2003 is preferably the same as email 2001, or contains an additional notification that the potentially risky attachment is considered safe to open.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a received message sent from a first message account to a second message account;
determining a security risk associated with the received message;
determining that the security risk associated with the received message meets one or more criteria;
based on the determination that the security risk associated with the received message meets the one or more criteria, sending a responsive message from a third message account to the first message account, wherein the responsive message includes a content reference identified as referring to a content for a user of the first message account, wherein in response to receiving a request made by the user of the first message account using the content reference, access to a message repository of the user of the first message account is requested as a condition of obtaining the content associated with the content reference; and
in response to gaining access to the message repository of the user of the first message account:
providing the first message account with access to the content, wherein the content includes decoy information; and
analyzing messages stored in the message repository that correspond to a message account of the user of the first message account.

2. The method of claim 1, wherein the responsive message is automatically generated.

3. The method of claim 1, wherein the responsive message references content included in the received message sent from the first message account.

4. The method of claim 1, wherein the access to the message repository associated with the user of the first message account is requested using an OAuth access request.

5. The method of claim 1, wherein the message repository associated with the user of the first message account is an electronic mailbox of the first message account.

6. The method of claim 1, wherein determining the security risk associated with the received message includes determining a risk score associated with the received message.

7. The method of claim 1, wherein determining the security risk associated with the first message includes determining a sender security risk associated with an identity of the first message account.

8. The method of claim 1, wherein determining that the security risk associated with the received message meets the one or more criteria includes determining that a security risk score exceeds a threshold value.

9. The method of claim 1, wherein the second message account is a protected message account analyzed for security risks.

10. The method of claim 1, wherein the content reference includes a URL.

11. The method of claim 1, wherein in response to receiving a request made using the content reference, a request to accept terms of an agreement is provided.

12. The method of claim 1, wherein content included in the message repository associated with the first message account is analyzed to gather and report information associated with the first message account.

13. The method of claim 1, wherein the determined security risk associated with the received message is utilized in determining whether to allow the received message to be delivered to the second message account.

14. The method of claim 1, wherein the determined security risk associated with the received message is utilized in determining whether to modify the received message prior to delivering the received message to a message repository of the second message account.

15. The method of claim 1, wherein access to the message repository associated with the first message account is utilized to generate a report provided to one or more of the following: a law enforcement agency, a financial institution, or a message service provider.

16. The method of claim 1, further comprising, sending to the user associated with the first message account, a future attack discouragement notification.

17. The method of claim 1, wherein in response to obtaining access to the message repository associated with the first message account, a dummy version of the content for the user of the first message account is provided to the user of the first message account.

18. The method of claim 1, further comprising automatically generating the content for the user of the first message account likely desired to be accessed by the user of the first message account and automatically including in the responsive message the content reference identified as referring to the content.

19. A system, comprising:
a processor; and
a memory coupled with the processor, wherein the memory is configured to provide the processor with instructions which when executed cause the processor to:
receive a received message sent from a first message account to a second message account;
determine a security risk associated with the received message;
determine that the security risk associated with the received message meets one or more criteria;
based on the determination that the security risk associated with the received message meets the one or more criteria, send a responsive message from a third message account to the first message account, wherein the responsive message includes a content reference identified as referring to a content for a user of the first message account, wherein in response to receiving a request made by the user of the first message account using the content reference, access to a message repository of the user of the first message account is to be requested as a condition of obtaining the content associated with the content reference; and
in response to gaining access to the message repository of the user of the first message account:
provide the first message account with access to the content, wherein the content includes decoy information; and
analyze messages stored in the message repository that correspond to a message account of the user of the first message account.

20. A computer program product, the computer program product being embodied in a non-transitory computer readable storage medium and comprising computer instructions for:
receiving a received message sent from a first message account to a second message account;
determining a security risk associated with the received message;
determining that the security risk associated with the received message meets one or more criteria;
based on the determination that the security risk associated with the received message meets the one or more criteria, sending a responsive message from a third message account to the first message account, wherein the responsive message includes a content reference identified as referring to a content for a user of the first message account, wherein in response to receiving a request made by the user of the first message account using the content reference, access to a message repository the user of the first message account is requested as a condition of obtaining the content associated with the content reference; and
in response to gaining access to the message repository of the user of the first message account:
providing the first message account with access to the content, wherein the content includes decoy information; and
analyzing messages stored in the message repository that correspond to a message account of the user of the first message account.

* * * * *